(12) United States Patent
Masotta et al.

(10) Patent No.: US 12,703,598 B2
(45) Date of Patent: Aug. 11, 2026

(54) AUTOMATED TRAYING OF FINISHED MAIL

(71) Applicant: DMT Solutions Global Corporation, Danbury, CT (US)

(72) Inventors: John Robert Masotta, Newtown, CT (US); Anthony E. Yap, Palmyra, PA (US); Matthew O. Dickie, Sandy Hook, CT (US); Boris Rozenfeld, Danbury, CT (US); Eddy Edel, New Milford, CT (US); Xavier A. Padros, New Milford, CT (US)

(73) Assignee: DMT Solutions Global Corporation, Danbury, CT (US)

( * ) Notice: Subject to any disclaimer, the term of this patent is extended or adjusted under 35 U.S.C. 154(b) by 378 days.

(21) Appl. No.: 18/424,671

(22) Filed: Jan. 26, 2024

(65) Prior Publication Data

US 2024/0279017 A1 Aug. 22, 2024

Related U.S. Application Data

(60) Provisional application No. 63/442,751, filed on Feb. 1, 2023, provisional application No. 63/441,339, filed on Jan. 26, 2023.

(51) Int. Cl.
*B65H 31/30* (2006.01)
*B07C 1/02* (2006.01)
(Continued)

(52) U.S. Cl.
CPC ......... *B65H 31/3045* (2013.01); *B07C 1/025* (2013.01); *B25J 9/0093* (2013.01);
(Continued)

(58) Field of Classification Search
CPC .......... B65H 31/3045; B65H 2301/162; B65H 2301/42242; B65H 2701/1916; B65H 29/00; B07C 1/025; B25J 9/0093; B25J 15/0253; B65B 5/068; B65B 35/36; B65B 57/14; B65G 43/08; B65G 47/04; B65G 2201/0258; B65G 2203/0216;
(Continued)

(56) References Cited

U.S. PATENT DOCUMENTS 6,959,923 B2 * 11/2005 Leitz ...................... B65H 31/06 271/215
7,381,026 B1 * 6/2008 Power .................... B65G 59/10 414/797

(Continued)

FOREIGN PATENT DOCUMENTS

WO WO-2019025676 A1 * 2/2019 .............. B65H 1/02

OTHER PUBLICATIONS

International Search Report and Written Opinion issued in International Application No. PCT/US2024/013248, date of mailing: May 15, 2024, 12 pages.

*Primary Examiner* — Thomas Randazzo
(74) *Attorney, Agent, or Firm* — Brown Rudnick LLP; Matthew P. York

(57) ABSTRACT

The present invention provides automated systems and methods of loading finished mail within the trays for subsequent processing. The systems and methods of the present invention result in economic and operational efficiency to increase the process of loading the mail in the trays.

42 Claims, 60 Drawing Sheets

(51) Int. Cl.

| | |
|---|---|
| ***B25J 9/00*** | (2006.01) |
| ***B25J 15/02*** | (2006.01) |
| ***B65B 5/06*** | (2006.01) |
| ***B65B 35/36*** | (2006.01) |
| ***B65B 57/14*** | (2006.01) |
| ***B65G 43/08*** | (2006.01) |
| ***B65G 47/04*** | (2006.01) |
| ***B65G 57/14*** | (2006.01) |

(52) U.S. Cl.
CPC ........... *B25J 15/0253* (2013.01); *B65B 5/068* (2013.01); *B65B 35/36* (2013.01); *B65B 57/14* (2013.01); *B65G 43/08* (2013.01); *B65G 47/04* (2013.01); *B65G 2201/0258* (2013.01); *B65G 2201/0285* (2013.01); *B65G 2203/0216* (2013.01); *B65G 2203/0233* (2013.01); *B65G 2203/044* (2013.01); *B65H 2301/162* (2013.01); *B65H 2301/42242* (2013.01); *B65H 2701/1916* (2013.01)

(58) Field of Classification Search
CPC ...... B65G 2203/0233; B65G 2203/044; B65G 2201/0285; B65G 59/101; B65G 61/00
See application file for complete search history.

(56) References Cited

U.S. PATENT DOCUMENTS

2003/0006174 A1 1/2003 Harres et al.
2003/0113200 A1* 6/2003 Hoe ....................... B65G 57/14 414/788.4
2003/0120387 A1* 6/2003 Sherwin ............... B25J 15/0052 294/2
2009/0242464 A1* 10/2009 Stubleski ............... B65H 1/025 209/509
2013/0318929 A1* 12/2013 Keane .................... B65H 29/26 53/475
2017/0182518 A1* 6/2017 De Sousa .............. B65H 15/02

* cited by examiner

Control System
700
Robotic Arm
200
Tool(s)
Gripper
Suction cup(s)
202
201
500
600
400
302
301
1002
800
100
1001

AUTOMATED TRAYING OF FINISHED MAIL

CROSS-REFERENCE TO RELATED APPLICATIONS

This application claims the benefit of, and priority to, U.S. Provisional Patent Application No. 63/441,339, filed Jan. 26, 2023, and U.S. Provisional Patent Application No. 63/442,751, filed Feb. 1, 2023, the contents of each of which are hereby incorporated by reference in their entireties.

TECHNICAL FIELD

The present disclosure relates generally to mailpiece fabrication systems, and, more particularly, to a system for automated loading of mailpieces within trays for subsequent mailing.

BACKGROUND

Direct mail is an important tool for businesses to communicate with customers. In various mass mailing preparations, a mail package may include one or more documents, which may be folded and/or combined with cards or other inserts, all of which must be inserted into an envelope, which is sealed, addressed, and stamped for mailing. As such, many businesses turn to mailpiece fabrication systems, such as mailpiece inserters and mailpiece wrappers, to periodically produce a large volume of mail.

Mailpiece fabrication systems are analogous to automated assembly equipment in that sheets, inserts and envelopes are conveyed along a feed path and assembled in, or at, various modules of the mailpiece fabrication system. For example, the typical inserter system resembles a manufacturing assembly line. Sheets and other raw materials (e.g., other sheets, enclosures, and envelopes) enter the inserter system as inputs. Then, a plurality of different modules or workstations in the inserter system cooperatively operate to process the sheets until a finished mailpiece is produced (i.e., contents of a given mailpiece are eventually placed within an envelope, package, or other carrier-type article and ready for mailing).

A finished mailpiece (also referred to as "finished mail" or "finished mailing") generally undergoes further processing, which may include sorting and like, as well as eventual mailing to an intended recipient. For example, once a finished mailpiece has been prepared by the system, it may be grouped into a stack of other mailpieces and provided to a carrier service for delivery. As such, mailpieces or finished mail that is prepared from an inserter platform is generally placed within trays to be taken to a postage facility, such as United States Postal Service (USPS), Universal Parcel Service (UPS), or any other presorting and shipping facility.

In conventional systems for production of a high volume of finished mail, a human operator is required to move a given stack of finished mail from the machines, where they are produced, to the trays for subsequent processing. Moreover, in such systems, the human operator is also required to separate the trays (on which the finished mail is eventually loaded) from a stack of such trays and put them in the loading area and ensuring that the right mail goes in the right loading tray. The requirement of human operator(s) performing one or more of these steps may result in errors, reduce the overall speed of the operation, and/or lead to increased cost in the process. Accordingly, the requirement of having a human present to manage the placement and subsequent loading of trays with finished mail generally leads to a high cost of labor and may lead to unpredictable workflow of the system.

SUMMARY

The present invention addresses drawbacks of current mailpiece processing techniques by providing systems and methods for providing automated loading of finished mail within trays. In particular, the systems and methods of the present invention include various components to be incorporated within an inserter platform workflow and configured to provide traying of mailpieces in an autonomous manner to thereby reduce the labor and associated costs required to operate an inserter platform.

The invention provides various components that cooperatively provide an automated means of separating a tray from a stack of trays, placing said tray on a tray loading station, and subsequent loading of one or more stacks of finished mail within the tray by way of a robotic assembly. As generally understood, the finished mail may be any form of mail that is ready to be mailed to an intended recipient. For avoidance of confusion, the finished mail could be a printed page inserted in an envelope, a single sheet (folded or unfolded), or multiple sheets of paper. The finished mail further be stacked by a module of the inserter platform. For example, mailpieces may be stacked vertically (i.e., mailpieces may be placed on an edge of the paper of the envelope).

The system includes a tray dispenser which is capable of holding a plurality of empty trays, which may be initially loaded within the tray dispenser either by a human operator or an automated assembly for loading empty trays on the tray dispenser. The tray dispenser is configured to release a single tray from the stack of empty trays. Additionally, or alternatively, the trays can be pre-separated by the operator and placed on a conveyor. More specifically, in some embodiments, a dual-level outfeed conveyor may be used, which comprises multiple conveyor levels to provide either more tray capacity or provide separate streams for different size mail trays.

The robotic assembly may generally include a robotic arm configured to pick up, via an appropriate tool or mechanism, an empty tray from the tray dispenser and place said empty tray within a loading station for subsequent loading of one or more stacks of finished mail into the tray. For example, the robotic arm may include a plurality of suction cups that will grip an empty tray and place said tray at an appropriate location on the tray loading station.

The robotic arm further comprises a gripper assembly designed to pick up stacks of finished mail from an on edge stacker (OES) belt, which is located at an end of the inserter platform. The edge stacker belt has a row of finished mail arranged in a vertical orientation and is ready to be picked up by a human operator or an automated assembly. The gripper includes a pair of paddles to grip the stack of the finished mail from the edge stacker belt. The pair of paddles may include at least one stationary paddle (i.e., it generally remains static relative to the robotic arm) and at least one sliding or movable paddle, such that the pair of paddles are configured to cooperatively grasp a stack of finished mail. In some embodiments, the pair of paddles may both be independently slidable or movable for cooperatively picking up a given stack of finished mail from the OES. A given sliding paddle of the gripper may be actuated by an air cylinder or other pneumatic process. In certain embodiments, the sliding paddle of the gripper may be actuated by a linear actuator.

For example, such a liner actuator may include a motor with a lead screw or slide with a timing belt.

In certain embodiments, the robotic assembly may also include a distance sensor to measure the length of the stack of mail picked up by the tool. This distance sensor may be located on the gripper. The distance sensor may be any commercially available distance sensor for measuring the length of stack. The data from this measurement may be relayed to a processor and/or software designed to operate the system, specifically designed to control the robotic assembly, including movement of the robotic arm and subsequent picking and placing of trays and stacks of finished mail relative to the trays.

Additionally, or alternatively, the given length of a stack of mail picked up by the tool can be determined by first measuring the distance between a motorized paddle and a stack head, and then subtracting said distance from a measured distance between the tool and the stack head. The resulting measurement can be taken after applying a force from the paddle towards the tool, such that the mail is compressed, and the compressed length of the stack is measured.

The tray loading station of the system is the location in which the stacked finished mail is loaded on the trays. The tray loading station or tray loading module receives the empty tray and may adjust the position of the empty tray on the tray loading station to ensure the tray is optimally placed to receive stacks of finished mail from the robotic assembly. The position of the tray may be adjusted relative to the robot so that a given stack of finished mail is placed at the desired location in the tray. The tray loading station may further include a retractable tray end stop that prevents the tray from moving while the tray is being loaded with the stack of finished mail. The tray loading station further includes a retractable bar and retractable hook(s) assembly. The retractable bar lowers on the stack of the mail that is loaded in the tray so that the finished mail loaded in the tray does not lift up when the gripper releases the stack to pick up another stack of finished mail. The retractable hook(s) and the retractable bar ensure that the mail loaded in the tray stays upright and does not fall over when the tray is partially filled with the stack of finished mail. Subsequently, when the loading of the tray with the stack of finished mail is complete, the retractable hook pushes the tray from the tray loading station to the external conveyor. Once the tray is on the external conveyer, it may be sent for further processing, including palletization and/or delivery to a postal service location.

It should further be noted that, in some embodiments, a means of diverting a "bad" tray to a separate area may be incorporated into an output conveyor. More specifically, a "bad" or "rejected" tray may generally be defined as a tray having or more of the following characteristics: a tray having one or more missing mailpieces; a tray having one or more improperly loaded mailpieces; a tray having one or more incorrect mailpieces loaded within; and a tray having encountered a material jam during loading thereof.

For example, one embodiment of an output conveyor includes a mechanism provided directly after the tray loading station and configured to eject a tray to one of multiple levels. The use of multiple levels increases the overall tray capacity without significantly increasing the amount of floorspace required. Furthermore, one or more of the multiple levels can be dedicated to receipt of the "bad" trays. In another embodiment, a dual path output conveyor has a bi-directional transport directly after the tray loading station (TLS), in that "good" trays (i.e., trays that are acceptable and do not have issues therewith) will be transported in one direction and "bad" trays will be transported to the opposite direction towards a conveyor dedicated to rejected trays.

The gripper of the system may be designed to pick from a single piece of finished mail to about 14 inches of a stack of mail. In preferred embodiments, the gripper of the system is designed to pick up from about 6 inches to about 12 inches of vertically stacked mail in each cycle. The dimensions of empty trays may be about 10 inches to about 20 inches in length. Thus, the systems of the invention multiple cycles of placing the vertically stacked mail in a single tray. Once the single tray is filled with the stack of finished mail, the tray is pushed out to an external conveyer belt, and the cycle is repeated for subsequently loaded trays. There are several advantages to loading a tray in multiple batches as opposed to loading the tray in a single batch. Importantly, a smaller gripper could be used to perform this function. For example, to fill a standard USPS mail tray that holds approximately 21" of stacks of finished mail, the tool must be able to grab upwards of 45" of mail at one time to account for the compression factor of the mail. This would result in a very large gripper, which would be expensive, heavy, and more complex to use for the operator. Moreover, since the gripper is small and the amount of stack of finished mail being picked up each time is less, the overall lifting force required by the robot is reduced by approximately one-third (⅓) of the force that would have otherwise been required. As a result, the gripper is a small and lower cost equipment. Loading the smaller batches of stacked mail also has the benefit of allows the system to accurately calculate the actual stack compression ratio of the mail as the tray is being filled, and results in more densely packed trays.

In accordance with embodiments of the present invention, there are two primary methods of filling an empty tray with stacks of finished mail. In the first method, the empty tray is filled to capacity (within the limits of the automation) with stacks of finished mail. This method is used for trays that will be sent on to sorters for further processing. The second method is referred to as "manifesting." In this method, the system is capable of placing precise quantity of the mail in a particular tray. Thus, the system will be provided instructions containing the tray break information and will further utilize an offsetter to physically offset the stack of mail on the on the edge stacker. As such, the robotic arm may further include sensors to detect the offset and be sure the last tray pick ends at the offset. The filled tray is subsequently moved to an external conveyer belt for further processing. In certain embodiments, a camera with OCR capability on the edge stacker is configured to read the address on the first piece of finished mail from the stack that is left on the edge stacker. This information may be used to validate that the edge stacker had offset the right stack of mail that was picked up by the gripper and placed in the right tray.

An offsetter is a module on the edge stacker. The offsetter shifts the mail on the belt. Particularly, the offsetter pushes a predetermined stack of the mail horizontally as compared to the remainder of the stack. The offsetter is primarily used to indicate zip breaks in the mail. When there is a zip break in the mail, it typically indicates the start of a new tray.

The system of the present invention may include components/assemblies to move the tray filled with stacks of the finished mail from the tray loading station to an external conveyor belt. The external conveyor belt could also be further automated for presorting the filled trays. Subsequently, the tray with stacks of finished mail could be moved for further sorting and may be palletized. These trays are then sent to presorting or shipping facilities. In certain embodiments, the systems of the invention may further separate the batches of the finished mail directed for different geographical areas and loading them in different trays.

Accordingly, the systems and methods of the present invention provide numerous advantages over current mailpiece processing techniques. In particular, the systems and methods of the present invention provide for an economic, cost-efficient, and reliable means of loading stacks of finished mail within the trays. Indeed, the systems of the invention may maximize the number of finished mailpieces that may be loaded onto each tray by compressing the mail before loading it on the tray. Another advantage of this system is that, in conventional processes, the mail is underfilled in the tray to avoid the risk of overfilling the tray. In accordance with methods of the current invention, the length of the stack could be measured prior to filling the tray. Such information could be used to calibrate the instructions provided to the system to thereby optimize the quantity of finished mail that could be filled in a single tray, thereby leading to a reduction of wasted space in the filled tray and/or pallets. Moreover, this information could be useful to feedback into the system and further optimize the amount of finished mail that could be included in a single tray.

In certain embodiments, the systems of the invention may further include a vision system. The vision system of the system can perform functions selected from a group consisting of: (i) verification of tray integrity, (ii) verifying tray size, (iii) verify the mail stacked on the edge stacker is stacked properly and suitable for being picked by the robot, and if the vision system detects that the mail is not stacked properly it can alert the operator, (iv) verify that the stacker is sealed properly, (v) detect if any mail is dropped during the process, and (vi) any combinations thereof.

BRIEF DESCRIPTION OF THE DRAWINGS

Features and advantages of the claimed subject matter will be apparent from the following detailed description of embodiments consistent therewith, which description should be considered with reference to the accompanying drawings.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention is directed to systems and methods for automated loading of mailpieces within trays for subsequent mailing.

The mailpieces to be placed in trays may generally be prepared by machines used for printing and preparing mailings, with or without envelopes, to be subsequently loaded into trays to then be sent to various postal services for mailing out the intended recipients. The machines used to prepare finished mail may include, for example, any one of the EVOLUTION™, MAILSTREAM EVOLUTION™, RIVAL™, and EPIC™ inserter platforms available from DMT Solutions Global Corporation dba BlueCrest (Danbury, CT). The systems of the invention may also include any other systems that produce finished mail in bulk quantity to be sent out their intended recipients.

In the conventional systems, the finished mail from the inserter is usually placed in the trays by a human operator. Since the finished mail is prepared at a high rate of speed with these machines, the involvement of humans in the process to keep the stacks of the finished mail from the inserters to the trays may induce errors and leads to increased cost in the process. Moreover, the presence of human operators is also required to separate the trays from a stack of trays and ensuring that the proper set of mail goes in the correct tray. The requirement of human operator(s) performing one or more of these steps may delay, slow down, or lead to errors in the workflow.

The invention described herein provides an automated systems and/or methods to automate the process of loading the stacks of finished mail within empty trays to be sent to postal services.

Figure 1:
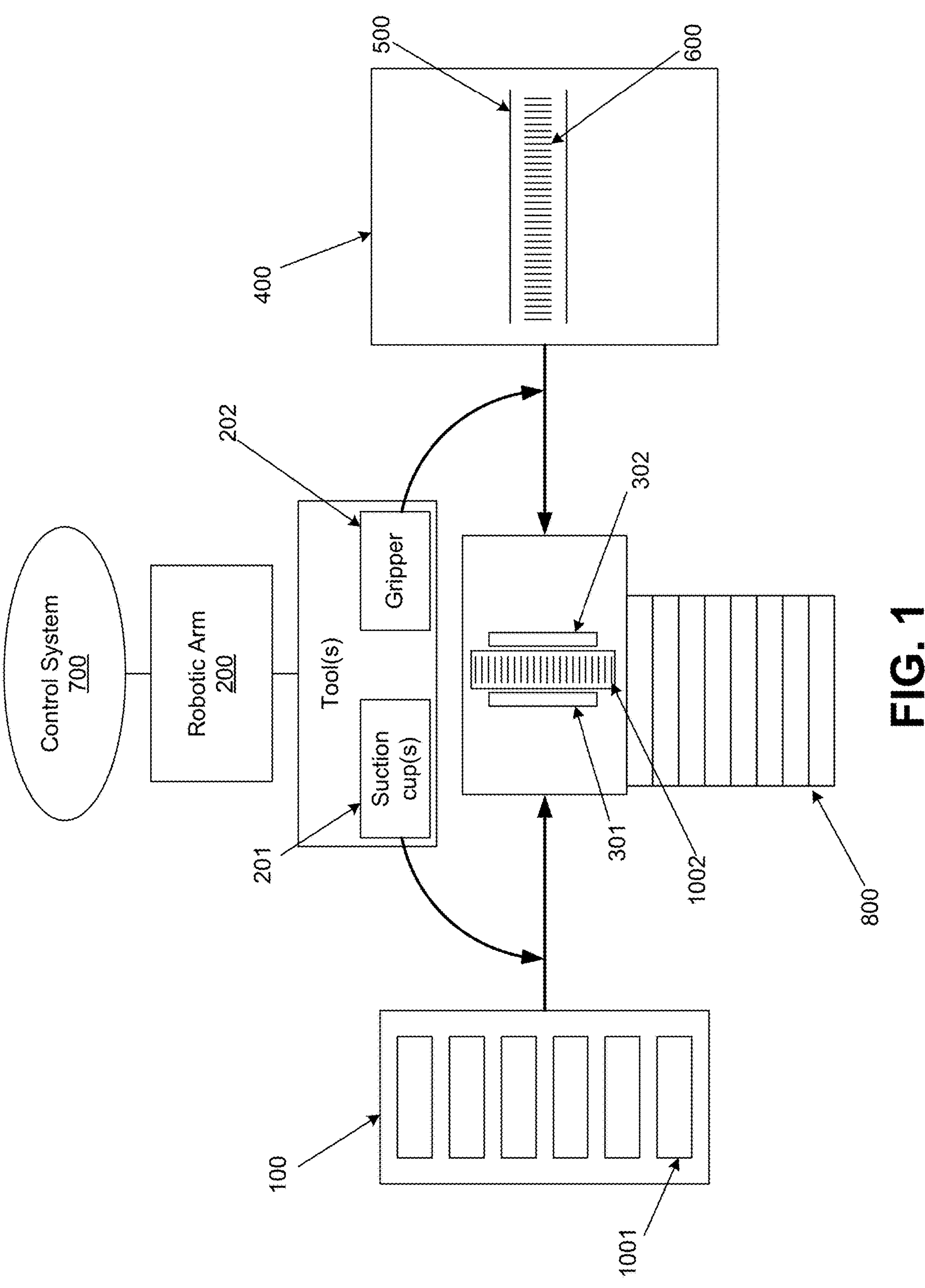
FIG. 1 is a block diagram schematic illustrating an inserter platform and incorporation of an automated system for loading of mailpieces from the inserter platform to trays.

An overview of the exemplary embodiment of the invention is provided in FIG. 1. As described in FIG. 1, the invention comprises a control system (700) controlling a robotic assembly (200) which includes a robotic arm to which one or more tools are attached. In particular, the one or more tools may include, but are not limited to, one or more suction cups (201) configured to pick up the empty trays from the tray dispenser and a gripper assembly (202) configured to pick up finished mail (preferably stacks of finished mail) for subsequent placement in a tray. In particular, the robotic arm picks up, via the one or more suction cups, a single empty tray (1001) from the tray dispenser (100), which includes a plurality of empty trays, and places the tray on the tray loading station (300). The robotic arm then picks up, via the gripper assembly, a set of stacked finished mail (600) from the on edge stacker (OES) (500). The OES (500) is connected to an inserter (400) or any other machine used for preparing finished mailpieces. Upon being gripped within the gripper assembly and moved from OES, the stack of finished mail is lowered into the empty tray (1002) on the tray loading station (300). Once the first stack of finished mail is placed into the empty tray (1002), the retractable bar and hook(s) assembly (301 and 302) lowers onto the placed stack of finished mail to thereby hold the mail in place within the tray. Once the tray on the loading station (1002) is filled with an amount of finished mail, the retractable bar and hook(s) assembly, comprising a retractable bar and a pair of retractable hooks (not shown in this figure), move the filled tray (1002) to an external conveyer belt (800). The filled trays may be further palletized before the delivery to the postal facilities or any other presorting facilities.

Figure 2:
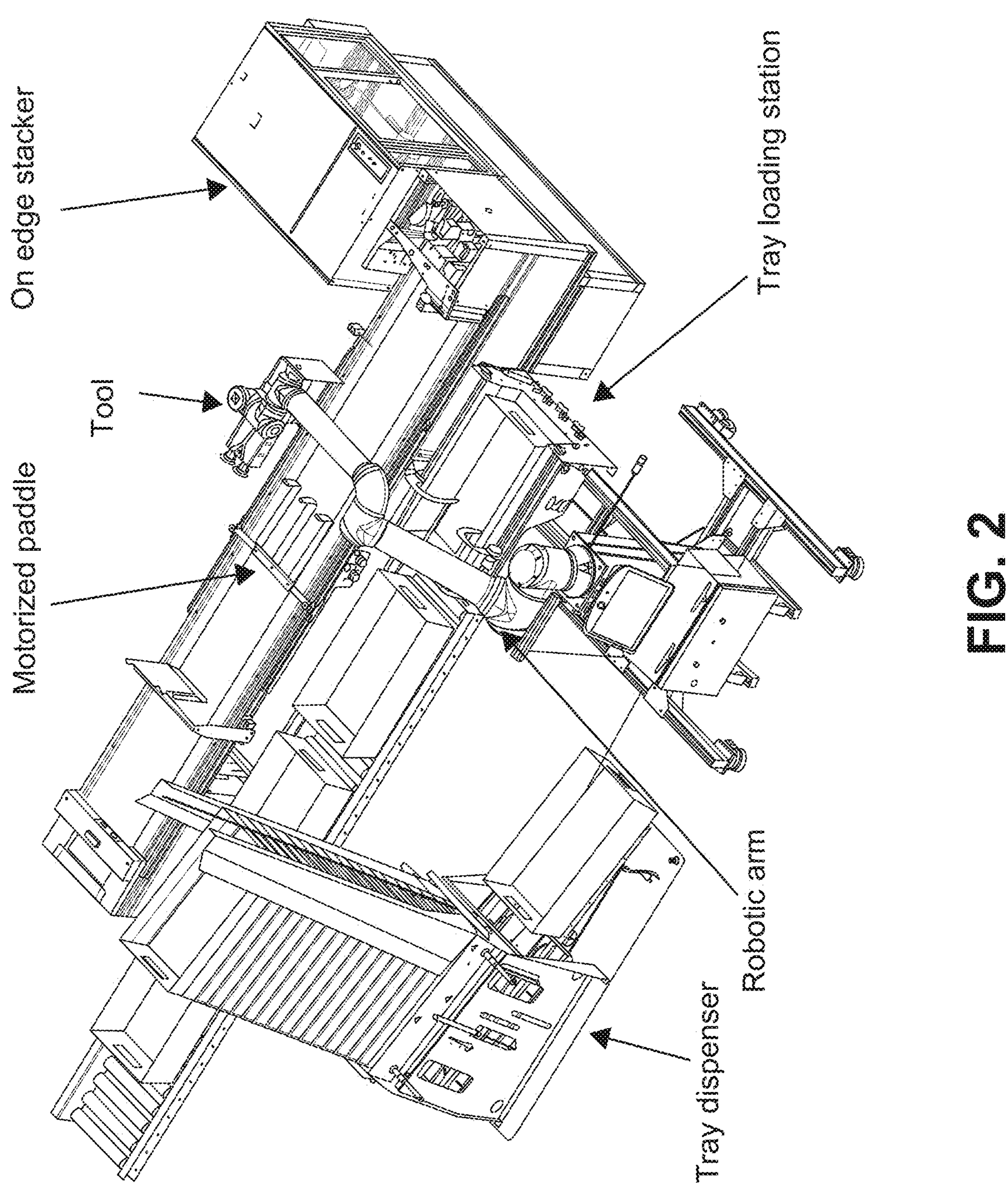
FIG. 2 is a schematic rendering of the system of the invention.

FIG. 2 provides a schematic overview of several features of the system discussed above. Various features of the specific components of the system are discussed in detail below.

On Edge Stacker (OES) and Offsetter

The inserters, or machines used to prepare the stacks of finished mail may include a module referred to as "on edge stacker," or "OES" which stacks the finished mail vertically, i.e., on any of the edge of the finished mail. In certain embodiments, the machines may also include the stacker which stacks the mail horizontally. The OES is a module that may attach to the inserter or the machine which prepares finished mail. The OES includes a conveyer belt on which the finished mail is stacked. In certain embodiments, the OES of the invention may also include an offsetter, which shifts a certain set of finished mail on the conveyer belt as compared to the remainder of the stack. The offsetter is primarily used to indicate zip breaks in the mail. When there is a zip break in the mail, it typically indicates the start of a new tray. The offsetter in the OES provides the user of the system an option to designate which subset of stacked mail goes in which tray. This is advantageous because it informs the system when to start filling a new tray. As a result, when the system detects a zip line break, a new tray is placed in the tray loading station and the system begins the process of filling up the new tray. Consequently, there is no need of a human operator to monitor when a new tray is to be loaded in the system.

The OES may further have an additional module referred to as a motorized paddle. This module is a bolt on module to the OES. The motorized paddle holds the mail vertical, or on the edge of the finished mail, as the finished mail is stacked and follows the motion of the stacker belt. The motorized paddle is important in holding the remaining finished mail in a vertical orientation, as a stack of finished mail is picked up by the gripper to be loaded in the trays. For example, when a portion of the finished mail is picked up from the belt, the paddle will move to support the finished mail that is remaining on the belt and hold it vertically. The motorized paddle may be operated by a motor with a feedback loop. In certain embodiments, the paddle is operated by a servo motor with encoder feedback, so that the location of the paddle on the belt is always known. Advantageously, this position is used by the robot's software to determine where the grab the next batch of mail.

Tray Dispenser

Figure 3:
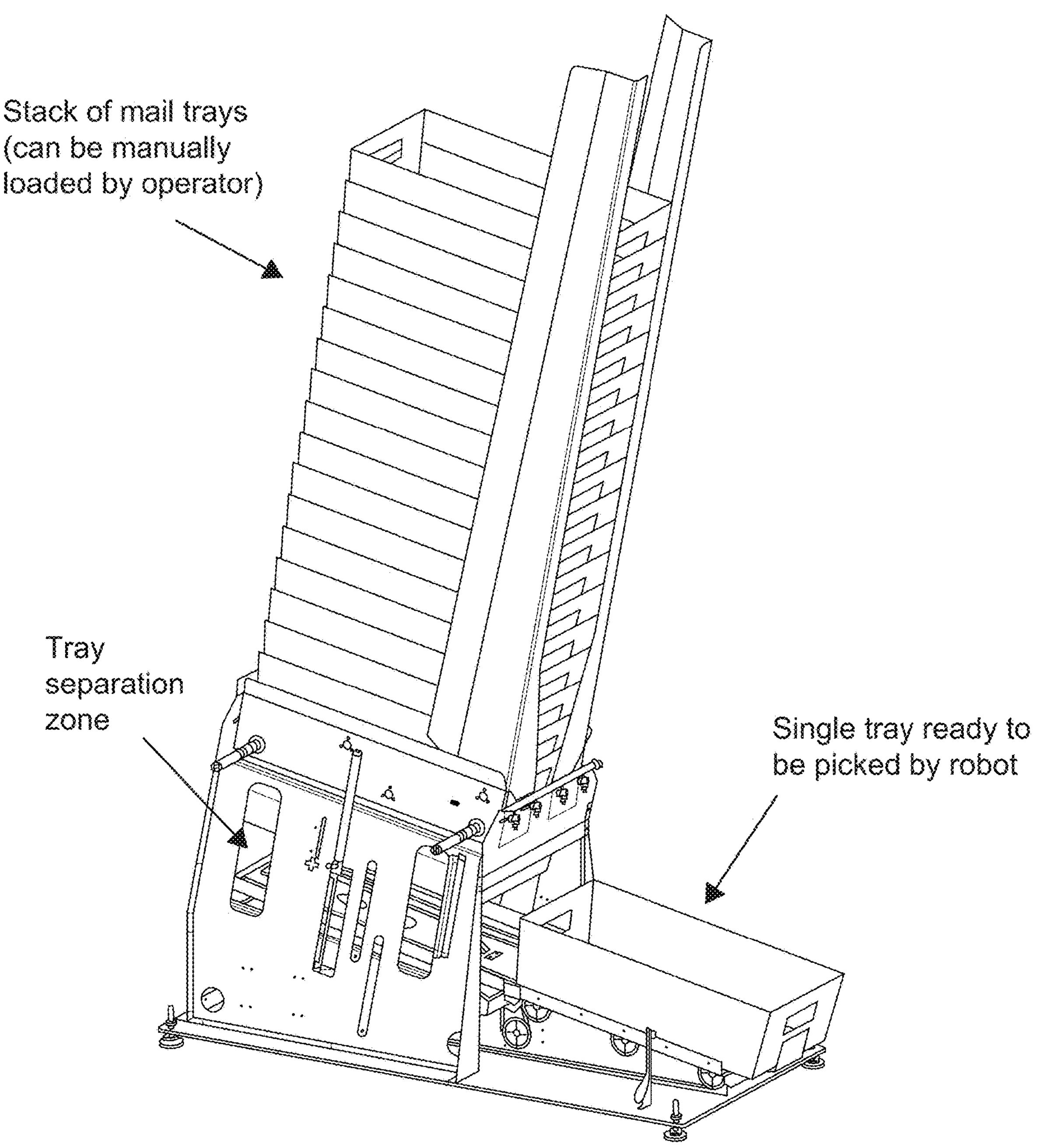
FIG. 3 is a detailed schematic view of the tray dispensing station stacked with empty trays to be picked up by the robotic arm.

The tray dispenser of the system is designed to hold a set of empty trays. In certain embodiments, the tray dispenser is loaded with empty trays by a human operator. In other embodiments, the tray dispenser is refilled by a robot. The tray dispenser further separates a single tray from the rest of the stack of empty trays from the tray dispenser and presents it such that it can be picked up by the robotic arm. FIG. 3 provides a schematic version of the tray dispenser. As shown in FIG. 3, the tray dispenser houses a stack of empty trays. At the bottom of the tray dispenser is a tray separation zone. The trays are separated in a tray separation zone where a single tray is separated from the rest of the stack of empty trays and presented for being picked up by the robotic arm.

Figure 4:
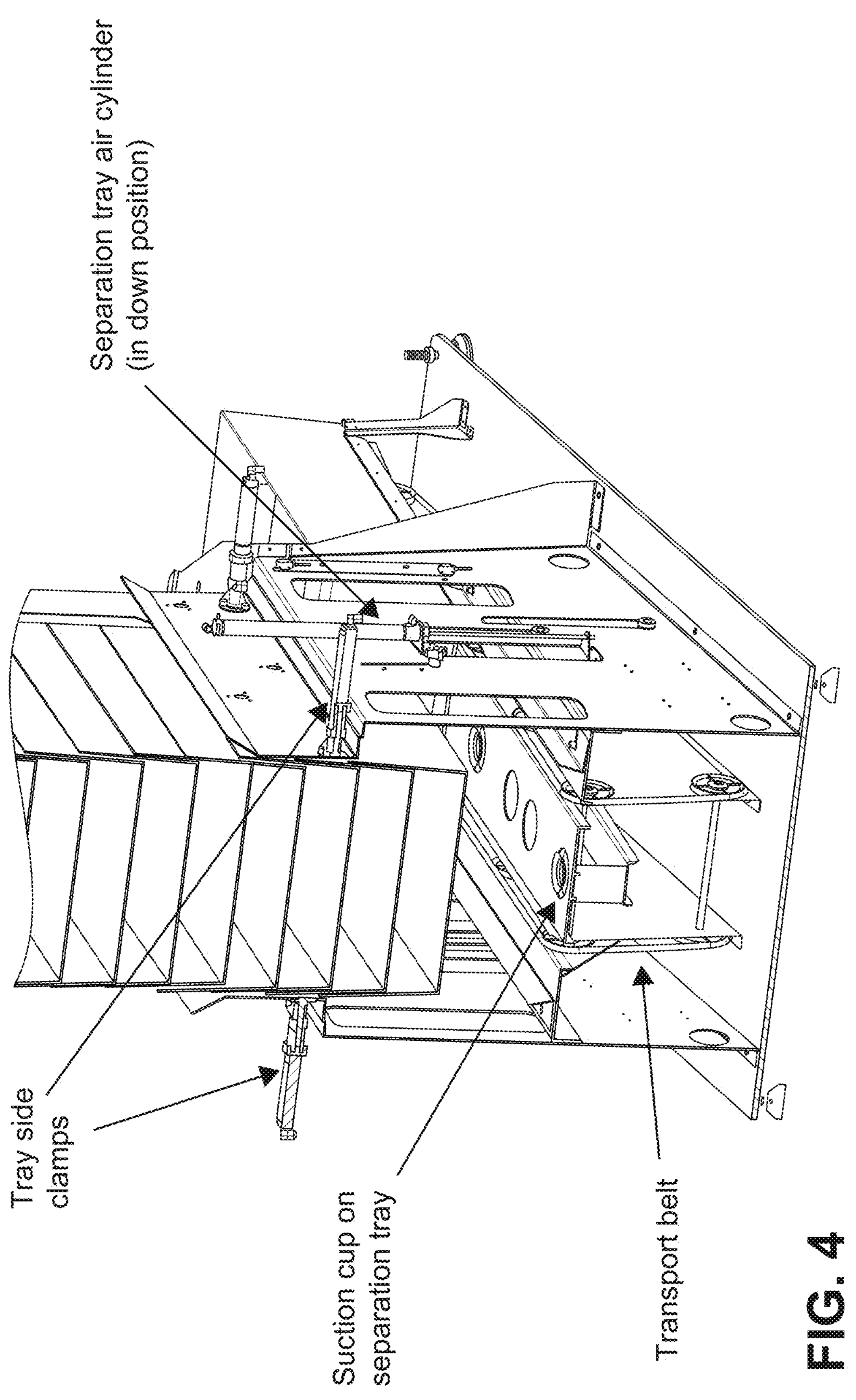
FIG. 4 is detailed schematic view of the tray dispensing station along with the mechanism of the operation of the tray dispensing station.

FIG. 4 provides further details on a mechanism of one embodiment of the tray dispenser. To separate a single tray, the tray side clamps are extended, which clamps the second lowest tray in the stack and all the trays above it. Vacuum is applied to two (2) suction cups mounted on a separation plate which is situated below the stack of trays. This causes the bottom most tray to stick to the suction cups. The tray is then move downwards approximately from about 4 to about 6 inches to pull the bottom most tray off the rest of the stack. As the tray reaches its lowest point, the vacuum to the suction cups is turned off, and the separated tray is exposed to a set of moving O-rings. These O-rings will transport the tray out from under the stack and to a tray staging area where it can be picked up by the robot.

Robotic Arm and Attached Tools:

The robotic assembly may generally include a robotic arm configured to pick up, via an appropriate tool or mechanism, an empty tray from the tray dispenser and place said empty tray within a loading station and then subsequently pickup, via an appropriate tool or mechanism, one or more stacks of finished mail and load such stacks into the tray.

The tools of the robotic arm include suction cups and a gripper. For example, the robotic arm may include a plurality of suction cups that will grip an empty tray and place said tray at an appropriate location on the tray loading station. The suction cups may be located at the end of gripper or at any other location on the robotic arm. The suction cups may be operated with a venturi vacuum generator. The robotic arm further comprises a gripper assembly designed to pick up stacks of finished mail from the OES places the stacks within the tray in the loading station. The gripper may be appended to the end of the robotic arm.

The robotic assembly of the invention may include be any commercially available robotic arm or any robotic arm specifically designed or modified to perform the functions described herein. For example, in one embodiment, the robotic assembly include the UR10e robot arm, commercially available from UNIVERSAL ROBOTS (Odense, Denmark).

Figure 5:
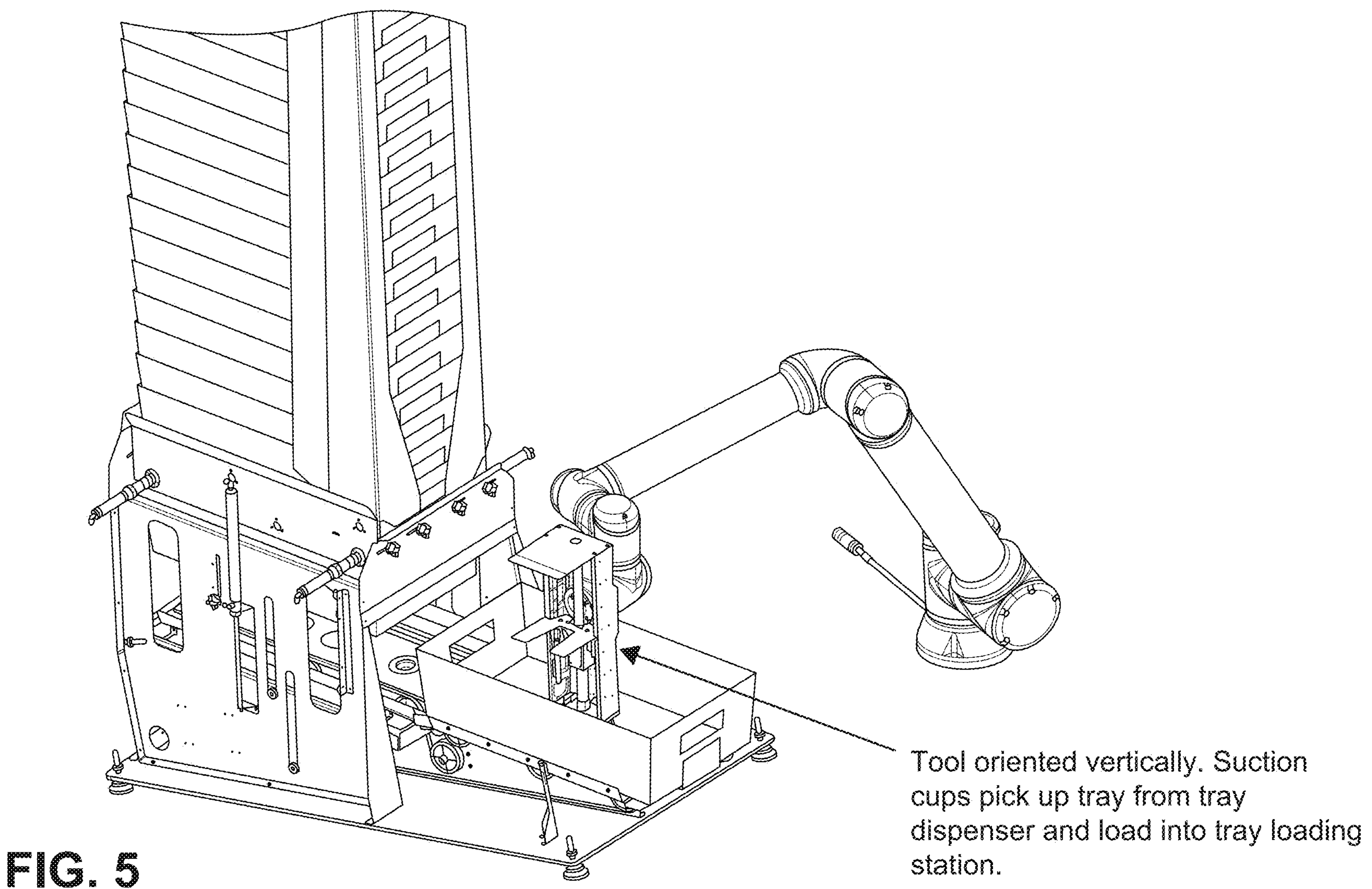
FIG. 5 is a schematic description of the robotic arm picking up the empty tray dispensed by the tray dispensing station.
Figure 6:
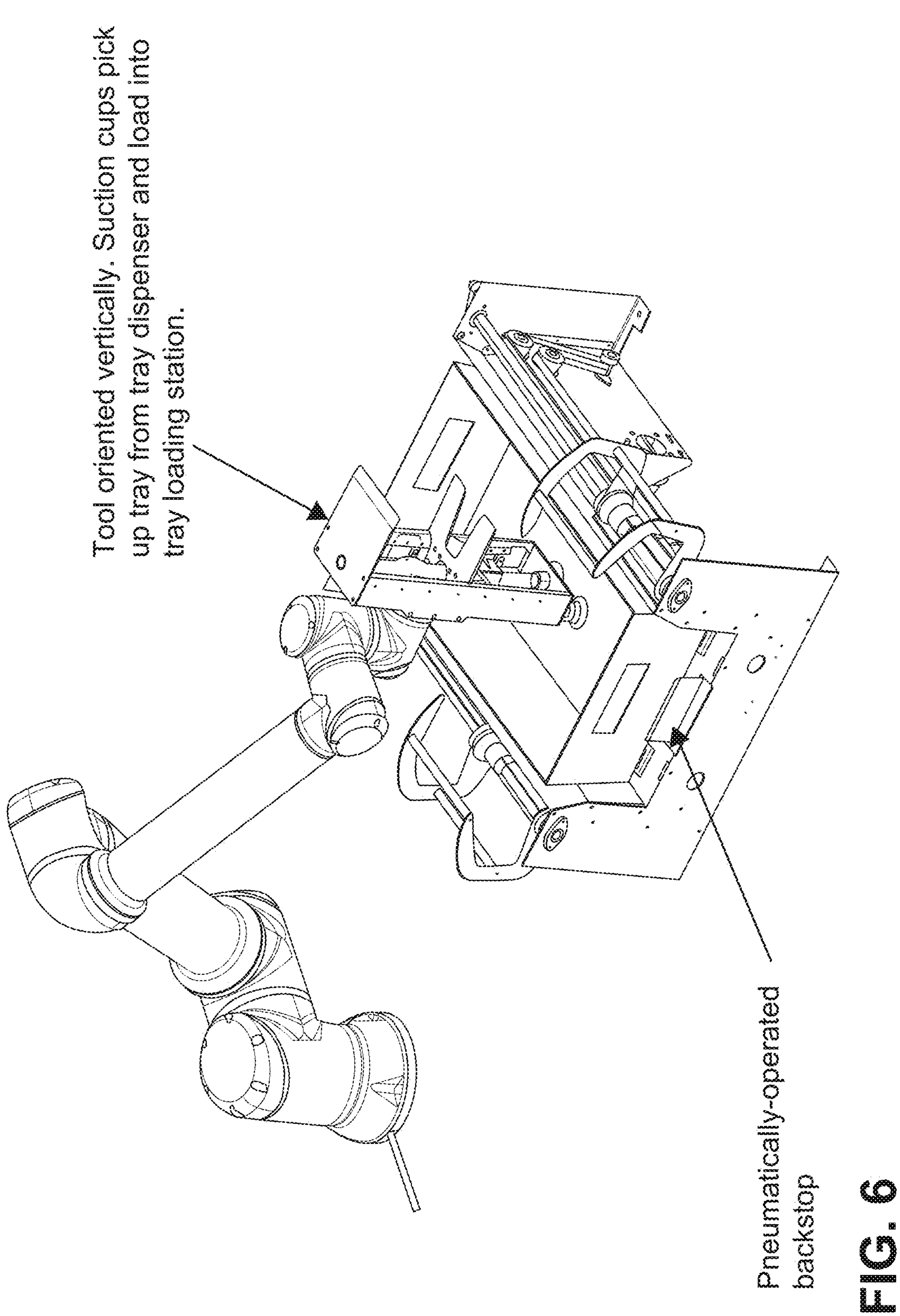
FIG. 6 is a schematic of the robotic arm placing the empty tray on the tray loading station.

FIG. 5 is a schematic of a tray being picked up by the robotic arm using the suction cup(s) at one end of the robotic arm. The robotic arm lifts the single tray that is being dispensed by the tray dispenser. FIG. 6 demonstrates a schematic of the tray that is picked up by the robotic arm at the tray dispenser being placed in the tray loading station. FIG. 6 further demonstrates that once the tray is loaded on the tray loading station, a pneumatically operated backstop at one end of the tray loading station is activated to hold the loaded tray in place while it is being loaded with stacks of finished mail.

Tray Loading Station:

The tray loading station is the module where the stack of finished mail is loaded in the empty tray. In exemplary embodiments, the tray loading stations performs the following functions:

(i) It locates the tray being loaded relative to the robotic arm so that finished mail is dropped into a consistent location on the tray being loaded.

(ii) The tray loading station further comprises backstop that prevents the tray from moving as the tray is loaded. The backstop may be pneumatically operated.

(iii) The tray loading station further comprises one or more retractable bar/hook(s) assembly that: (a) holds the stack of finished mail loaded in the empty tray to prevent mail from being pulled upwards as the tool is removed from the tray, (b) keeps the stack of finished mail loaded in the tray vertical and prevents it from falling over when the tray is partially full, and (c) pushes the loaded mail tray out of the tray loading station and onto an external conveyer belt.

Workflow of the System:

As the first step of the system, prior to beginning production of mail on the inserter, an operator will load a stack of mail trays into the tray dispenser. In certain embodiments, the trays may be loaded in the tray dispenser in an automated system. The tray dispenser has a hopper, so that the trays can be continuously loaded as trays are consumed. Trays are loaded into the hopper by the operator of the machine.

The tray dispenser separates a single tray from the rest of the stack of empty trays from the tray dispenser and presents it such that it can be picked up by the robotic arm. FIG. 3 provides a schematic version of the tray dispenser. As shown in FIG. 3, the tray dispenser houses a stack of empty trays. At the bottom of the tray dispenser is a tray separation zone. The trays are separated in a tray separation zone where a single tray is separated from the rest of the stack of empty trays and presented for being picked up by the robotic arm.

Subsequently, as described in FIG. 4, the single tray is separated from the stack when the tray side clamps are extended, which clamps the second lowest tray in the stack and all the trays above it. Vacuum is applied to two (2) suction cups mounted on a separation plate which is situated below the stack of trays. This causes the bottom most tray to stick to the suction cups. The tray is then move downwards approximately from about 4 to about 6 inches to pull the bottom most tray off the rest of the stack. As the tray reaches its lowest point, the vacuum to the suction cups is turned off, and the separated tray is exposed to a set of moving O-rings. These O-rings will transport the tray out from under the stack and to a tray staging area where it can be picked up by the robot.

FIG. 5 is a schematic of a tray being picked up by the robotic arm using the suction cup at one end of the robotic arm. The robotic arm lifts the single tray that is being dispensed by the tray dispenser. FIG. 6 demonstrates a schematic of the tray that is picked up by the robotic arm at the tray dispenser being placed in the tray loading station. FIG. 6 further demonstrates that once the tray is loaded on the tray loading station, a pneumatically operated backstop at one end of the tray loading station is activated to hold the loaded tray in place while it is being loaded with stacks of finished mail.

FIG. 5 and FIG. 6 further show the gripper, which is attached to an end of the robotic arm. The gripper may include two paddles. In certain embodiments, one paddle is fixed or stationary while the other paddle is sliding. In certain embodiments, both paddles may be sliding. The sliding paddle(s) may be actuated by an air cylinder. In other embodiments, the sliding paddle(s) could be actuated by any other linear actuator. An example of a linear actuator is a motor with a lead screw or slide with a timing belt. The gripper may additionally comprise a distance sensor to allow the system to measure the length of the stack of the mail being picked up by the gripper.

Additionally, or alternatively, the given length of a stack of mail picked up by the tool can be determined by first measuring the distance between a motorized paddle and a stack head, and then subtracting said distance from a measured distance between the tool and the stack head. The resulting measurement can be taken after applying a force from the paddle towards the tool, such that the mail is compressed, and the compressed length of the stack is measured.

Once the tray is placed in the tray loading station, the robotic arm/gripper is programmed to wait until a sufficient amount of mail is present on the belt of the OES before it starts to pick up the stacked finished mail. For example, the robotic arm may wait for about 20 to about 40 inches of stack of mail before starting to pick up the finished mail and placing it on the tray in the tray loading station. Advantageously, this allows the glue of the freshly sealed flaps of envelopes in the finished mail to set prior to disturbing it with the tool of the robot. At this point the robot will orient the tool at an angle so that only a corner of the tool's paddle contacts the top of the stack. This allows it to 'knife' into the stack to grab a section of the mail stack.

Figure 7:
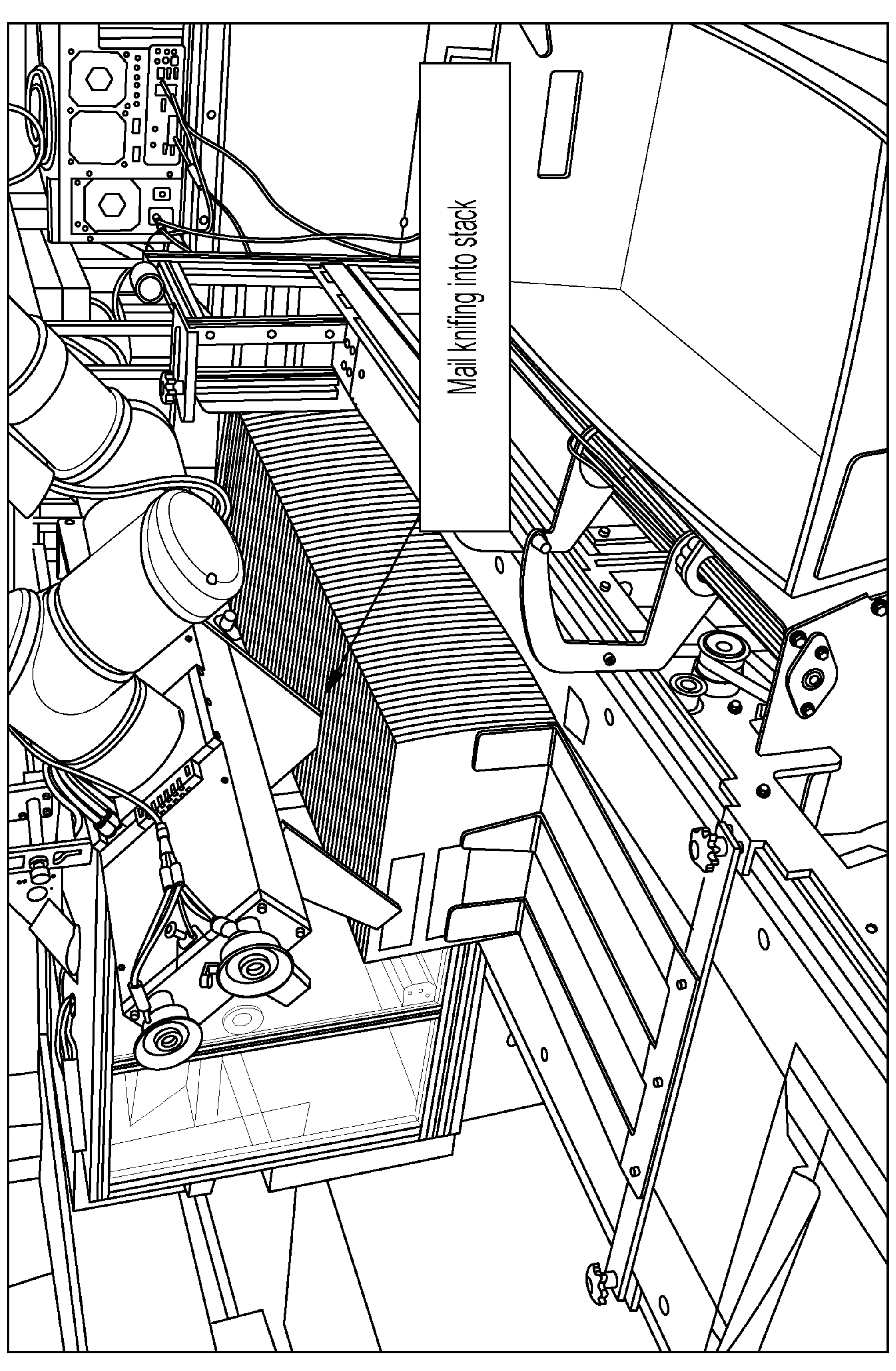
FIG. 7 is an image of the gripper inserting in mail placed on the edge stacker.
Figure 8A:
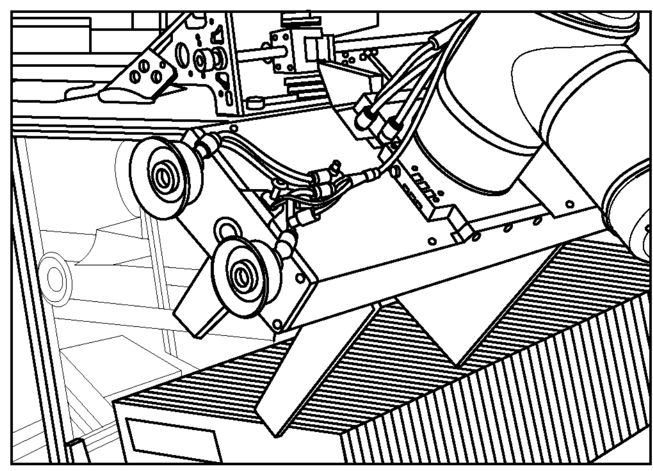
FIGS. 8A, 8B, and 8C include a series of images demonstrating the insertion of the gripper in the stack of finished mail on the edge stacker.
Figure 8B:
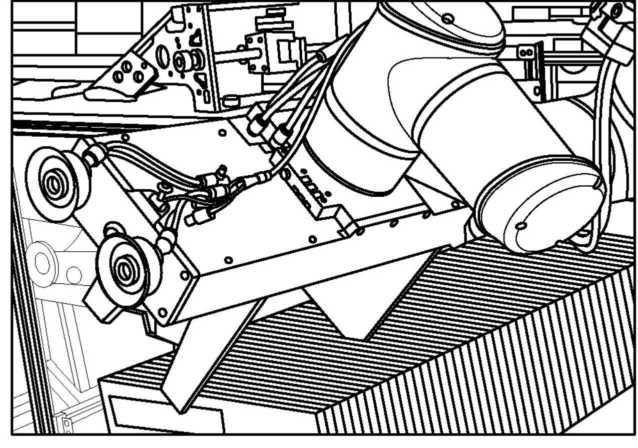
Figure 8C:
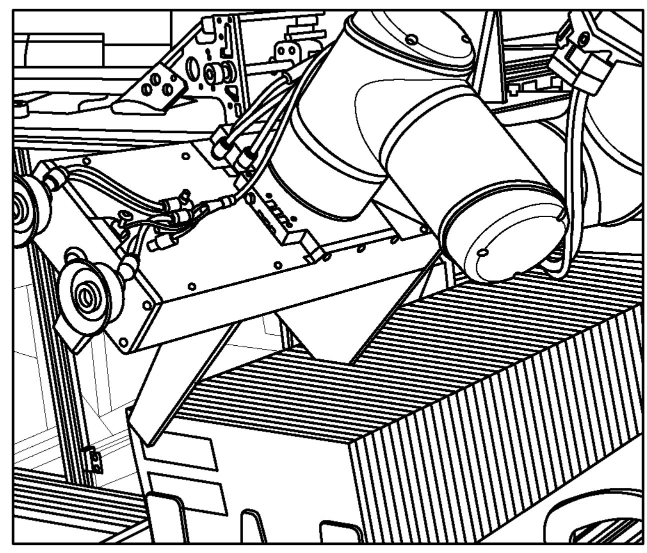
Figure 9A:
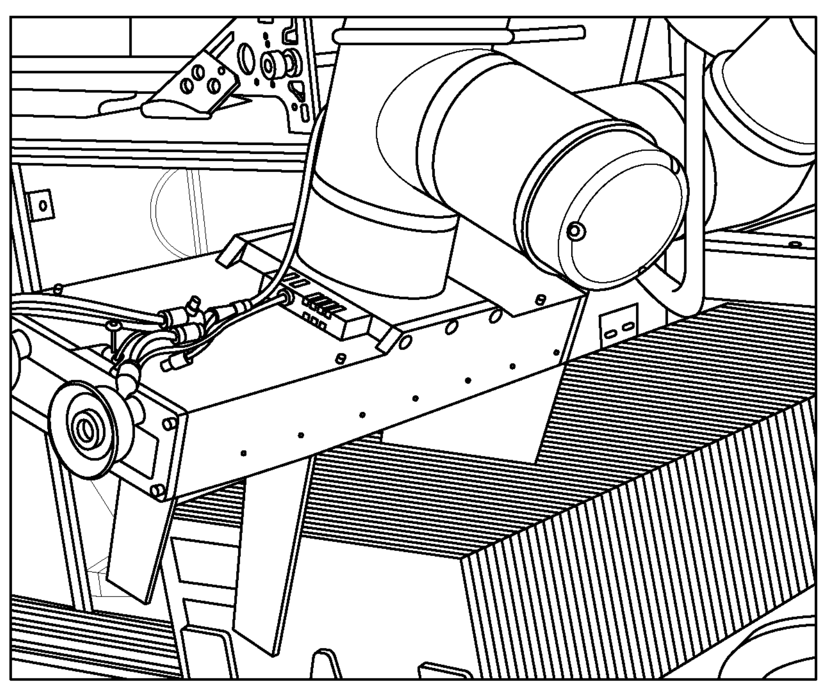
FIGS. 9A and 9B are images of sliding paddle in the gripper sliding inward toward the edge of the stacked finished mail.
Figure 9B:
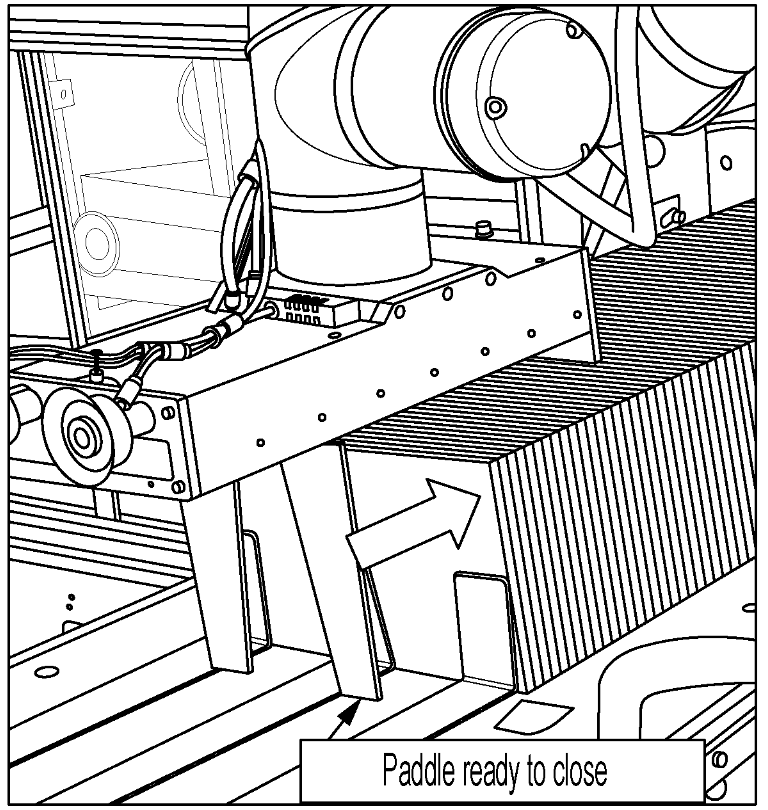
Figure 10:
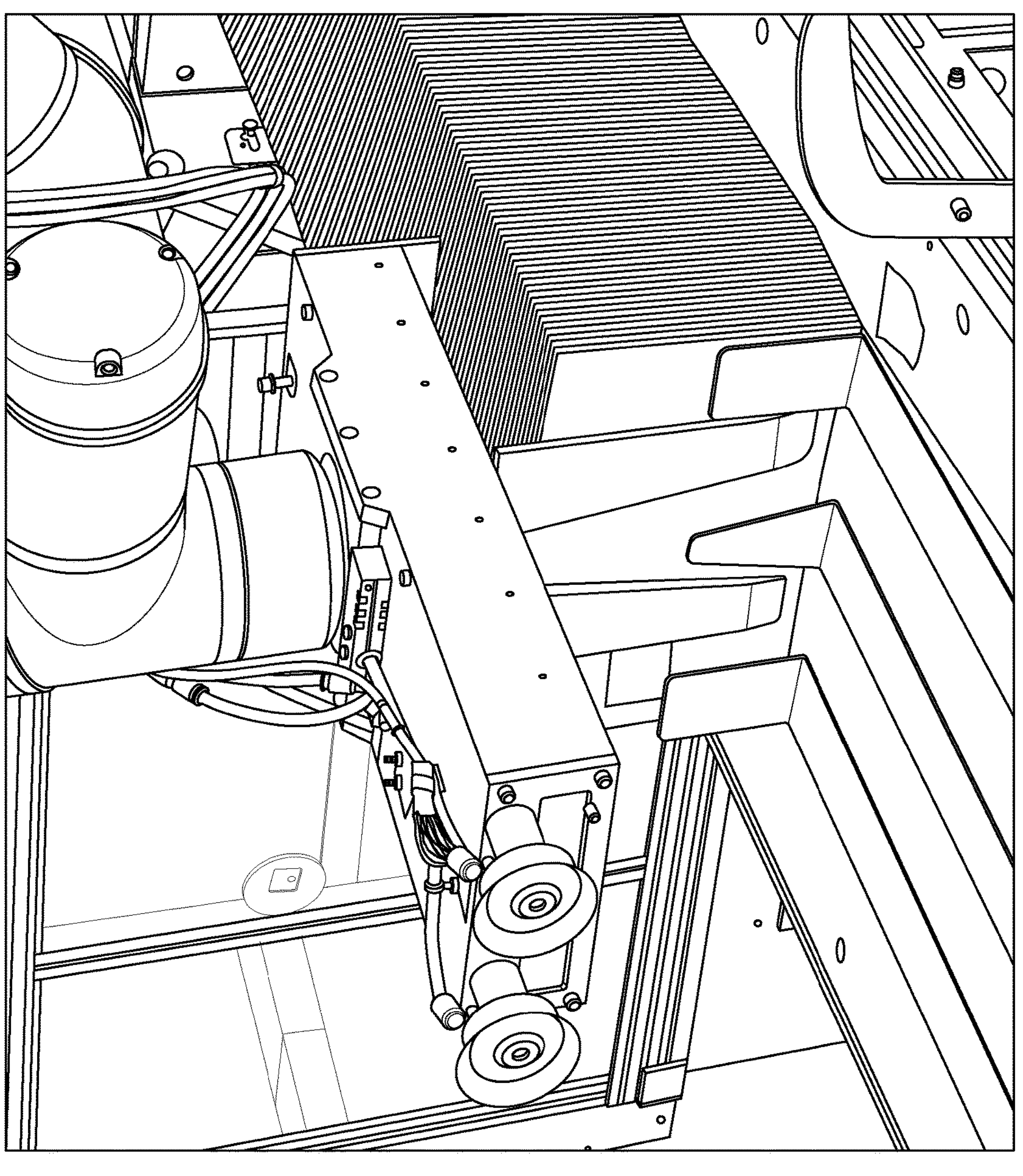
FIG. 10 shows an image of the sliding paddle of the gripper closed to pick up the stack of finished mail from the edge stacker.
Figure 11:
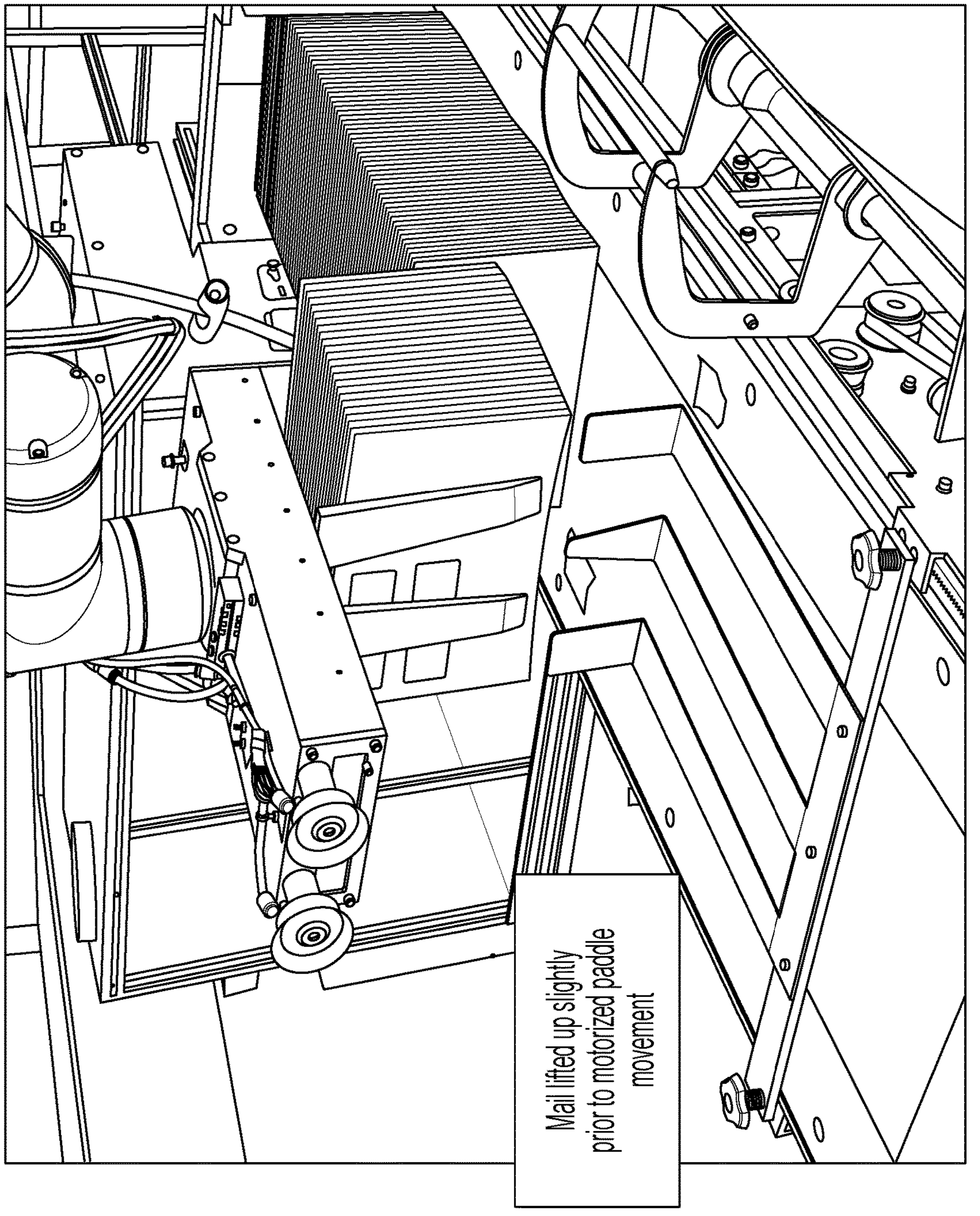
FIG. 11 is an image of the stack of finished mail being lifted by the gripper.

FIG. 7 is an image of a gripper, at the end of robotic arm, being lowered at an angle to pick up the stack of finished mail on OES. FIGS. 8A, 8B, and 8C provide additional sequential images of the gripper being lowered at an angle into the stack of finished mail on OES. FIGS. 9A and 9B are images of the gripper being further lowered in the stack of finished mail on OES. Notably, in FIG. 9B, once the gripper is lowered all the way through the stack, the angle of the gripper is vertical as compared to the stack of finished mail on OES. At this point, the sliding paddle on the gripper is ready to slide inward toward the stack of finished mail to pick up the stack of finished mail between the sliding paddle and the stationary paddle. FIG. 10 is an image of the sliding paddle closed on the stack of finished mail. The stack is lifted by the gripper to a small height. The height is such that the stack of finished mail that is being lifted has some overlap with the stack of finished mail remaining on the OES. In certain embodiments, the gripper lifts the stack of finished mail from about 40 to about 80 mm, preferably about 60 mm, and the motorized paddle on the stacker is moved to support the mail that remains on the OES belt. FIG. 11 is an image providing the example of mail being picked up by the gripper. Notably, because the mail is only lifted partially, it allows the motorized paddle on OES to move toward the remaining stack of finished mail before the knifed stack is completely lifted. This is advantageous because the remaining stack of finished mail remains vertical and does not fall down upon picking up the stack held by the gripper. In certain embodiments, during the time while the tool is stationary and supporting the weight of the picked mail, force sensors in the robotic arm are used to measure the weight of the mail that has been lifted. This weight measurement is collected for each pick for each of the tray being filled and the sum of the data is the entire weight of mail placed into the tray. The total tray weight can then be validated against the expected weight that the inserter is expecting to ensure that mail being sent had the correct amount of postage based on its weight.

Figure 12:
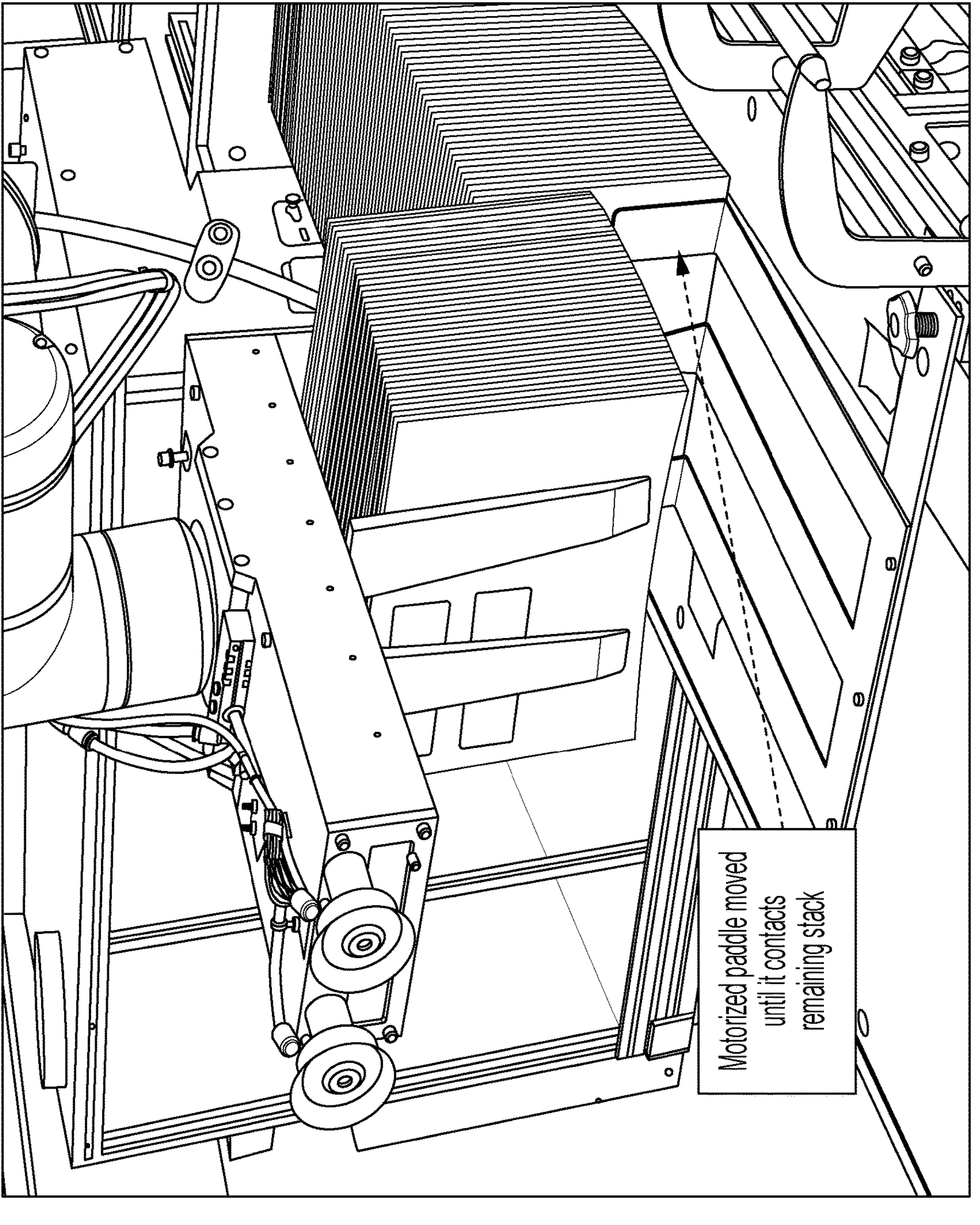
FIG. 12 is an image showing the paddle on the edge stacker moving until it makes contact with the remaining stack of mail after the gripper picks up a stack of finished mail.
Figure 13:
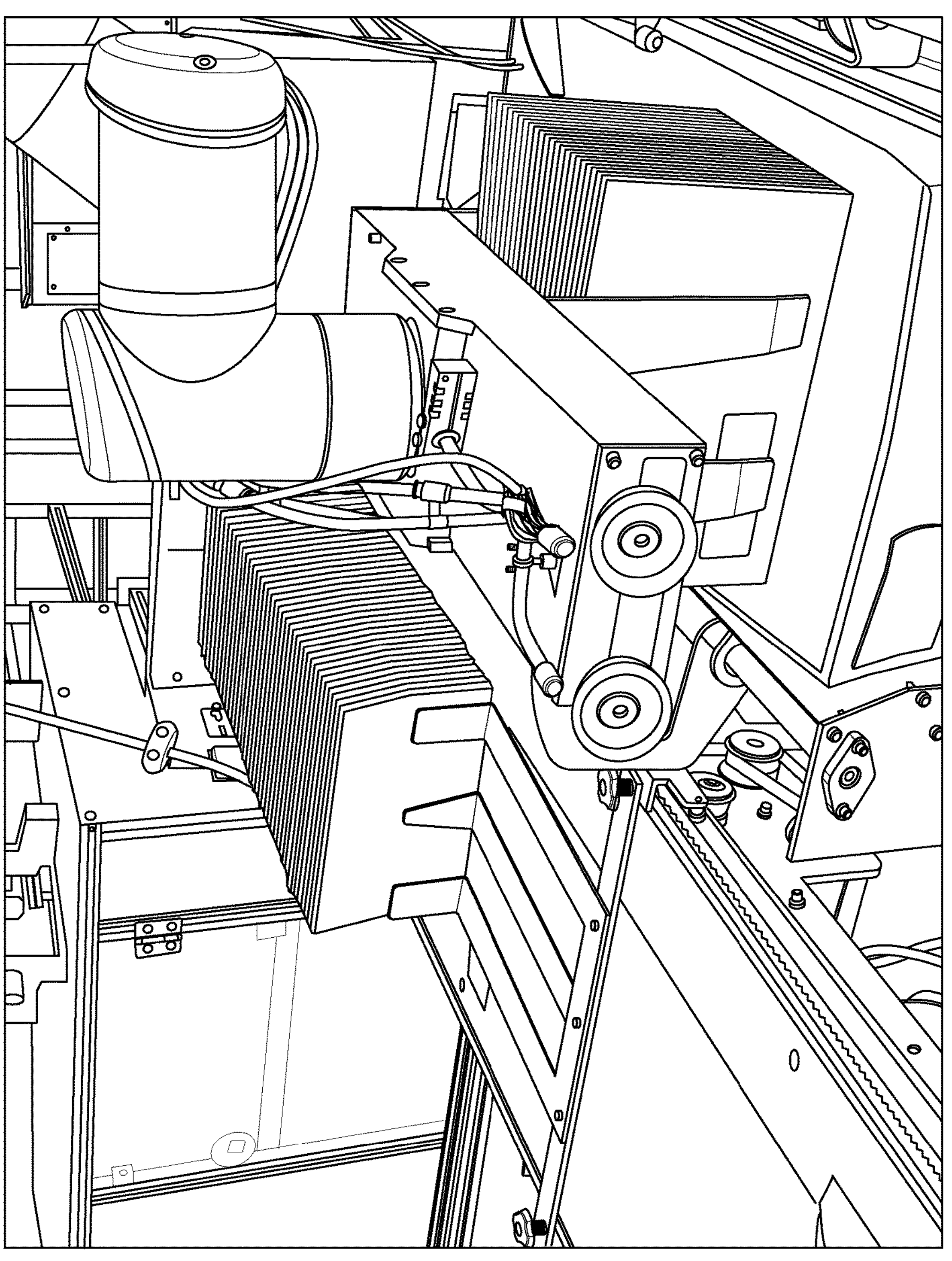
FIG. 13 is an image of the stack of the finished mail being lowered in the empty tray by the gripper.

FIG. 12 is an image showing the motorized paddle on OES being pushed in OES once the mail is partially picked up. Once the motorized paddle is aligned with the remaining stack of finished mail on the OES and the stack is supported by the motorized paddle, the gripper picks up the stack of finished mail and places it on the tray in the tray loading station. FIG. 13 demonstrates the mail being lowered in the tray in the tray loading station.

Figure 14:
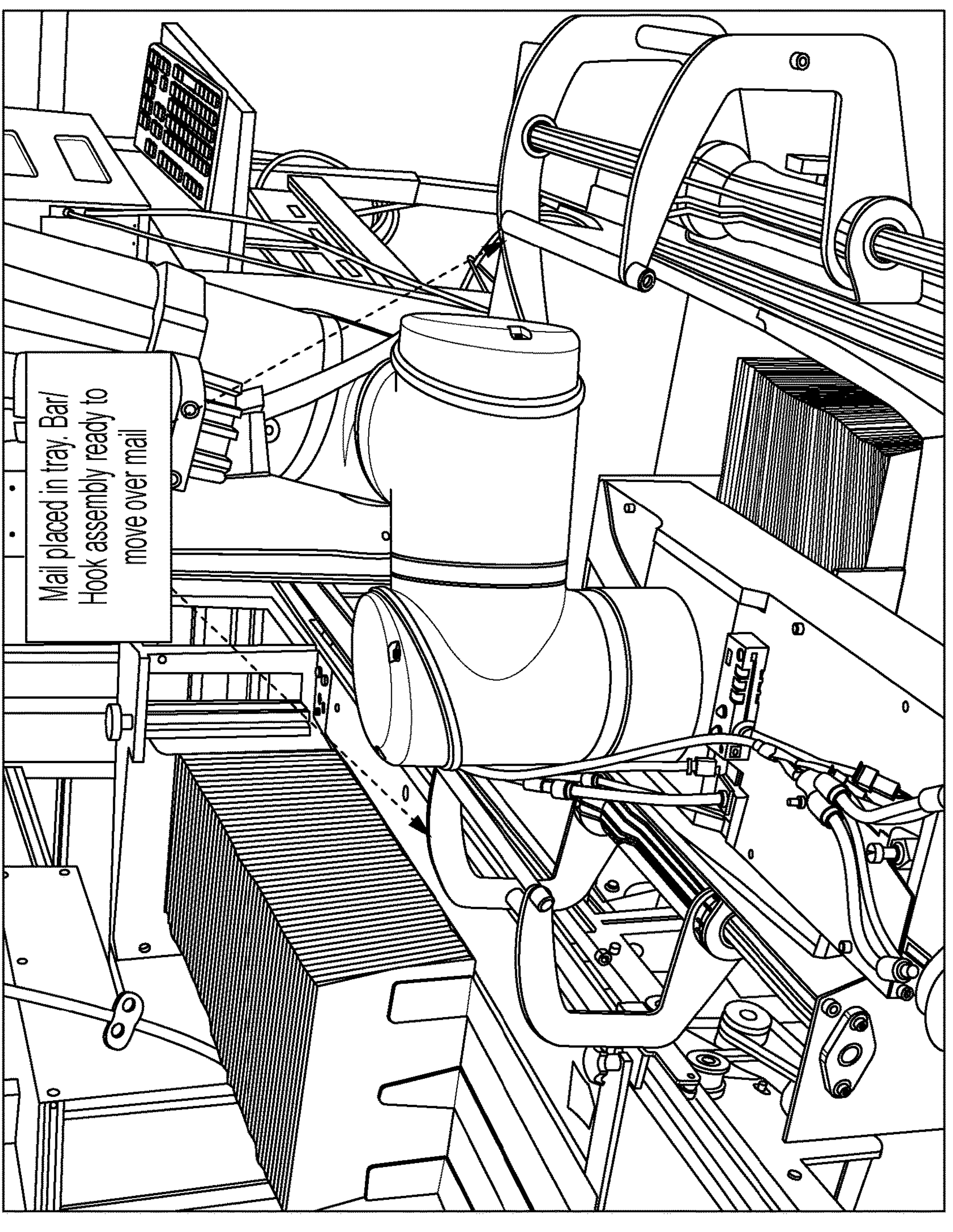
FIG. 14 is an image of the stack of finished mail being placed in the empty tray.
Figure 15:
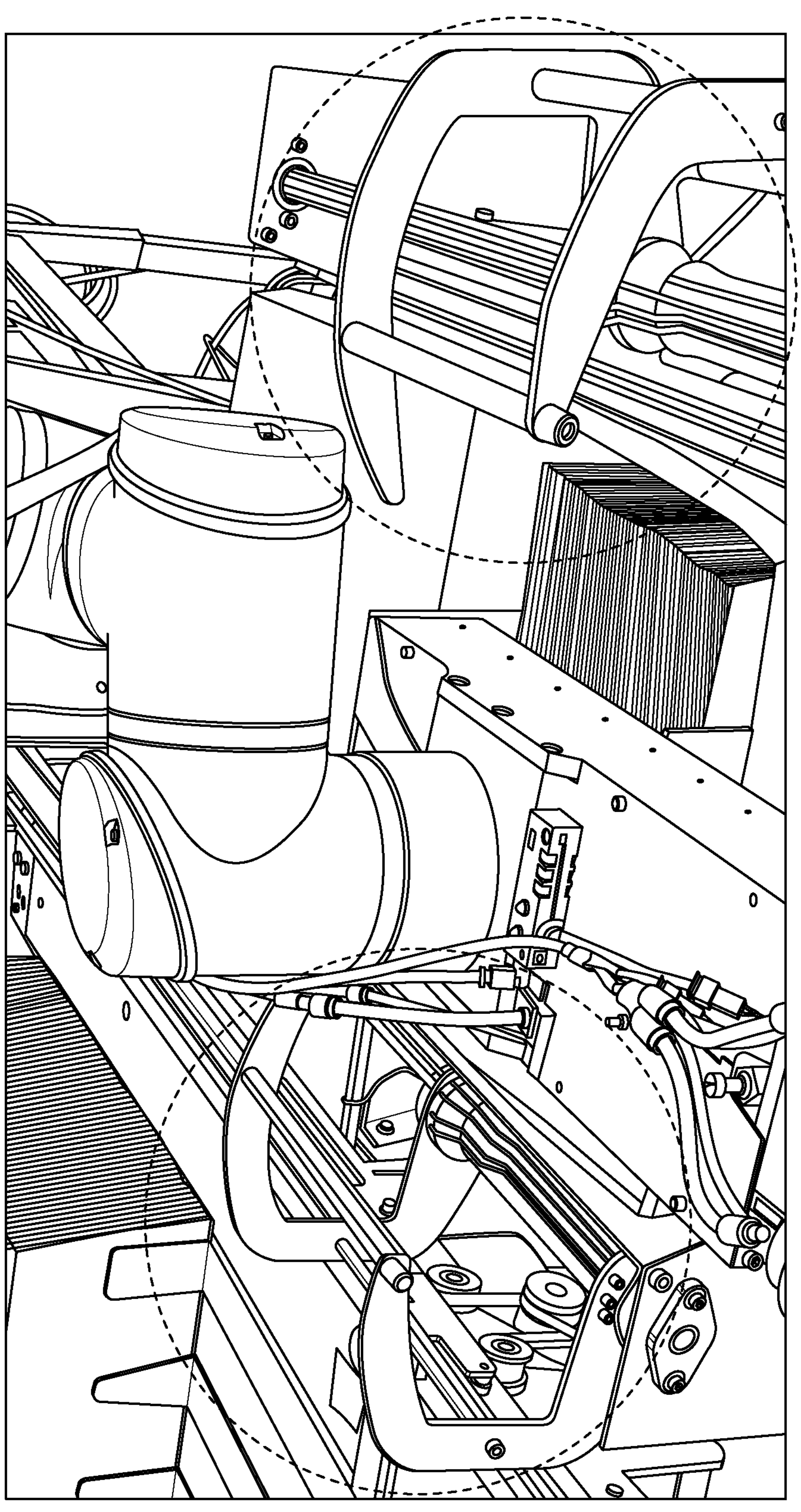
FIG. 15 is an image highlighting the loading station retractable bars and retractable hook set up that will be lowered on the stack of finished mail placed in the tray.
Figure 16:
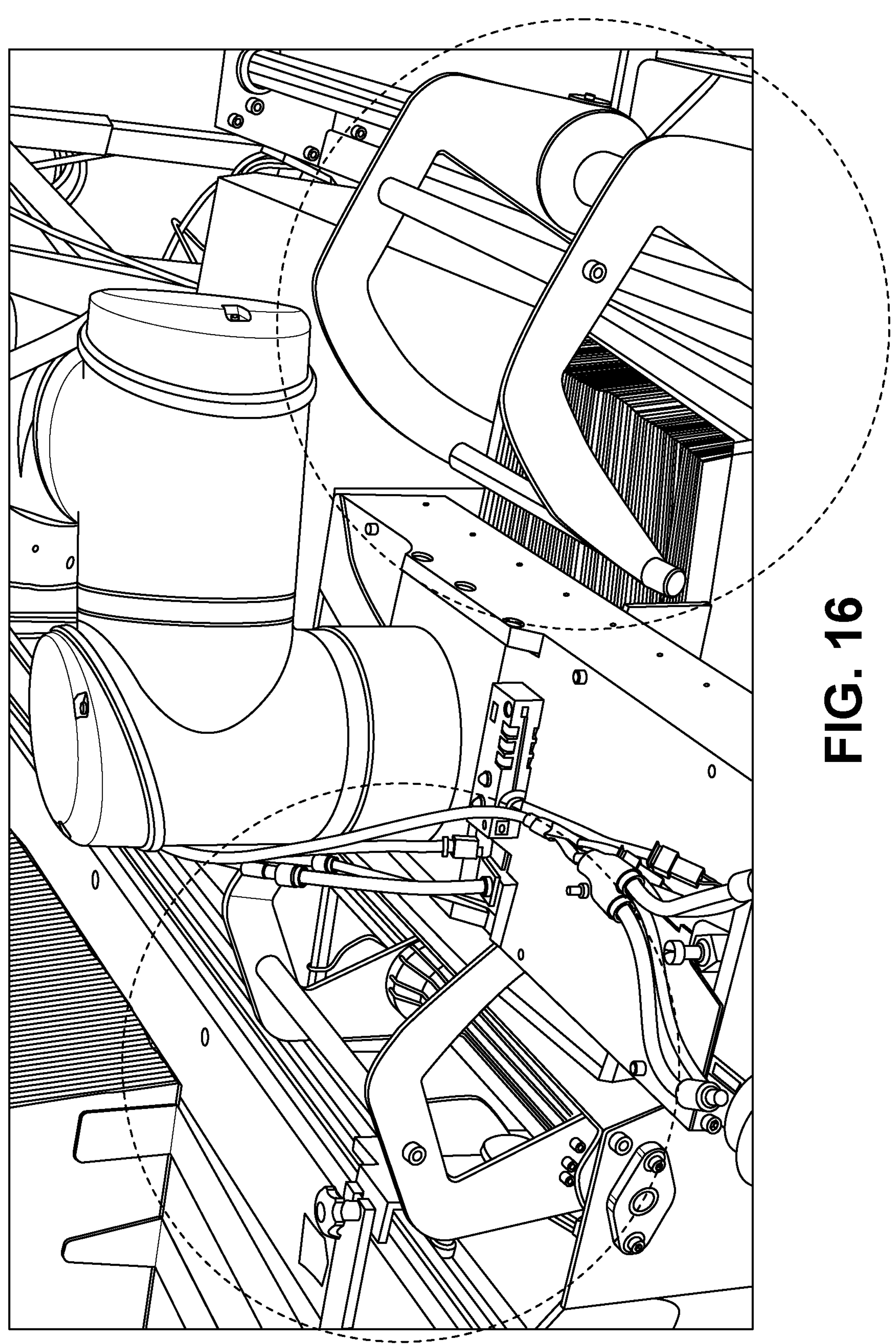
FIG. 16 is an image of the stack of finished mail in the tray being held vertically by the retractable bars and retractable hook set up on the tray loading station.

FIG. 14 and FIG. 15 provide images of the bar/hook(s) assembly ready to be placed upon the stack of finished mail in the partially filled tray. In certain embodiments, the tray loading station has a plurality of bar and hook(s) assembly. In other embodiments, the tray loading station may include a single bar and hook assembly. In exemplary embodiments, the tray loading station may include two (2) bar and hook(s) assembly. The bar in the assembly is beneficial to hold the mail down as the gripper releases the finished mail in the tray and rises up to pick up the next stack of finished mail. The hook(s) in the retractable bar and hook(s) assembly keeps the stack of mail in the tray vertical and prevents it from falling over inside the tray. FIG. 16 provides an image of bar and hook(s) assembly lowered on the stack of mail in the tray while the mail is simultaneously being held by the gripper.

Once the bar and hook(s) assembly in the tray loading station is in place on the stack of mail being placed in the tray, the air pressure is relieved from the gripper, which removes the clamping force in the tool. The robotic arm then lifts the tool straight up to remove the gripper paddles from the stack of mail inside of the tray. The bar in the retractable bar and hook(s) assembly prevents the stack of finished mail placed in the tray from being lifted when the gripper is withdrawn from the tray.

Preferably, the tray will be completely filled with stack of finished mail in about 2 to about 6 cycles. In certain embodiments, the tray will be completely filled with stack of finished mail in about 2 to about 4 cycles. Each pick cycle is a cycle of one pick from the OES belt and one drop to the tray in the TLS.

The gripper tool in the robotic arm may have maximum opening of about 10 inches to about 20 inches, and, more preferably approximately 14 inches. Preferably, the gripper tool will have an opening of about approximately 10 inches. To provide some margin, the system operating the gripper may be provided instructions to pick up the stack of finished mail that is lower than the maximum opening of the gripper. For example, if the maximum opening of the gripper is about 10 inches, the system is set to pick up approximately 9 inches of finished mail. This is referred to as the ‘pick length.’ When the gripper is closed onto the stack of the finished mail on the OES, the mail will be compressed to a new distance because of the force applied by the gripper, herein called the ‘drop length’.

In certain preferred embodiments of the invention, a distance sensor may also be incorporated into the system, from which the distance between the gripper paddles can be determined accurately within a few millimeters. The distance sensor may be included in the gripper of at any other location in the system.

As the stack of finished mail is placed into a tray, the software operating the system will keep track of the sum of the ‘drop lengths’, which is an accurate measurement of the amount of compressed mail that is in the tray. It also keeps track of the total ‘pick length’ which is the length of mail that is picked up from the OES belt. After each drop, the software computes a ‘mail compression factor’ which is the total drop length divided by the total pick length. The formula for computing the mail compression factor is provided below:

Mail compression factor=total drop length/total pick length

Thus, a mail compression factor of 1.0 will mean that the mail did not compress at all and a mail compression factor of 0 will theoretically indicate that the stack compressed to zero length. The actual amount of mail compression is highly variable and very difficult to compute ahead of time. The factors affecting the stack compressibility include, but are not limited to, page count, fold type, envelope size, paper thickness, number of inserts, and thickness, and the amount of air blown into the envelope during the insertion process. In the preferred embodiments, of the invention, the compression factor may range from about 0.9 to about 0.4. This indicates that in certain embodiments, the stack of finished mail can sometimes compress to less than half of its length on the OES. This is particularly advantageous from an operational standpoint because the trays are filled with high density of finished mail, as this reduces the volume in the tray that a given amount of finished mail will consume, resulting in fewer pallets and truck space required, and ultimately saving costs and increasing economic efficiency.

There are additional advantages of the system measuring the drop length. As explained herein, this also results in optimal utilization of the length of the tray. The software also computes the space remaining inside of the tray using the following formula after each round of stack of finished mail being dropped in the tray:

Space remaining in tray=tray length−total drop length

Prior to each pick after the first pick, the software will compute the maximum pick length using the compression factor computed for all prior cycles.

Maximum pick length=space remaining in tray/mail compression factor

When the maximum pick length computed is less than the amount of mail that the gripper can physically fit, it indicates that the tray only has room for one more batch of mail, and that the last batch will be smaller than the prior batches. By using the computed compression factors from all prior batches of mail, the software is predicting how much mail it can grab for the last pick so that the tray is filled to maximum density and capacity by utilizing the total length of the tray.

Figure 17:
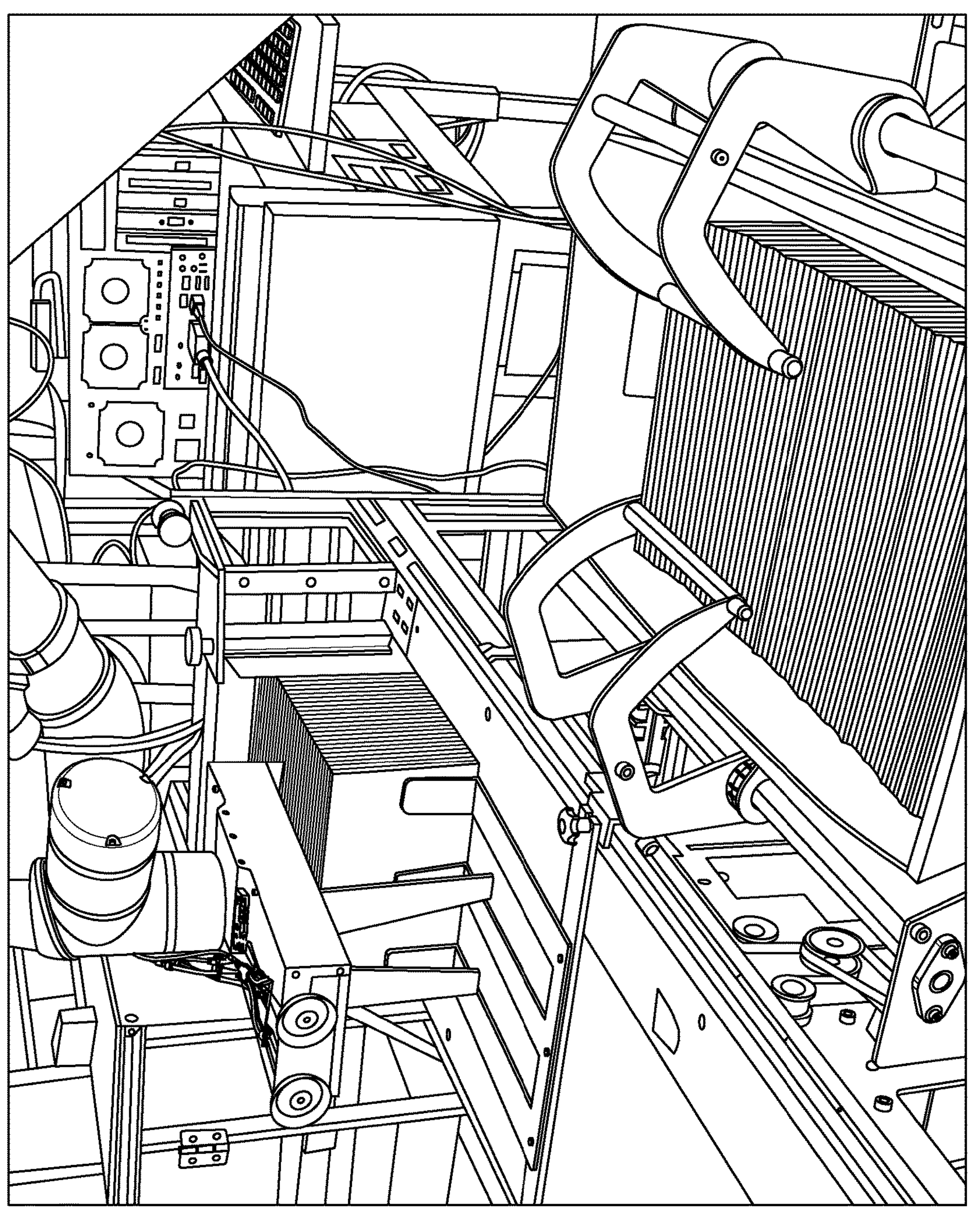
FIG. 17 is an image of a partially filled tray with stacked finished mail being held in place by the retractable hooks and retractable bars from the tray loading station.

For example, the image in FIG. 17 shows that the software has computed a maximum pick length that is less than the maximum physical grip length. It is performing a ‘pick’ of roughly 6 inches. The pick of 6 inches is lower than the drop length of the picks of stacks of finished mail in the previous cycles.

Figure 18:
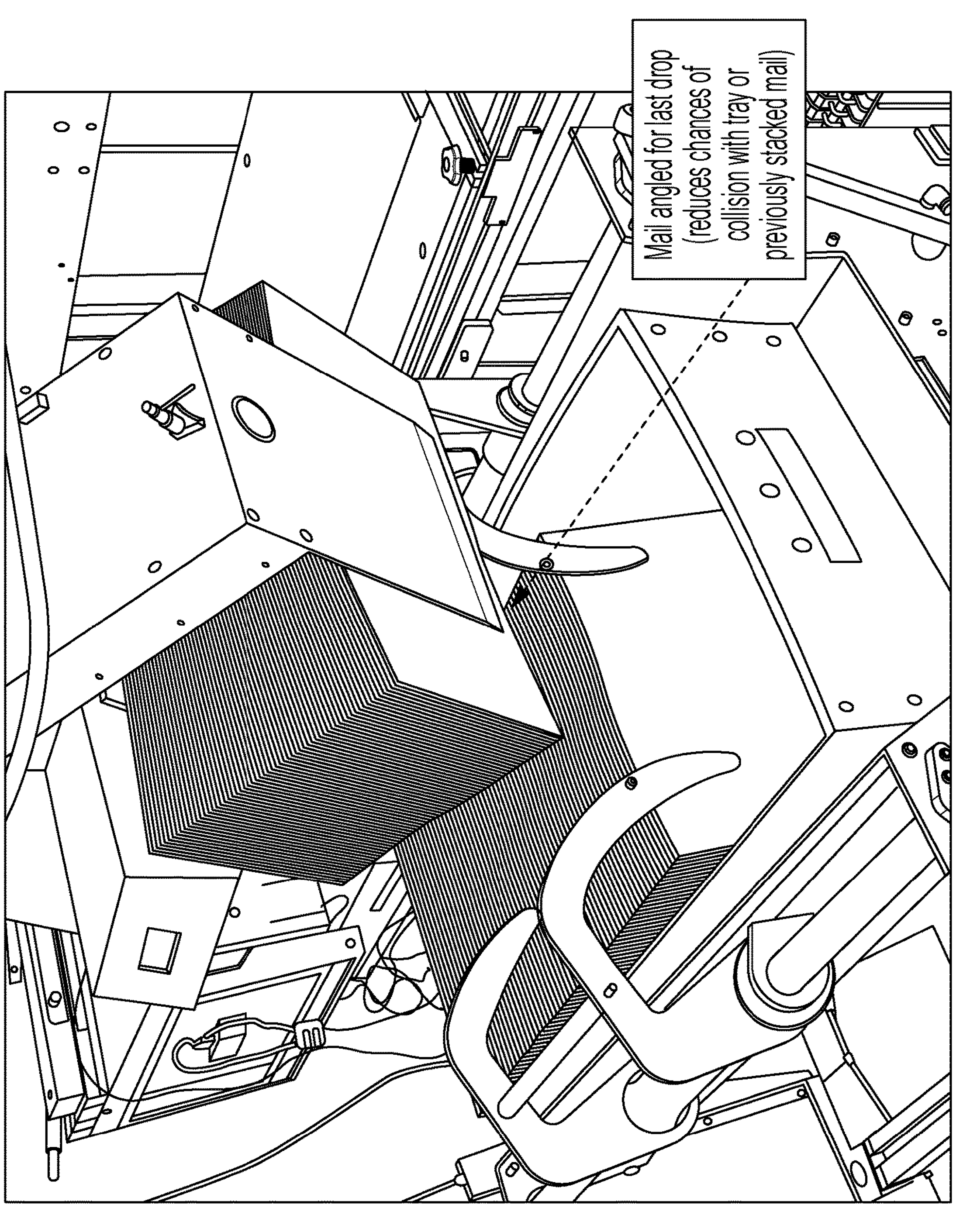
FIG. 18 is an image of the last stack of finished mail being lowered in the partially filled tray.
Figure 19:
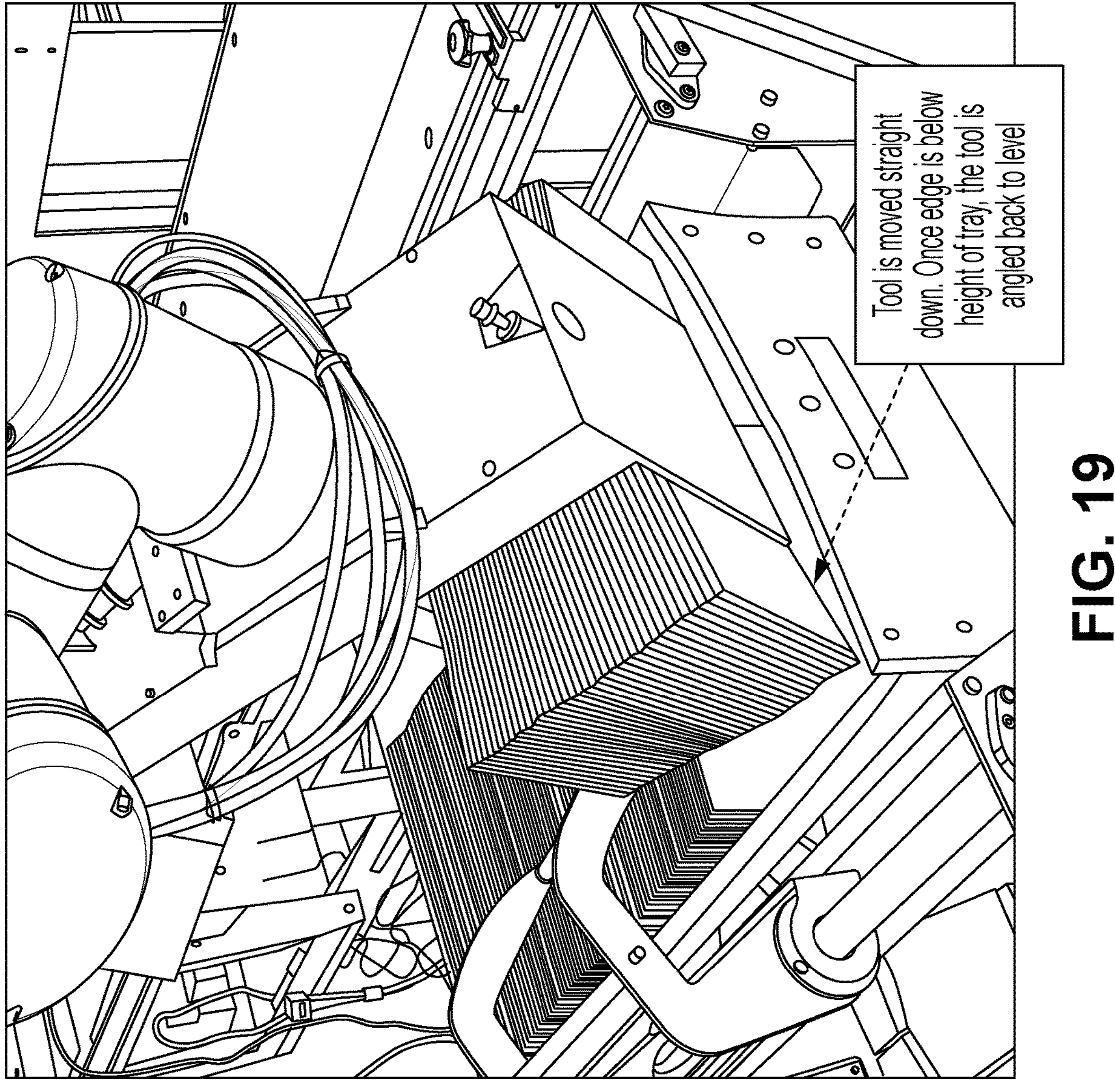
FIG. 19 is an image of the last stack of finished mail being lowered in the partially filled tray.
Figure 20:
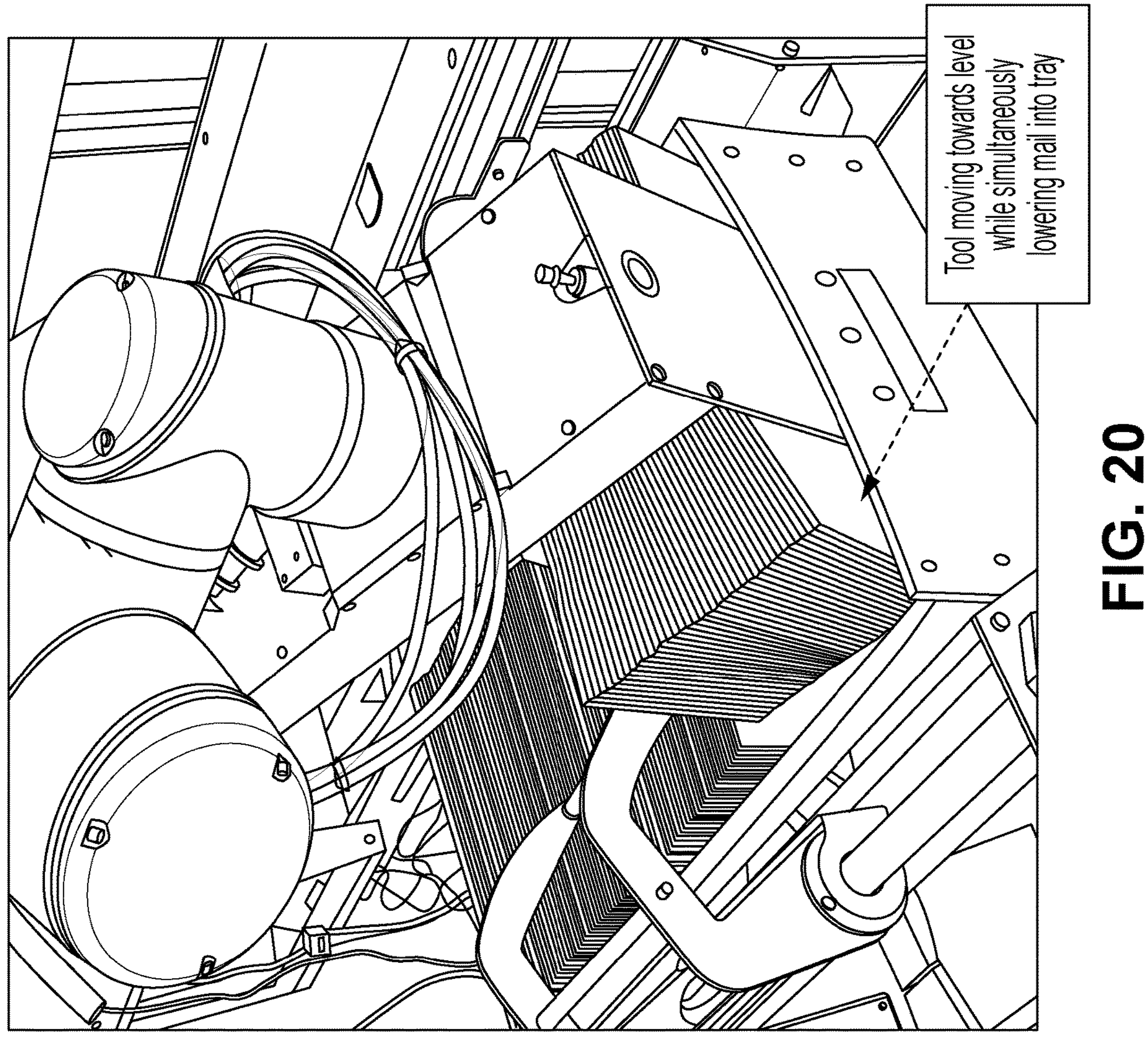
FIG. 20 is another image of the last stack of finished mail being lowered in the partially filled tray.
Figure 21:
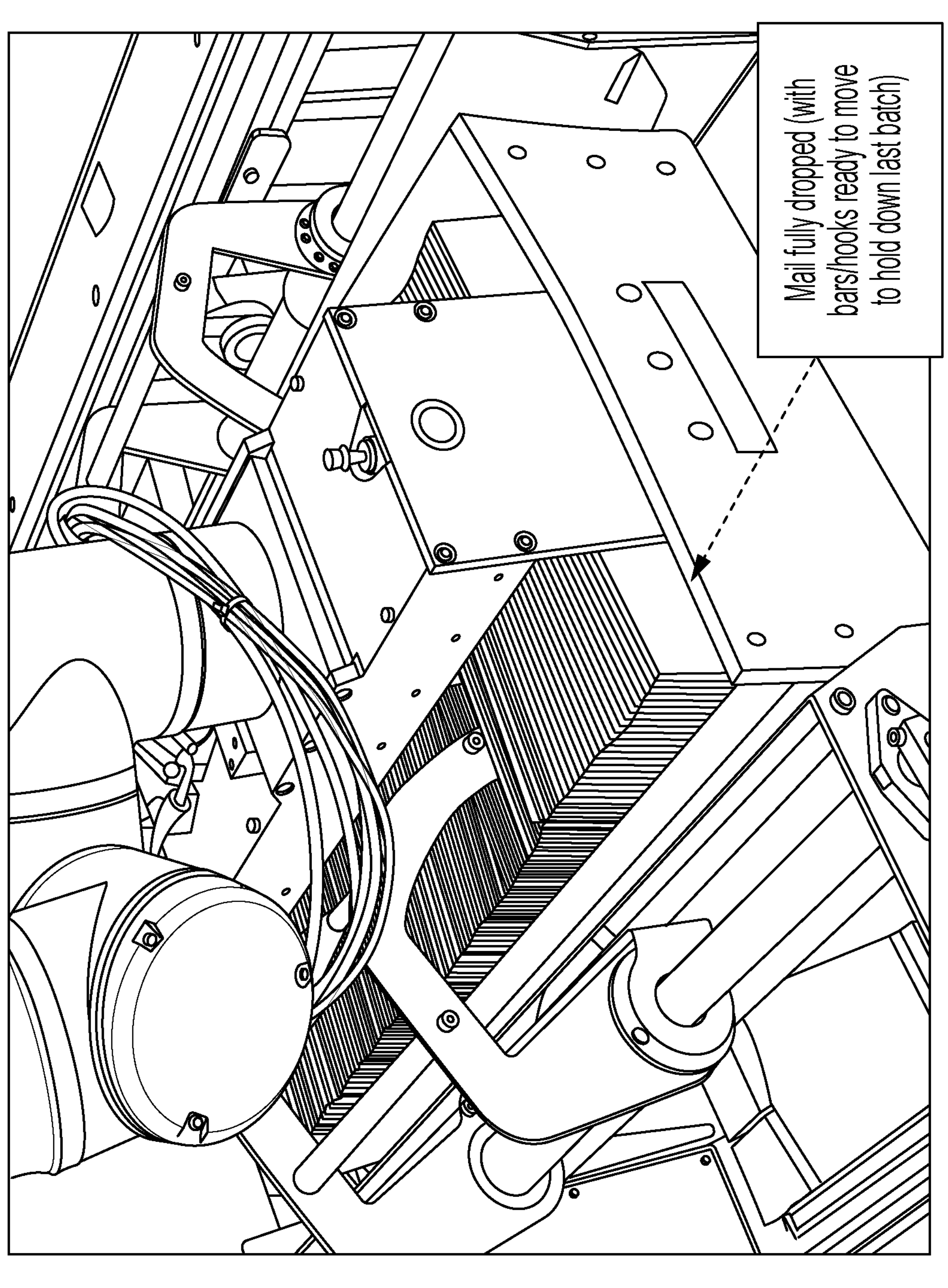
FIG. 21 is an image of the last stack of finished mail for the tray lowered in the tray.
Figure 22:
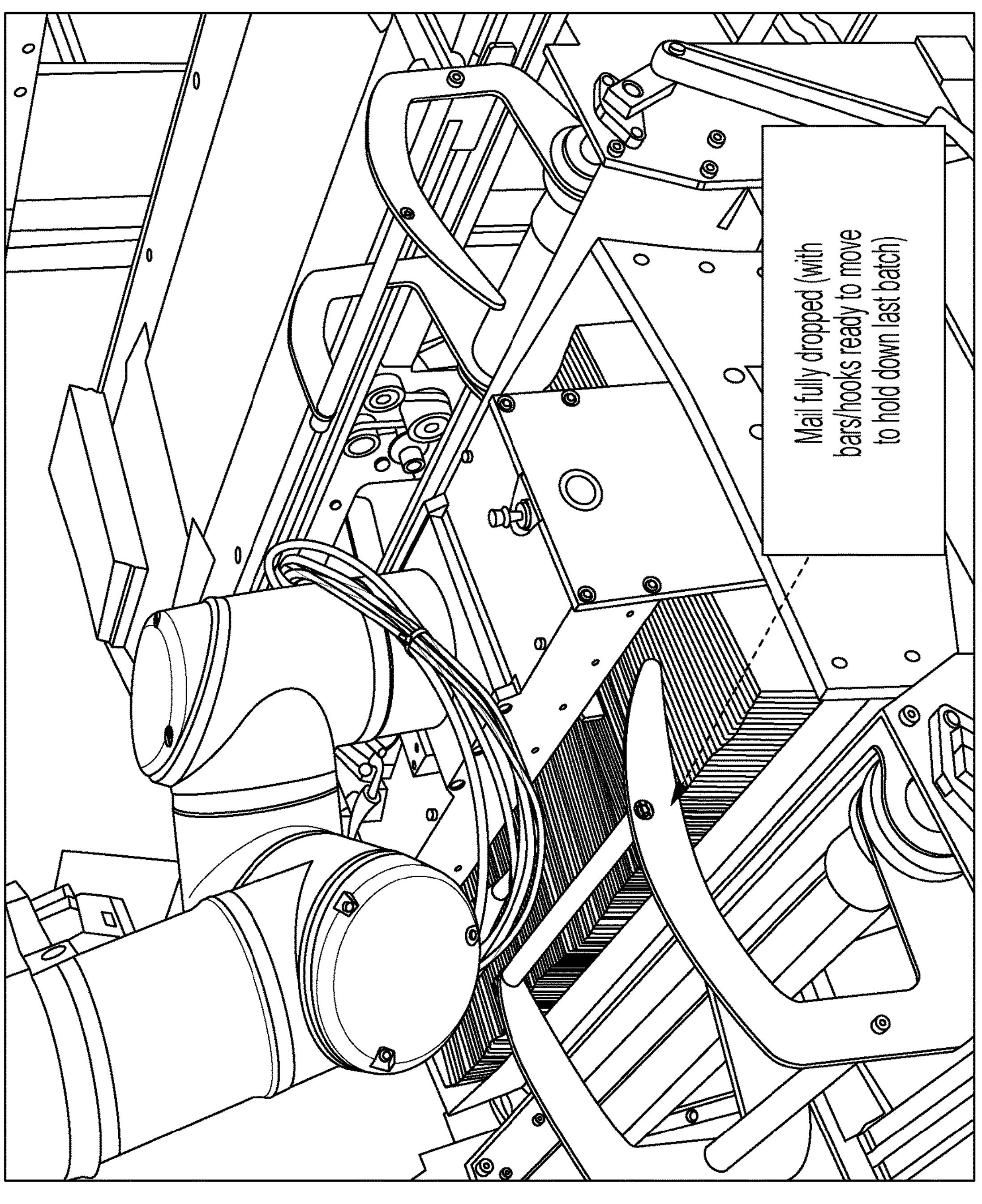
FIG. 22 is an image demonstrating the movement of the retractable bar and retractable hook assembly on the tray loading station being lowered on the last stack of finished mail in the tray before the gripper is disengaged.

Once the last stack of finished mail for the tray being loaded is picked up from the OES belt, the robot will place the mail into the tray. For all drops of stacks of finished mail except for the last one, there is plenty of room to place the finished mail into the tray without any chance of collision with the tray or any other part of the tray loading station since the end of the mail tray is several inches away and colliding with it is not a concern. However, for the last drop of stack of finished mail for the tray, the robot must avoid the previously dropped mail as well as the end of the tray. As shown in FIG. 18, to provide more clearance to the gripper, the gripper is angled, which reduces the horizontal length of the stack. Furthermore, as shown in FIG. 19 and FIG. 20, once the edge of the stack of mail gets below the height of the tray, the gripper tool, which is angled so far, is straightened so that the rest of the drop is proceeded vertically, i.e., the remainder of the stack of finished mail is placed straight downward in the tray. As shown in FIG. 21 and FIG. 22, once the stack of mail is lowered in the tray, the retractable bar and hook(s) assembly in the tray loading station is moved down on top of the placed stack of finished mail, but this will be done in a manner such that the hooks are positioned outside the tray.

Figure 23:
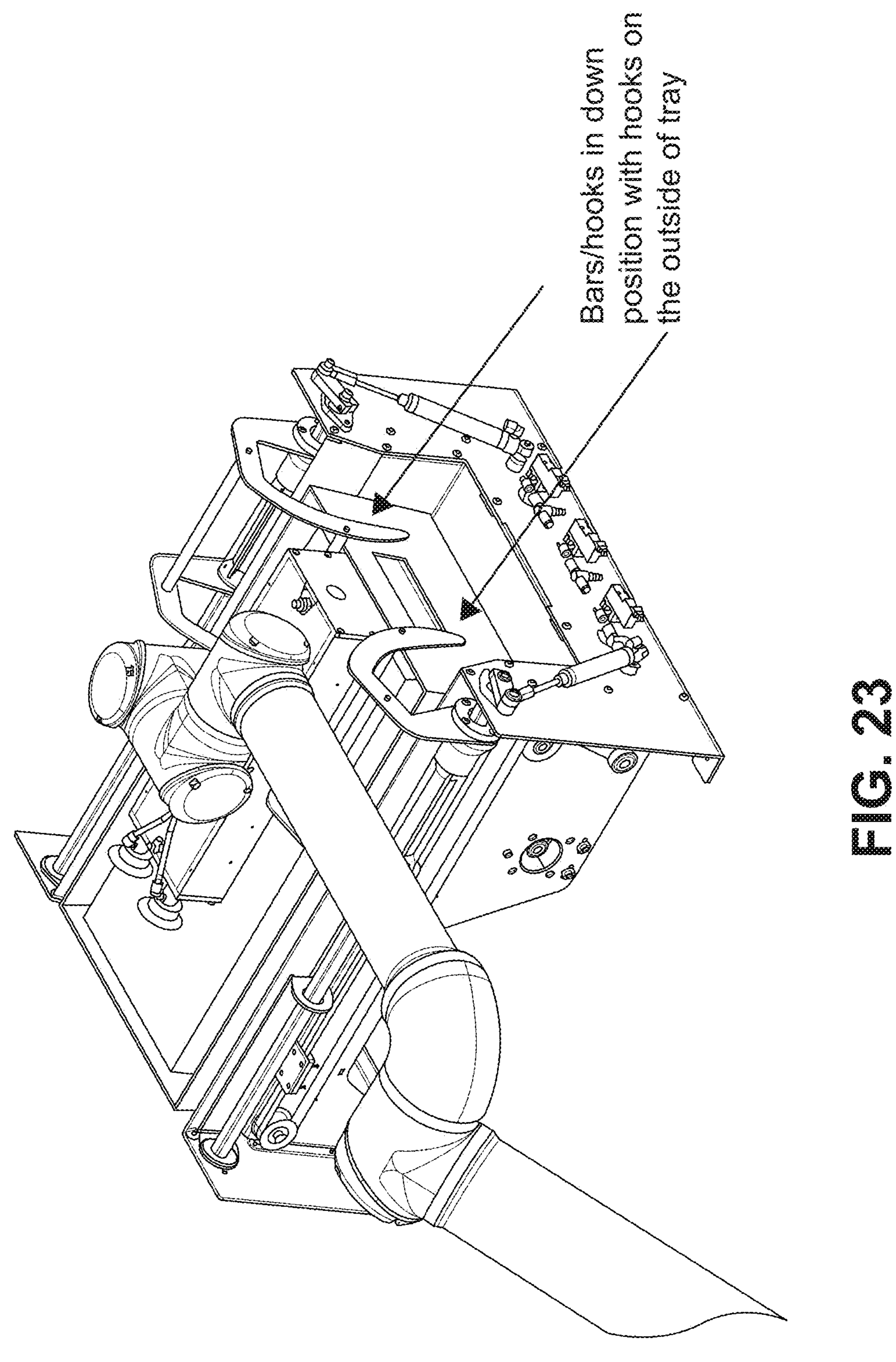
FIG. 23 is a schematic demonstrating the retractable hooks engaging with the tray with the finished mail.
Figure 24:
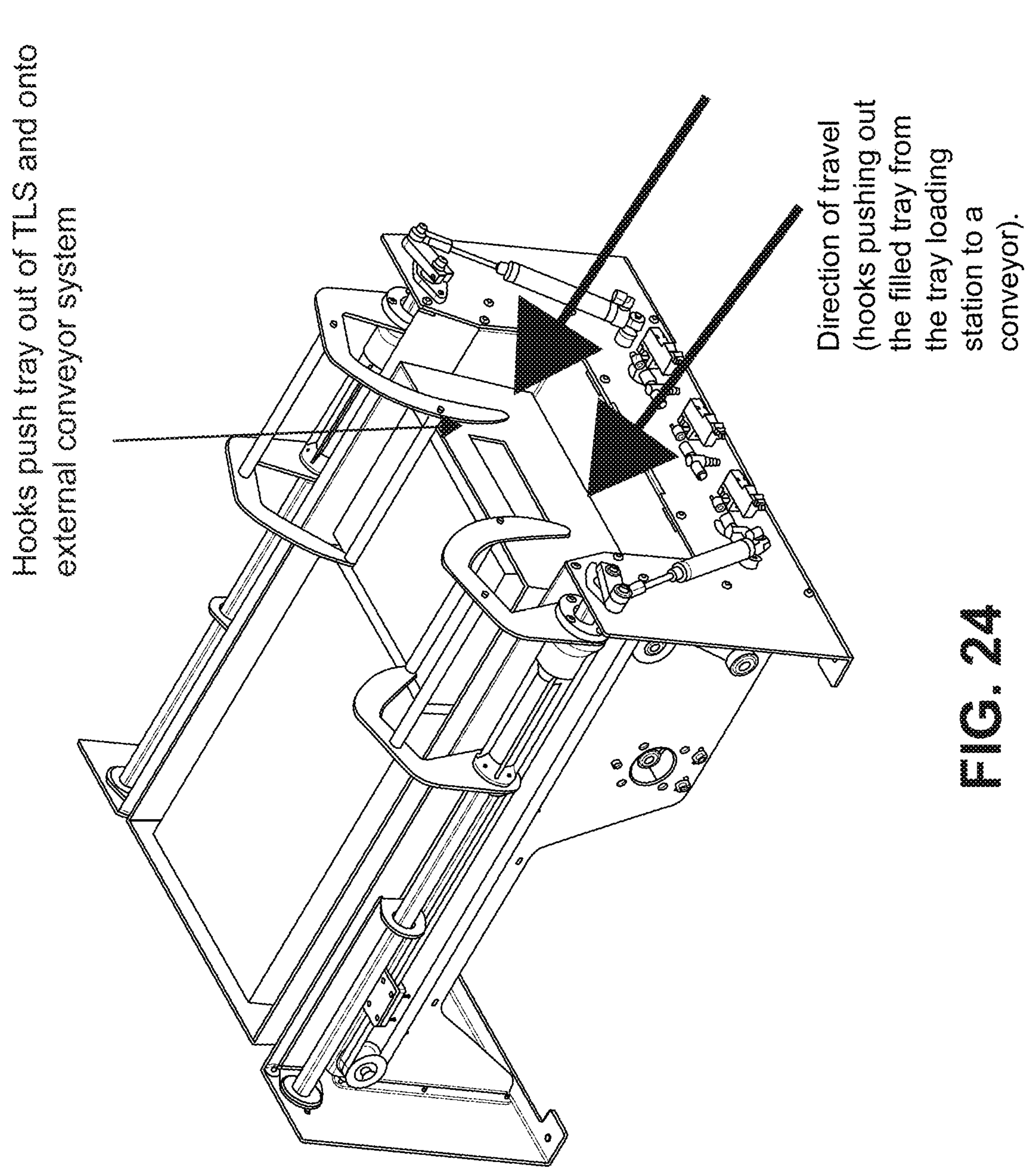
FIG. 24 is a schematic of the retractable hooks pushing out the filled tray from the tray loading station to a conveyor.

As shown in FIG. 23 and FIG. 24, once the gripper is removed from the stack of finished mail in the tray loading station, the hooks, which are now positioned outside the tray, will move to push the filled tray out of the tray loading station and onto an external conveyor. This conveyor could be a simple roller gravity conveyor or a powered site-wide conveyor system that moves all loaded trays to a centralized area for palletization. This marks the completion of one cycle of loading the tray in the tray loading station.

As discussed above, it is advantageous to load a single tray with multiple batches of stacked finished mail as compared to just loading the entire tray in one cycle. For example, the robotic arm and the associated gripper may be smaller because it is picking up smaller volume of stacked finished mail. For instance, for a standard USPS mail tray that holds approximately 21 inches of mail, if it was to be filled in one batch, the tool must had been able to grab upwards of 45 inches of mail at one time to account for the compression factor of the mail. This would result in a very large tool, expensive, heavy, and more complex to operate for the operator of the tool. In the systems of invention, since the gripper is smaller and the amount of mail being picked up each time is less, the overall lifting force required by the robot is reduced by roughly one-third (⅓) of the force required if the entire batch was being picked up in one cycle. It has been determined that picking up a smaller stack of finished mail, such as approximately 9-10 inches can be accomplished with a simple gripper with 2 paddles, whereas this system would find it extremely unlikely to pick up an entire stack of finished mail to fill the tray in one cycle. Notably, having a smaller gripper leads to a lower cost of the robot and the parts associated with the assembly. Additionally, loading the tray in multiple batches allows the system to accurately calculate the actual stack compression ratio of the mail as the tray is being filled, and results in more densely packed trays.

The systems and methods of the invention provide two major methods of filling up a postal tray. The method described above results in a tray filled to capacity or almost close to capacity within the limits of the automation. This method is used for trays that will be sent on to sorters for further processing. A second process, called "manifesting," is where the system is provided instructions to load a pre-specified quantity of stacks of finished mail in a particular tray. In this case, the machine control software will read the file (MRDF) containing the tray break information and use the offsetter to physically offset the stack of mail on the on edge stacker. The robotic gripper will contain sensors to detect the offset and be sure the last tray pick ends at the offset.

As discussed above, an offsetter is a module on the edge stacker. The offsetter shifts the mail on the belt. Particularly, the offsetter pushes a predetermined stack of the mail horizontally as compared to the remainder of the stack. The offsetter is primarily used to indicate zip breaks in the mail. When there is a zip break in the mail, it typically indicates the start of a new tray.

Figure 25:
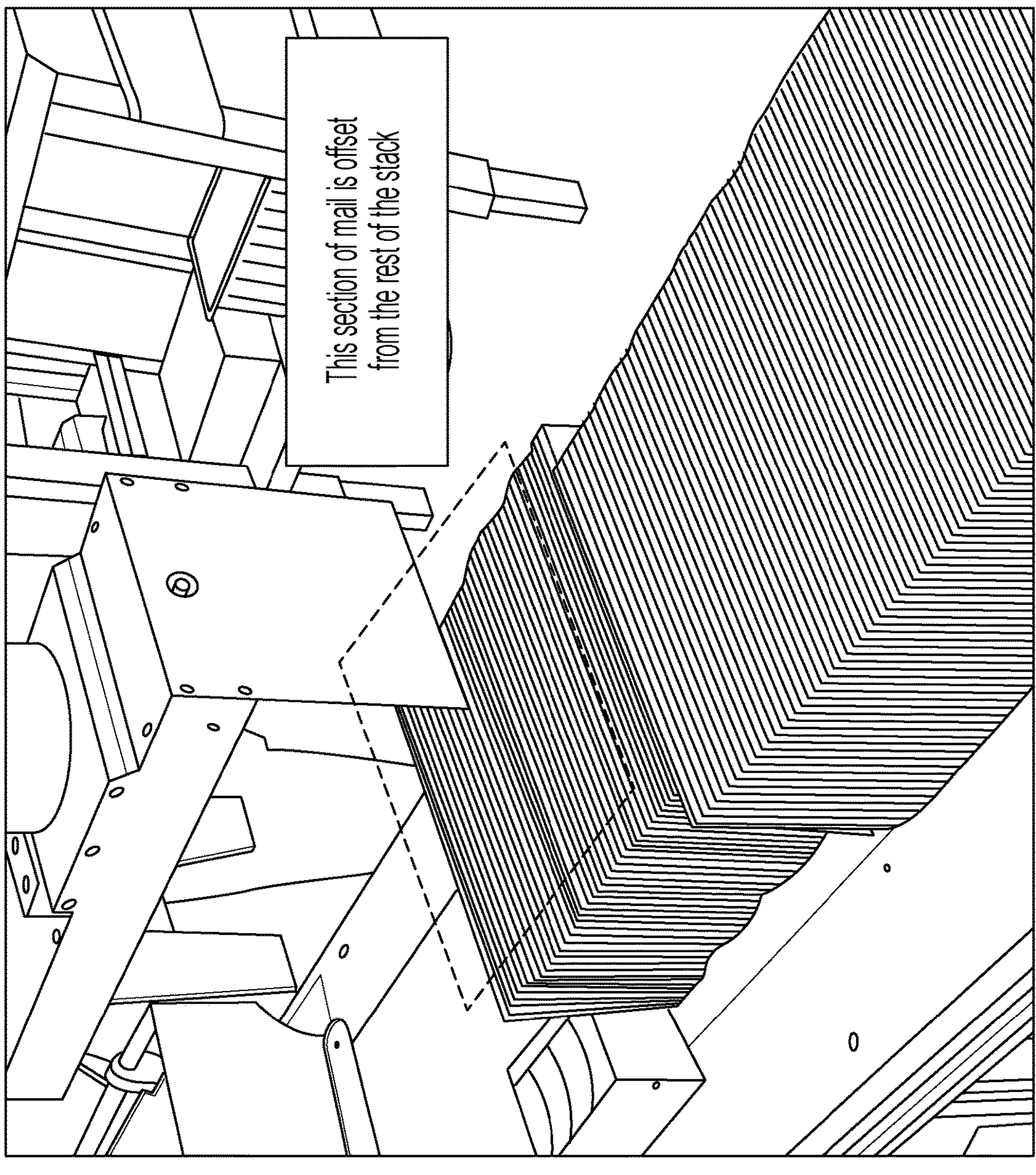
FIG. 25 is an image showing the offset mail from the rest of the stacked finished mail on the edge stacker.
Figure 26:
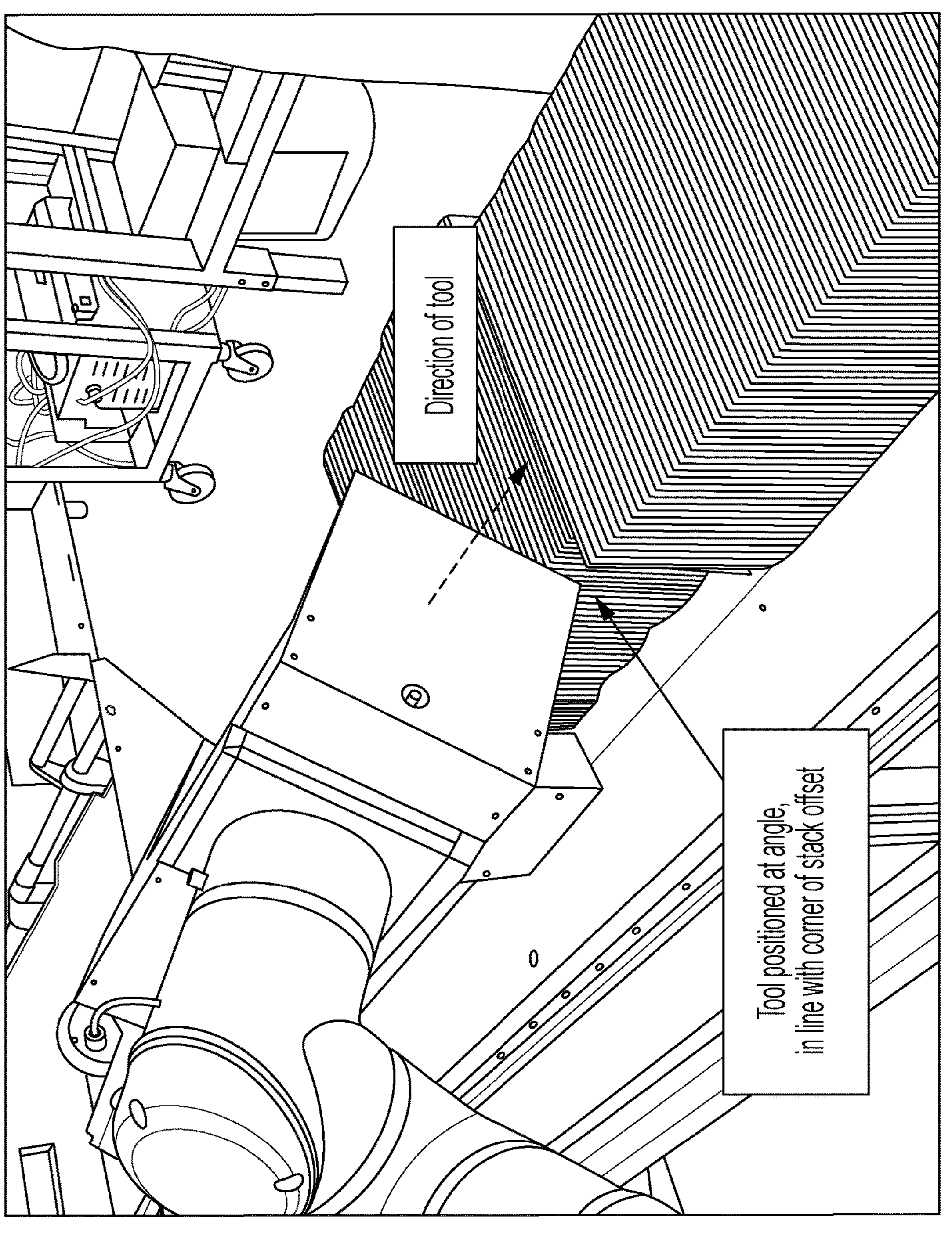
FIG. 26 is an image of the gripper being lowered on top stack of the offset finished mail on the edge stacker.

FIG. 25 provides an image of stack of finished mail that has been offset on the belt to indicate a tray break. The offsetting of the stack is done by the OES. The software of the traying system will monitor the electrical output of the mechanism that creates the offset in the stack, as well as the encoder of the stacker belt so that it is aware of the location of every offset on the belt, even as the belt moves during operation. When the software determines that an expected tray offset is within the next 'pick' of the stack, the robot will switch into 'find offset' mode. As shown in FIG. 26, in the 'find offset' mode, the robot will position the gripper so that the corner of the fixed paddle is approximately 1 inch away from the corner of the offset mail. As shown in FIG. 26, the gripper is at an angle to the stack of the finished mail. The gripper will then move slowly, towards the offset. In certain embodiments, the speed of movement of the gripper toward the offset could be about 1 inch/sec. The gripper will keep moving until it comes in contact with the edge of the offset stack of finished mail. The contact is sensed by the robot using force sensors included in the robot.

Figure 27:
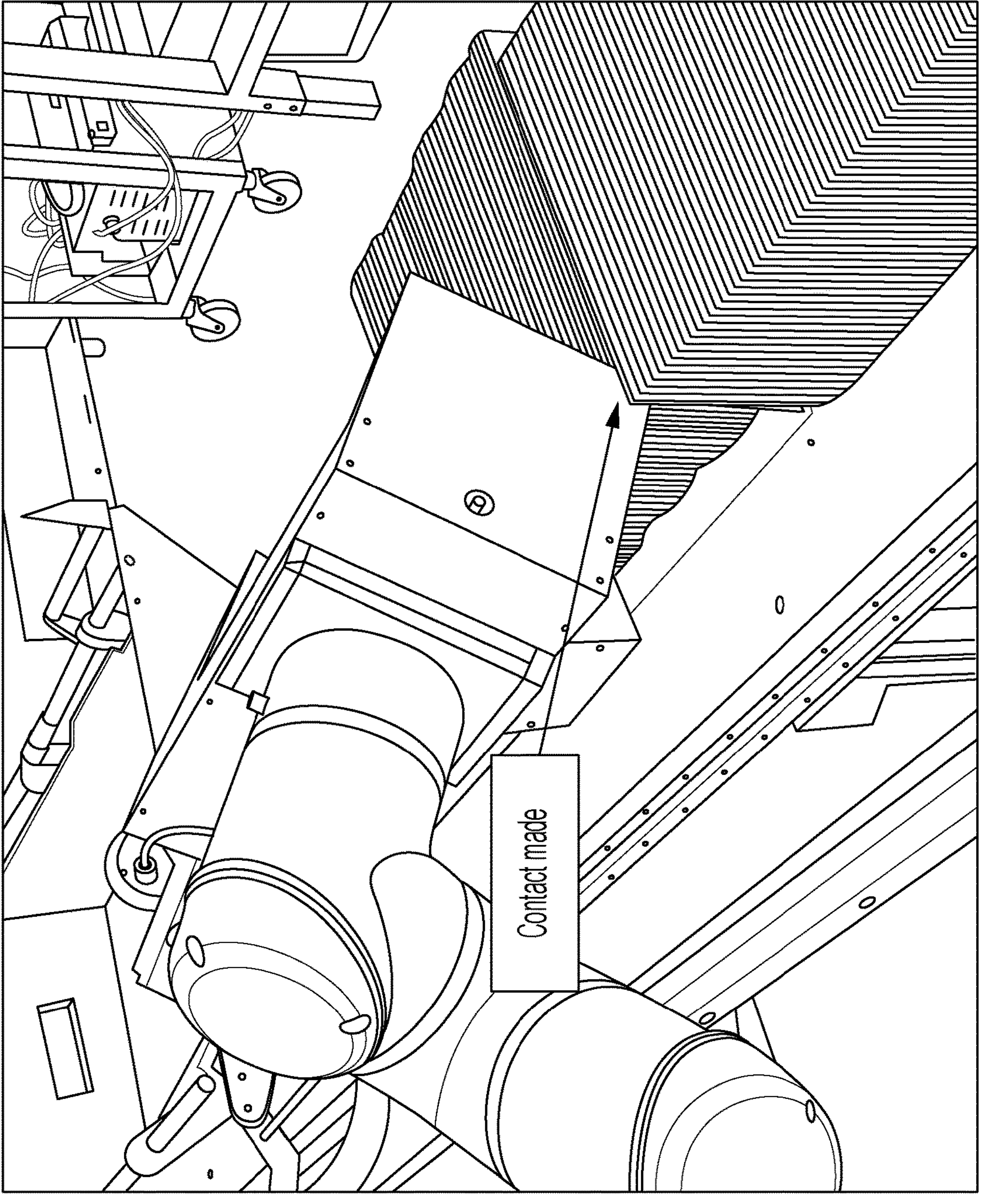
FIG. 27 is an image of the gripper moving toward the stack of the finished mail that is not offset to determine the length of the offset stack mail.
Figure 28:
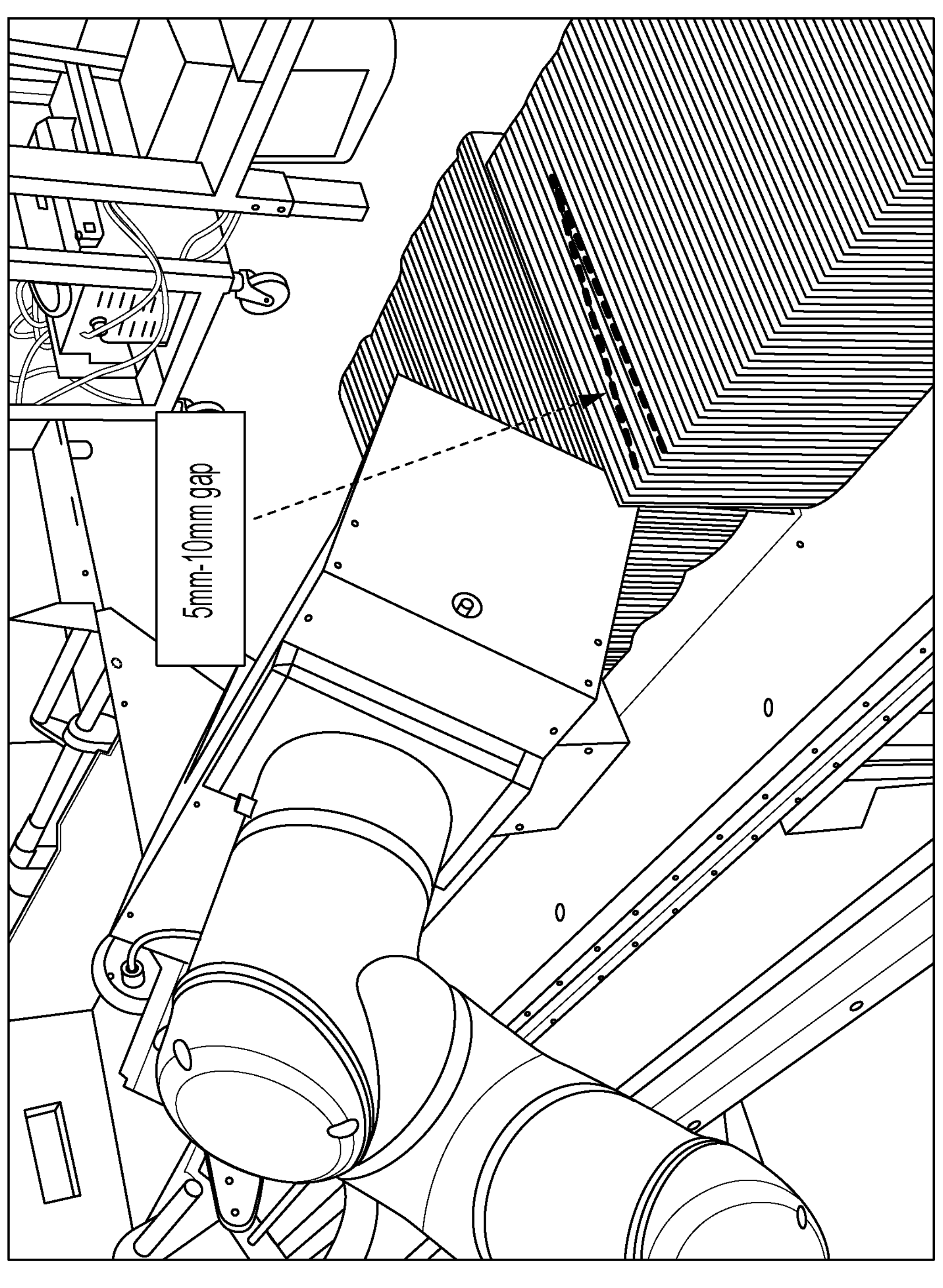
FIG. 28 is an image demonstrating the paddle creating a gap between the two stacks where the paddle is inserted.
Figure 29:
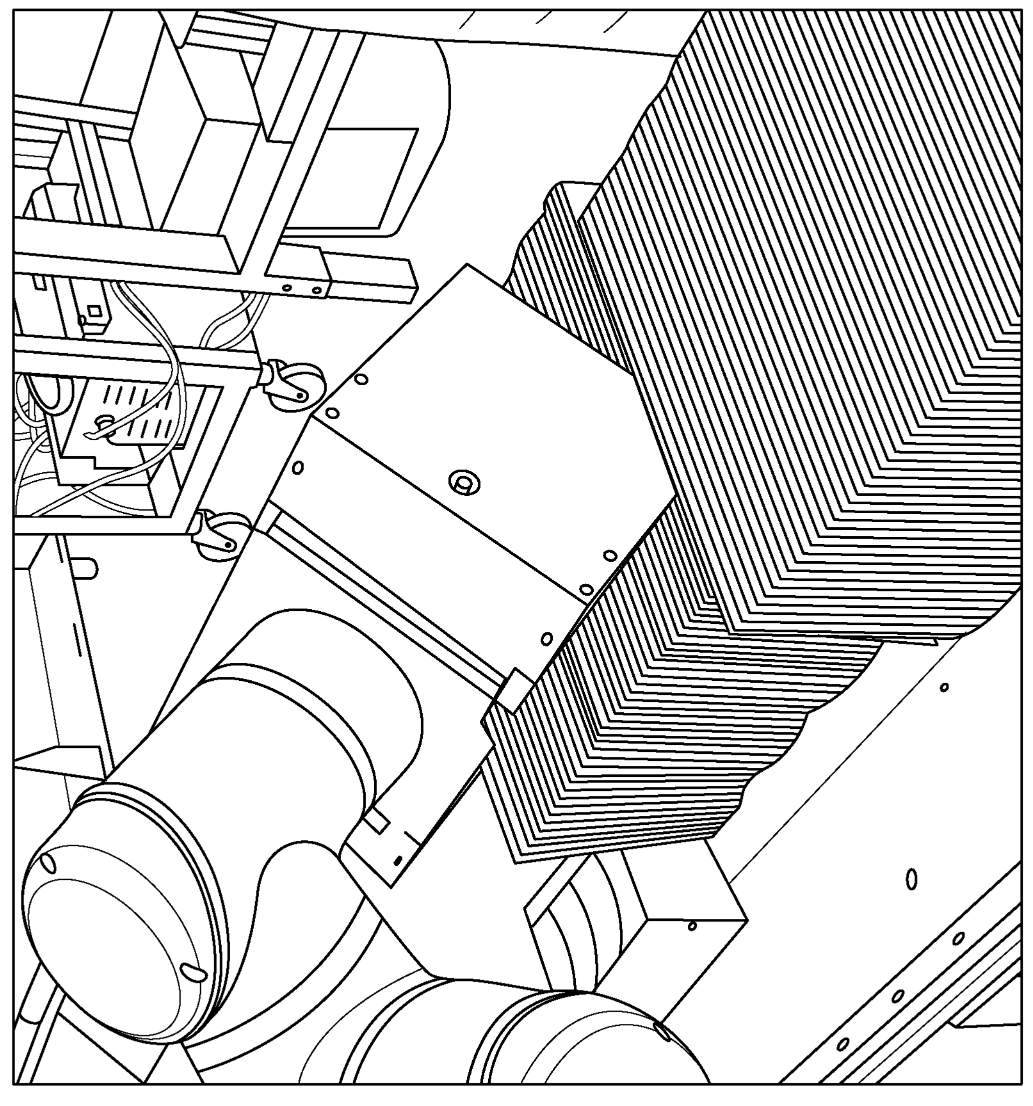
FIG. 29 is an image showing the gripper being inserted between the two stacks of finished mail to pick up the stack of the offset finished mail.
Figure 30A:
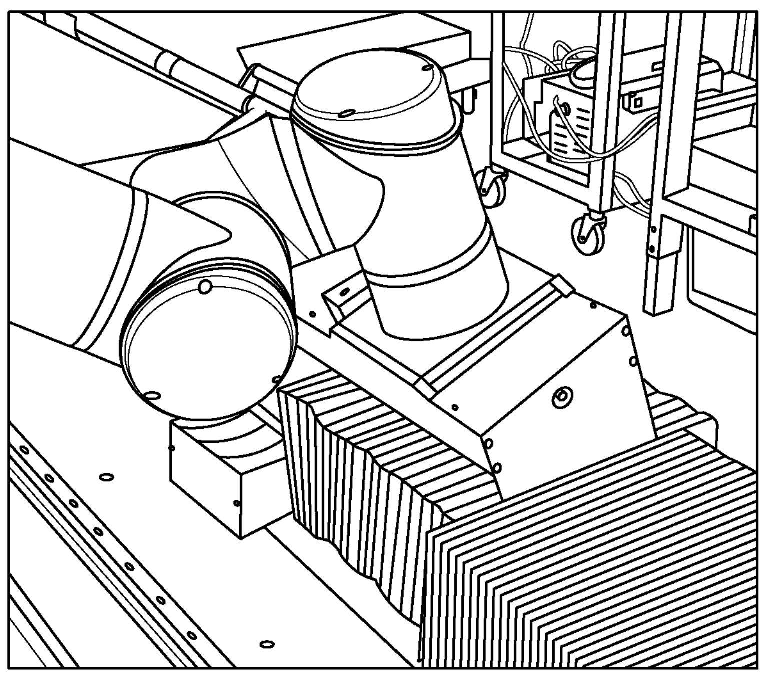
FIGS. 30A and 30B are images demonstrating the insertion of the gripper in the offset finished mail stack to be picked up.
Figure 30B:
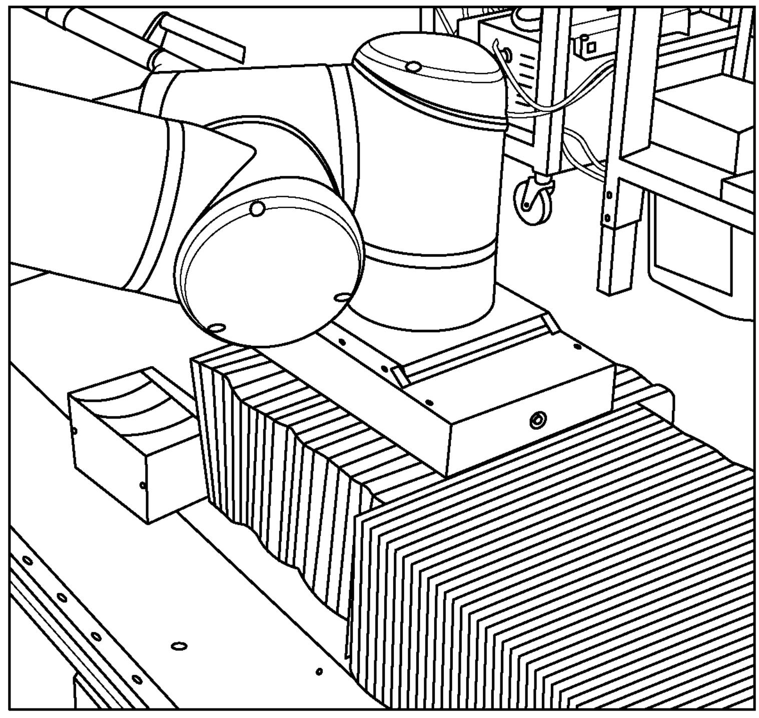

As shown in FIG. 27 and FIG. 28, once the contact is established between the gripper and the offset stack of mail, the gripper will continue to move further to open a gap between the offset stack and the remainder of the stacked mail on the OES. In certain embodiments, the gap could approximately from about 5 mm to about 10 mm. As shown in FIG. 29, once this gap is created, the gripper will then be moved into this gap, separating the offset mail from the rest of the stack. Subsequently, as shown in FIGS. 30A and 30B, once the gripper is inserted in the gap, the gripper changes to angle to be aligned vertically with the remainder of the stack of finished mail on the OES.

Figure 31:
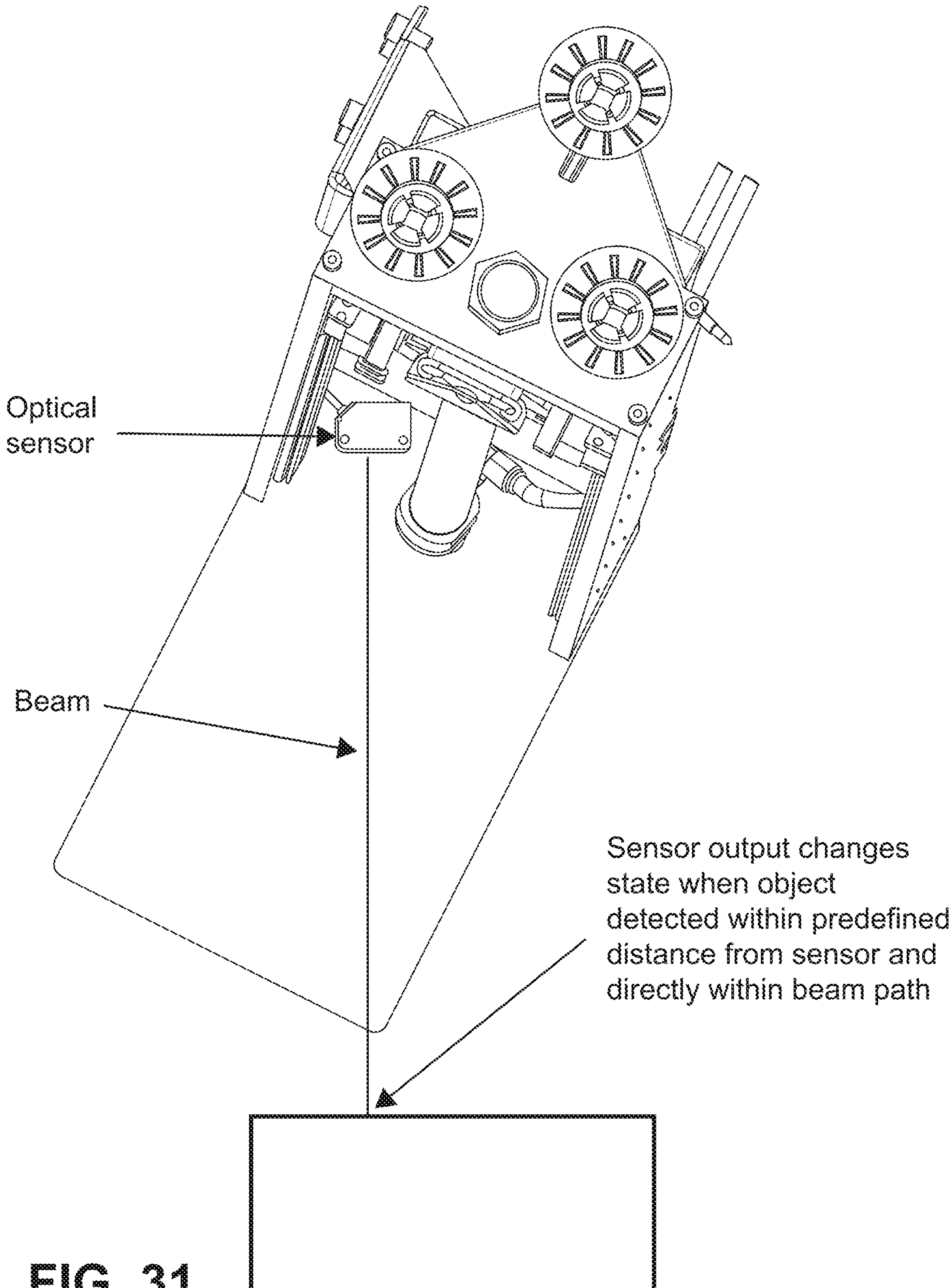
FIG. 31 is an enlarged view of one embodiment of the gripper tool, specifically including an optical sensor incorporated into the tool and used for edge detection, ultimately for detecting the location of an offset in a stack of mailpieces.
Figure 32:
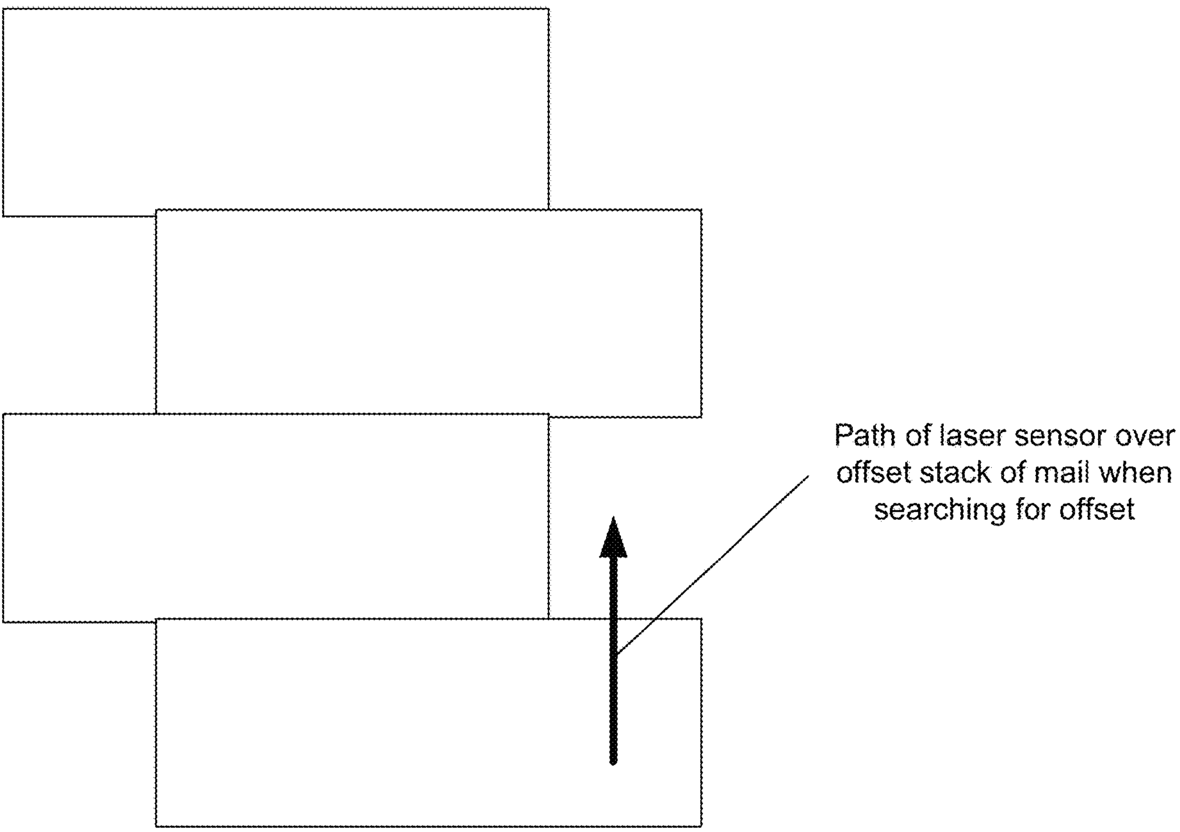
FIG. 32 illustrates the path of the laser beam from the optical sensor over the stack of mailpieces for use in determining location of an offset in the stack of mailpieces.

FIG. 31 is an enlarged view of one embodiment of the gripper tool, specifically including an optical sensor incorporated into the tool and used for edge detection, ultimately for detecting the location of an offset in a stack of mailpieces. FIG. 32 illustrates the path of the laser beam from the optical sensor over the stack of mailpieces for use in determining location of an offset in the stack of mailpieces. In this method of edge detection, the beam of the sensor is passed over the stack of mail, midway between the leading edges of the offset mail and non-offset mail. When an edge is detected, the control system will record the position of the offset. The control system will then use this information to slice the tool into the stack in a method identical to the one used when detecting the offset via the contact method described herein.

The picked batch of mail will then be lifted and placed into the tray in the tray loading station as described earlier. Once this stack is placed in the tray in the tray loading station, the current tray is completed, and it is conveyed out of the tray loading station to allow the robotic system to begin filling the next tray.

Figure 33:
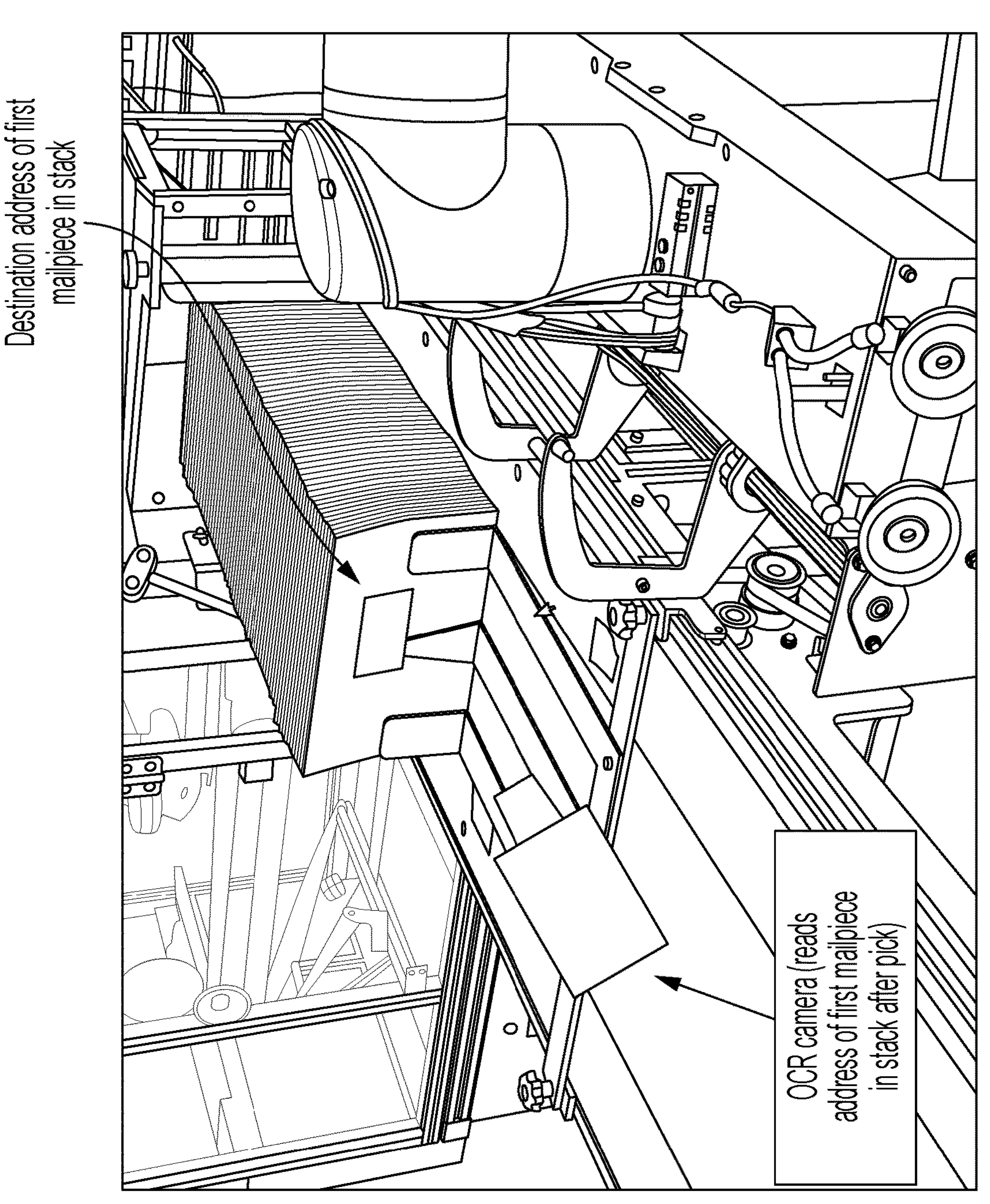
FIG. 33 is an image superimposed with a schematic demonstrating an OCR camera on the edge stacker to the scan and recognize the address on the first envelope in the system.

The systems of the invention may further include a camera placed on the OES belt. In certain embodiments, while the stack of finished mail picked up by the gripper is being transported away from the OES belt, the camera can be placed on the actuated paddle of the OES to take an image of the address on the envelope on the first mail remaining on the OES stack. Preferably, the camera could be a camera with OCR functionality. Thus, the camera would be able to read the address of the first envelope left on the OES belt. FIG. 33 provides an image along with a depiction of an OCR camera on the OES. Advantageously, the information from the OCR camera may be used to validate that the system separated and picked up the correct batch of envelopes and ensure that each finished mail gets placed in the proper tray.

Alternative Work Cell Layout and Components:

FIGS. 34 through 45 provide various views of another embodiment of a work cell layout consistent with the present disclosure. For example, in some embodiments, system may include a collaborative robot, also known as a COBOT. The COBOT of the system can also be reconfigured within the work cell of an inserter and can also perform different tasks. These extra cost and features will provide greater efficiency and economic value to the operators of the system.

Figure 34:
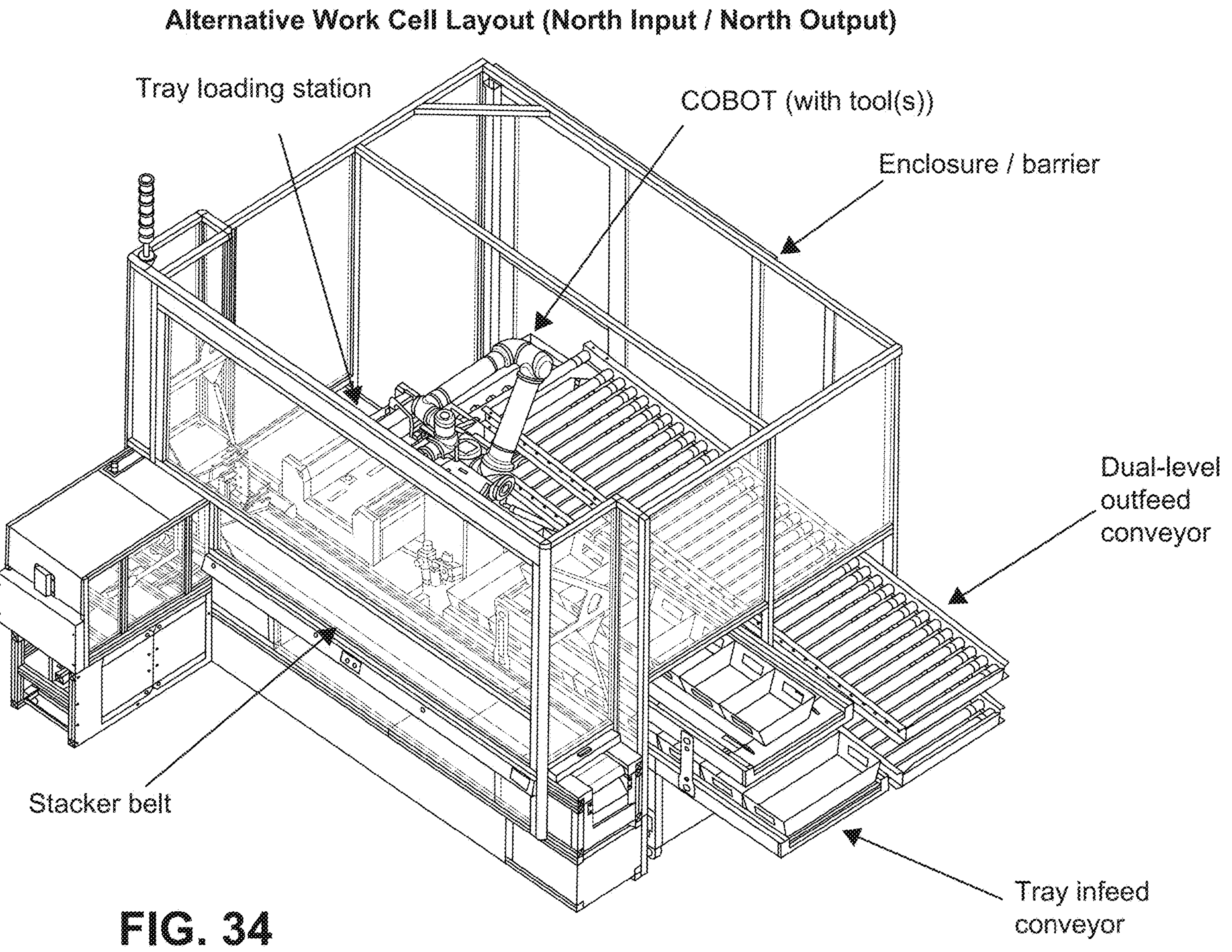
FIG. 34 is a perspective view of another embodiment of a work cell layout of an automated system for loading mailpieces within trays for subsequent mailing.
Figure 35:
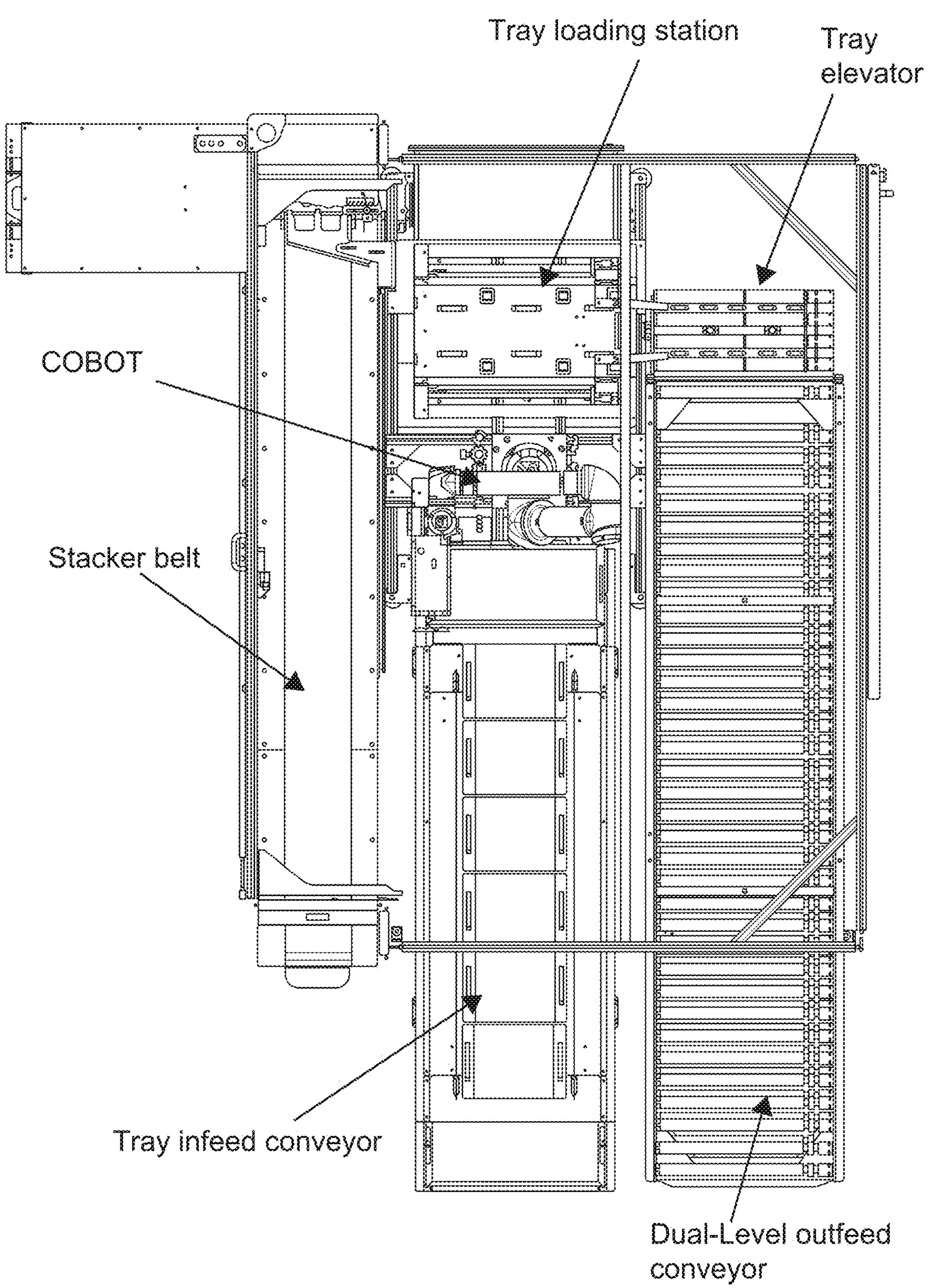
FIG. 35 is a plan view of the work cell layout of FIG. 34.

FIG. 34 is a perspective view of another embodiment of a work cell layout of an automated system for loading mailpieces within trays for subsequent mailing and FIG. 35 is a plan view of the work cell layout of FIG. 34. As shown, the system may generally include a COBOT positioned central to the on-edge stacker, tray infeed conveyor, an outfeed conveyor, and a tray loading station, which is advantageous in that it ensures that all the locations that the robot must service are within the reach of the robotic arm.

Figure 36:
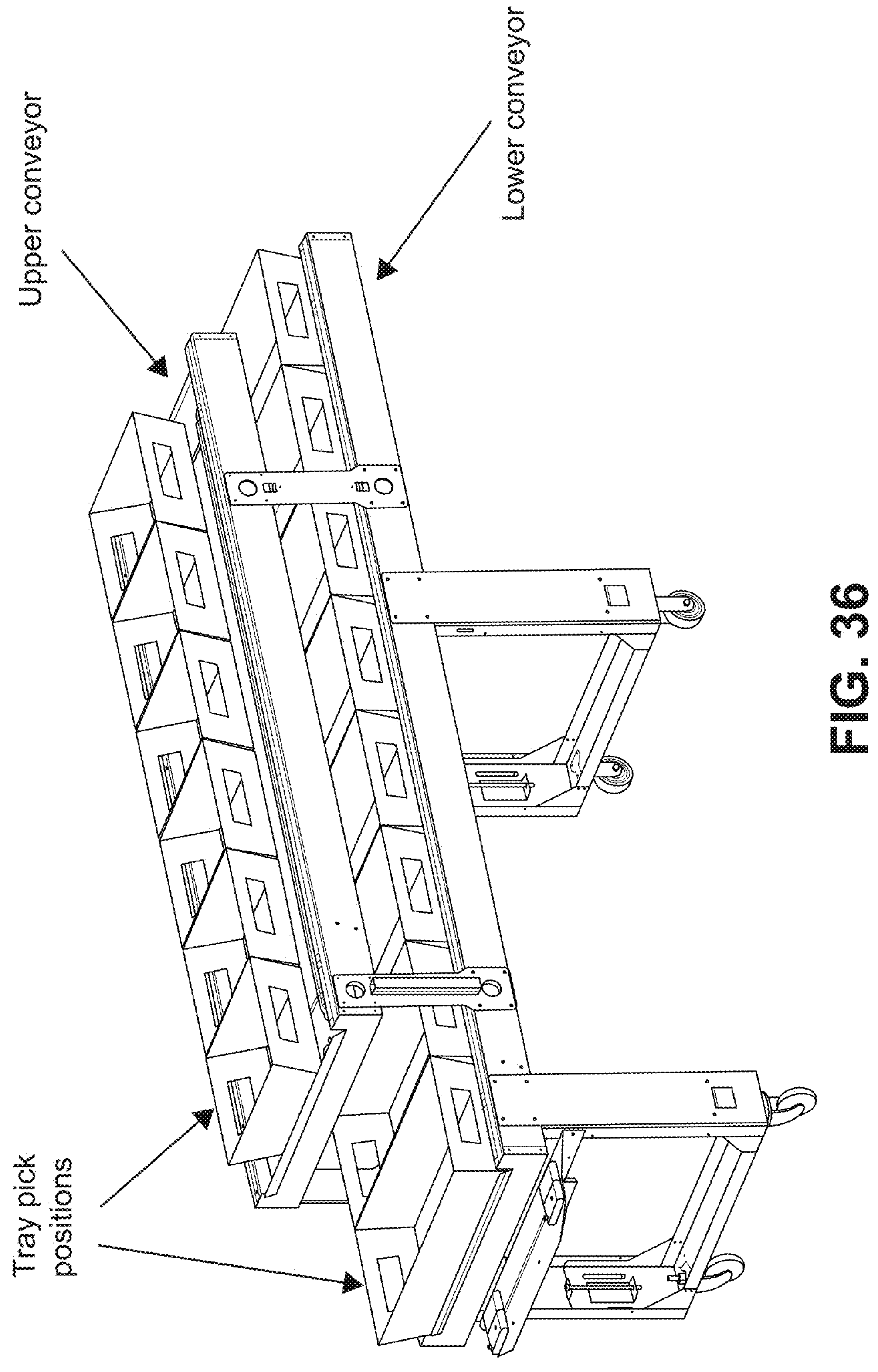
FIG. 36 is a perspective view of a multiple-level tray infeed conveyor, illustrating trays provided on both an upper conveyor and a lower conveyor.
Figure 37:
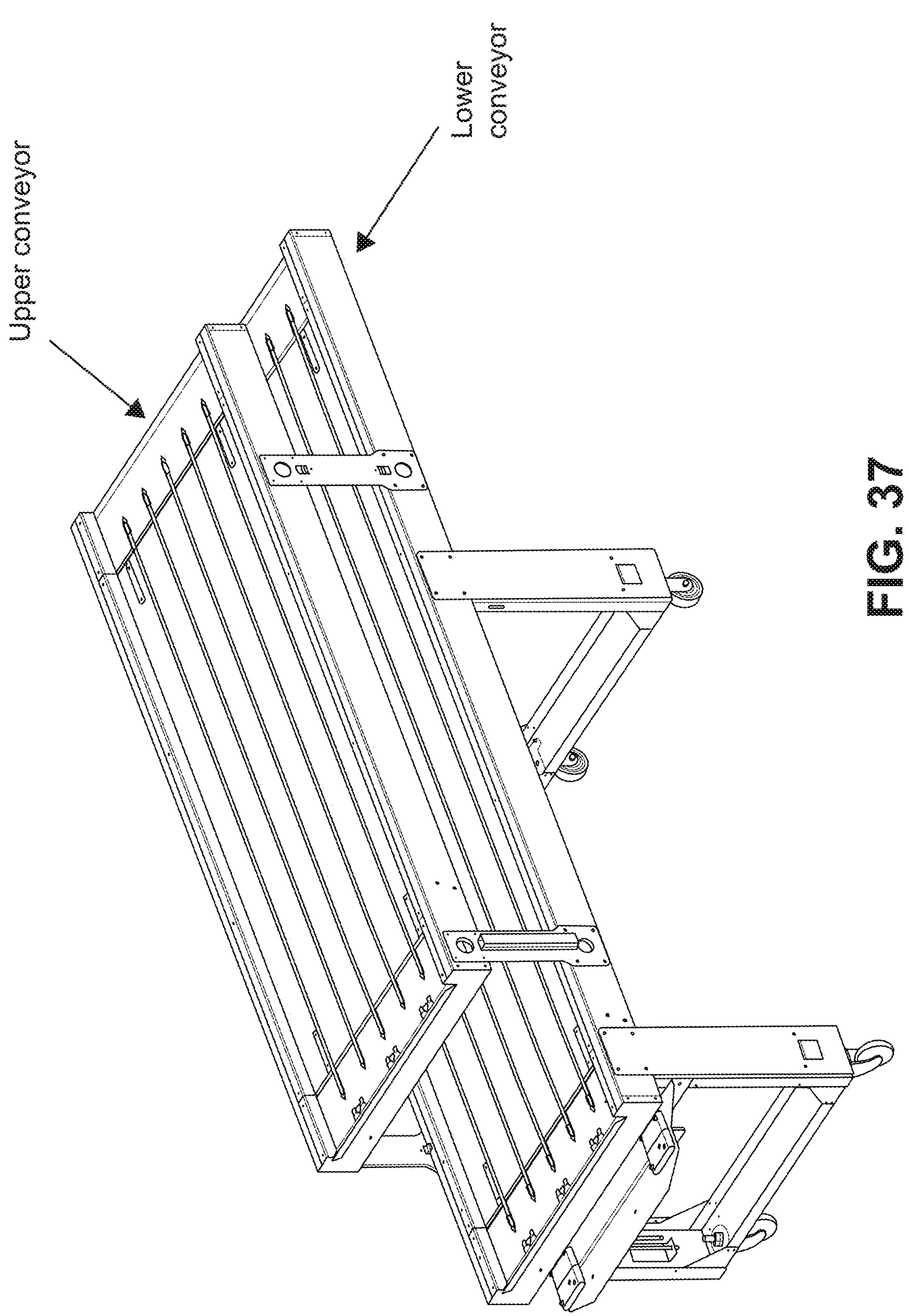
FIG. 37 is a perspective view of the multiple-level tray infeed conveyor in an empty state (i.e., without any trays loaded thereon).

FIG. 36 is a perspective view of a multiple-level tray infeed conveyor, illustrating trays provided on both an upper conveyor and a lower conveyor. FIG. 37 is a perspective view of the multiple-level tray infeed conveyor in an empty state (i.e., without any trays loaded thereon). As shown, each conveyor level consists of a series of motorized belts configured to support and transport empty trays to the end of the transport.

Figure 38:
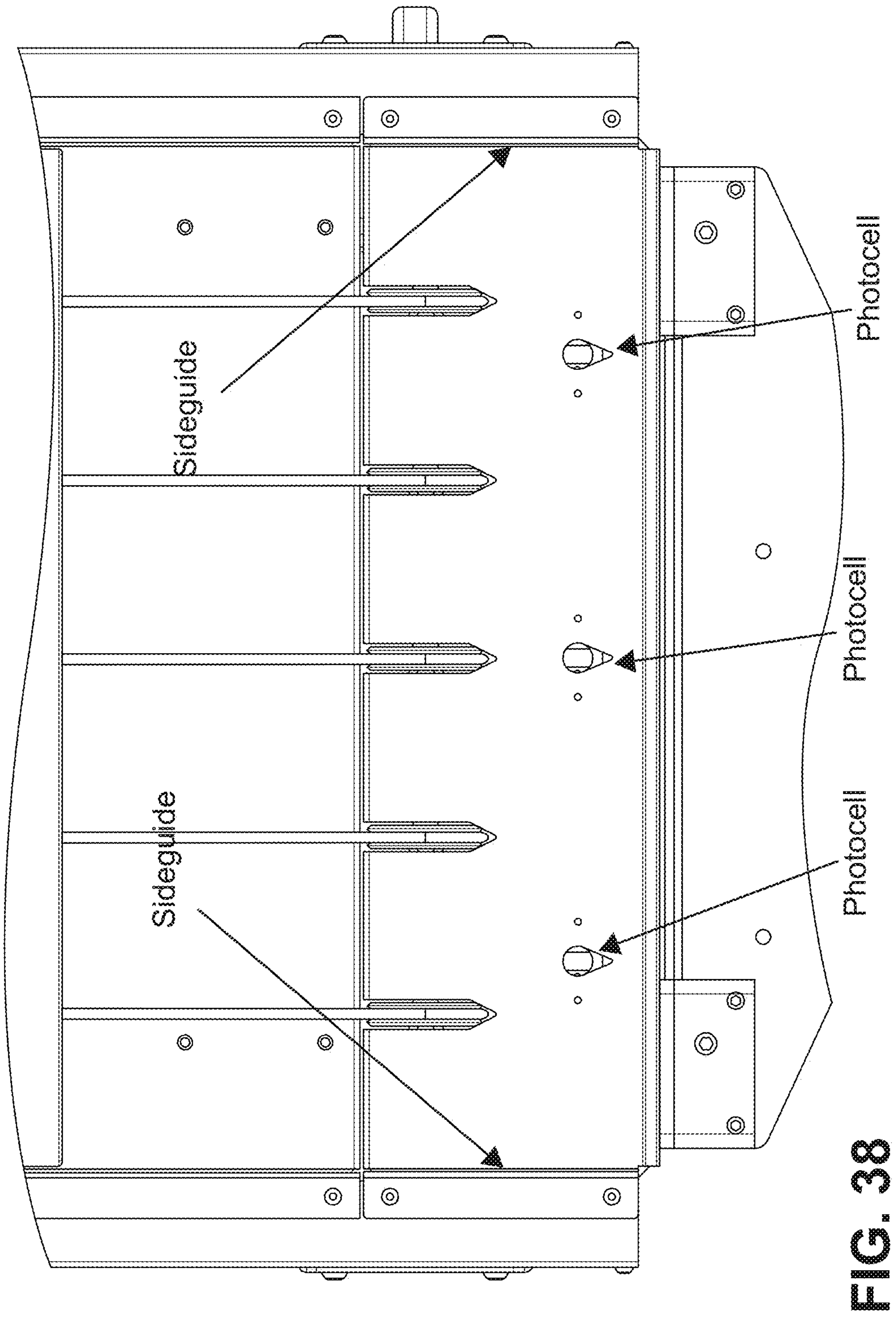
FIG. 38 is an enlarged view of a portion of the tray infeed conveyor showing photocells provided on a conveyor level for use in monitoring movement of trays along a given conveyor level.

FIG. 38 is an enlarged view of a portion of the tray infeed conveyor showing photocells provided on a conveyor level for use in monitoring movement of trays along a given conveyor level. As shown, a series of photocells may be positioned at the downstream end of each transport. The photocells are used to sense the presence (or lack thereof) of a tray on the conveyer, thereby indicating to the control system that a tray has reached the end of the transport and further signaling the motor to stop. As shown, the downstream end of each conveyor level are offset from one another, thereby allowing for a tray from the lower level to be picked by the COBOT without the upper level being in the way. It should be noted that standard mail trays (i.e., USPS mail trays) come in either a 10-inch length (referred to as a "half tray") or a 20-inch length (referred to as a "full tray"). When a full tray is placed on the conveyor and is transported to the end, all photocell sensors will become blocked (as a result of all of the photocell sensors cooperatively spanning the length of a full tray), which then communicates to the control system that a full tray is present. Conversely, when a half tray is present, only some of the photocell sensors will be blocked. As shown, the conveyor has sideguides which are slightly wider than the overall length of a full tray, such that a full tray is always maintained in a centered position. For a half tray, the operator may place the tray anywhere between the sideguides. The general location of the tray can be determined by the state of the photocells and the COBOT will acquire the tray nearest the blocked photocells. During the placement of the tray into the tray loading station, the photocells within the tray loading station will be used to determine the exact position of the tray so that it is placed in the correct location.

Figure 39:
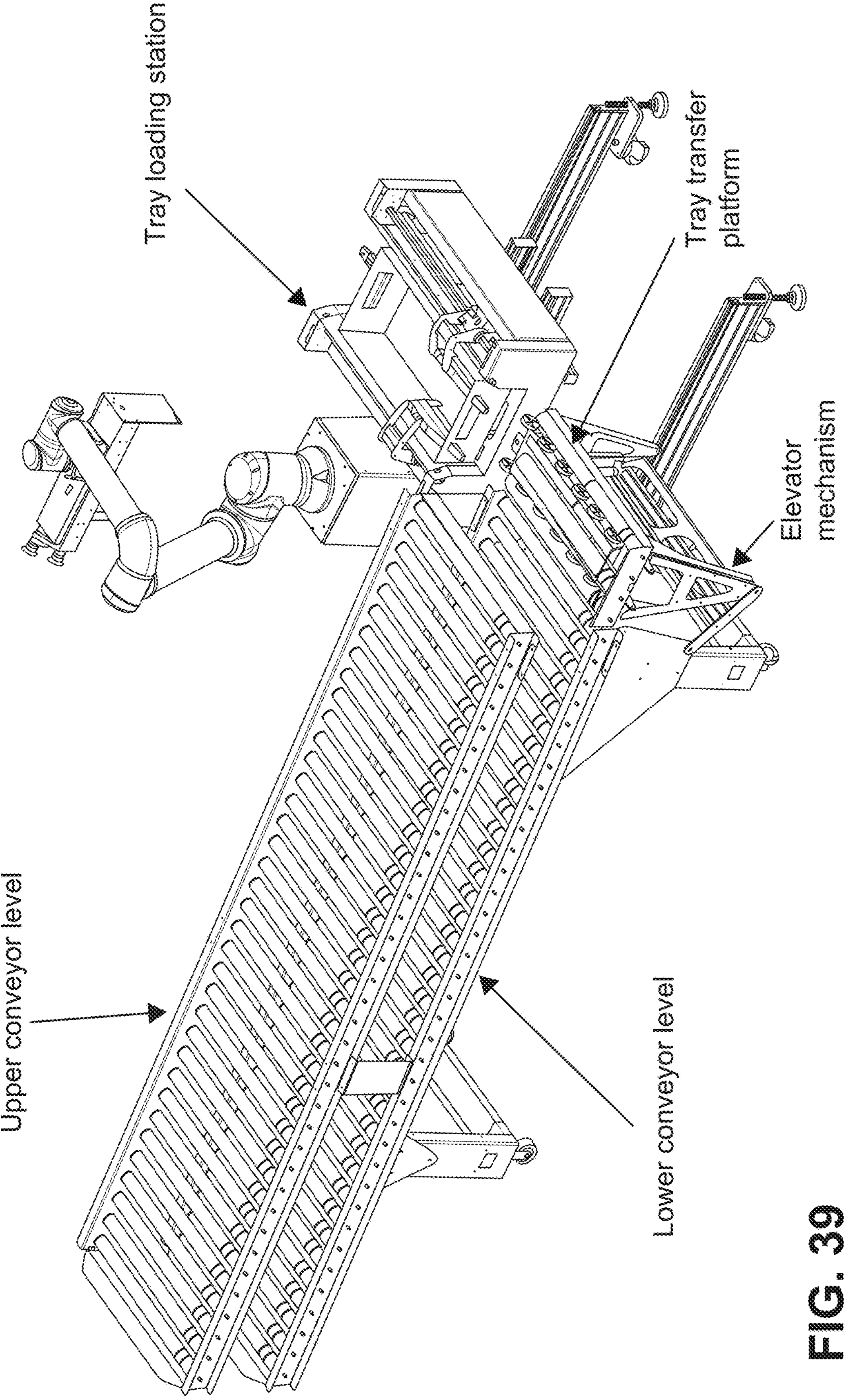
FIG. 39 is a perspective view of a multiple-level outfeed conveyor.

FIG. 39 is a perspective view of a multiple-level outfeed conveyor. Immediately after the tray loading station, a finished mail tray will be pushed onto a tray elevator portion of the multiple-level outfeed conveyor. The elevator can transport a tray to either of the conveyor levels. For instance, the lower level can be used for "good" mail trays, while the upper level can be used for "bad" trays. As previously described herein, a "bad" tray would be a tray that has missing pieces, had previously jammed during loading of the mail, or other error conditions. Alternatively, the two levels can be used in parallel to provide more capacity for either "good" or "bad" trays.

Figure 40:
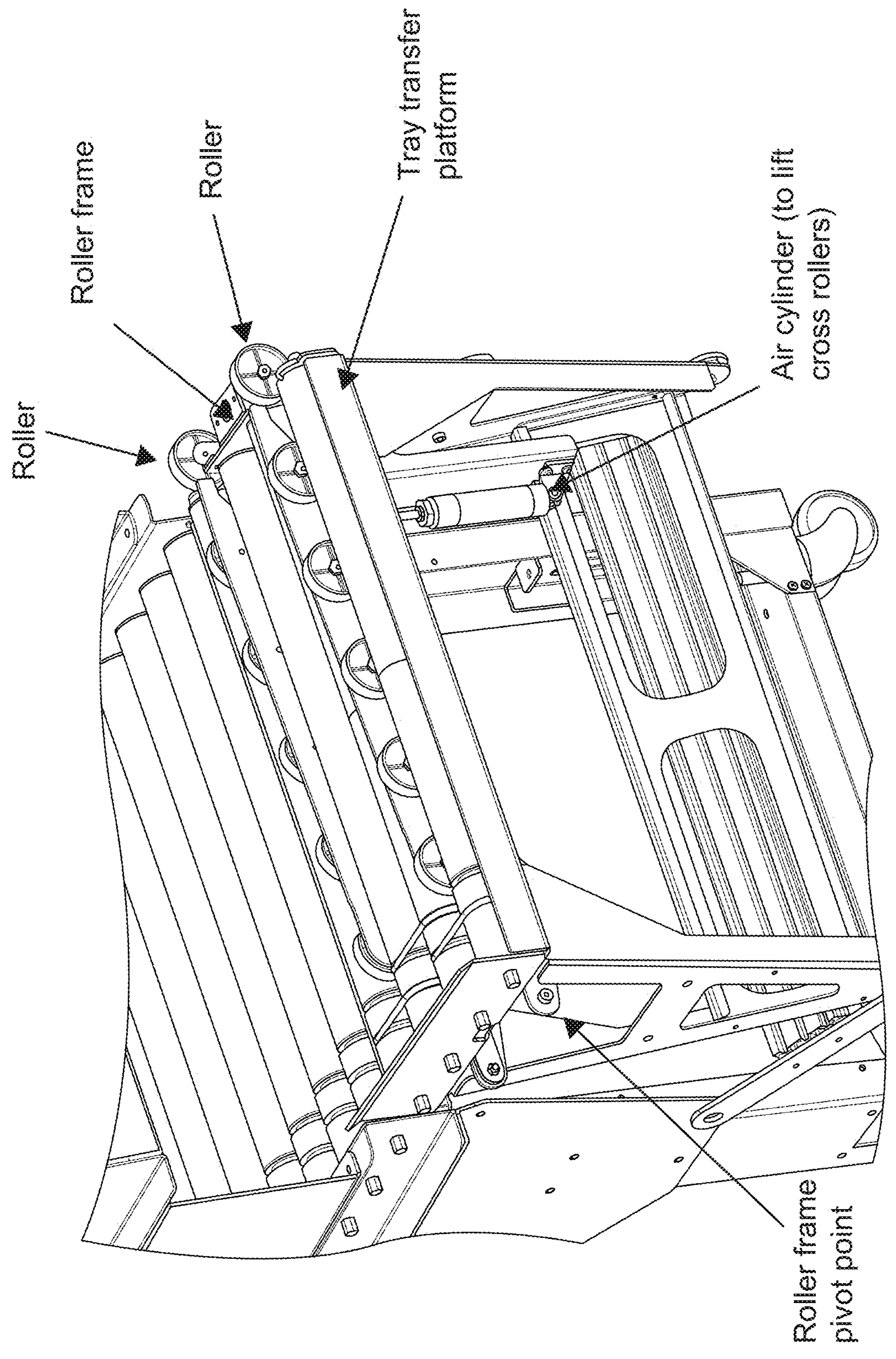
FIG. 40 is an enlarged view of the tray transfer platform of the outfeed conveyor.
Figure 41:
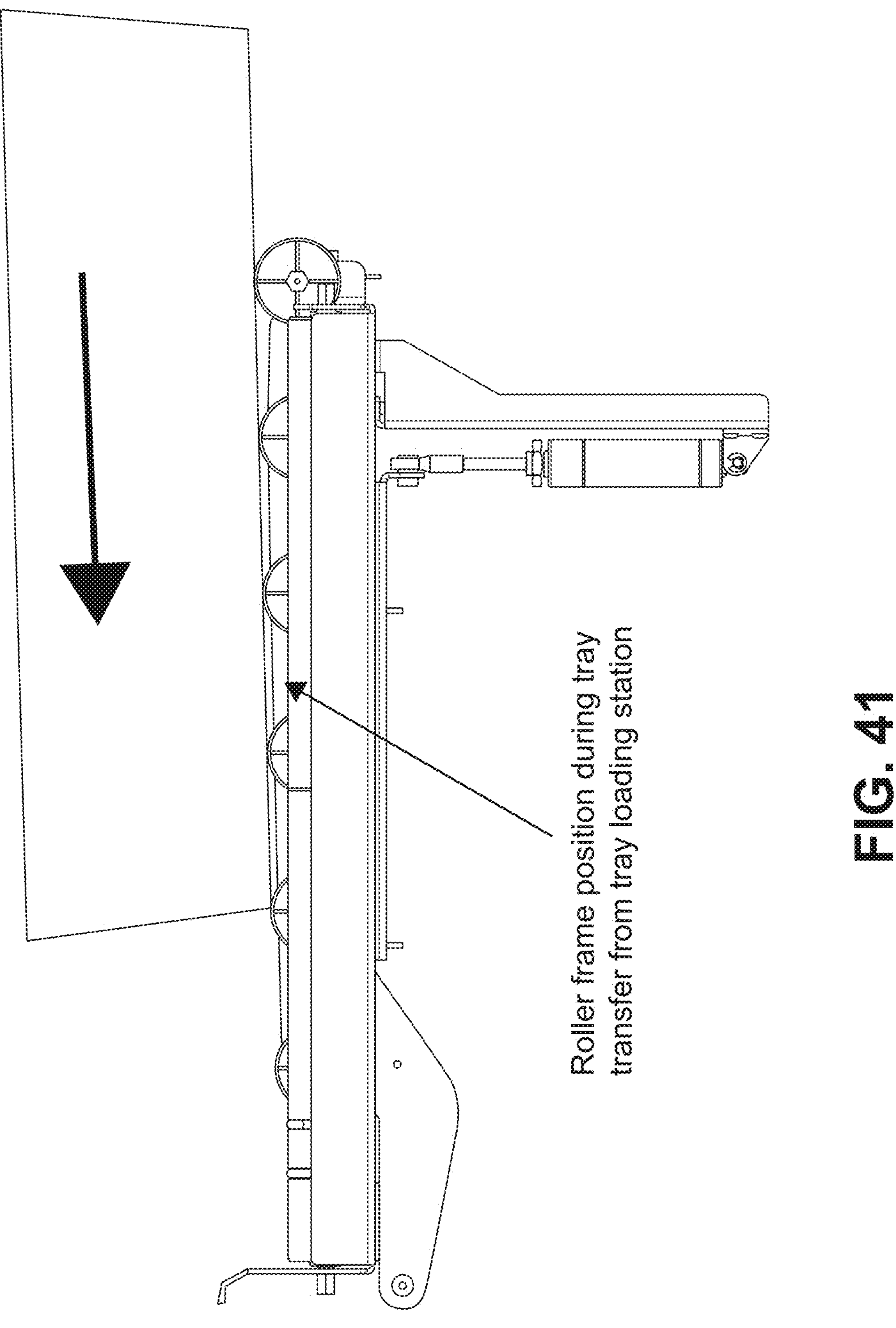
FIGS. 41 and 42 are side views of the tray transfer platform transitioning from a first position (FIG. 41) for transferring a tray from the tray loading station and a second position (FIG. 42) for transferring the tray towards the output conveyor.
Figure 42:
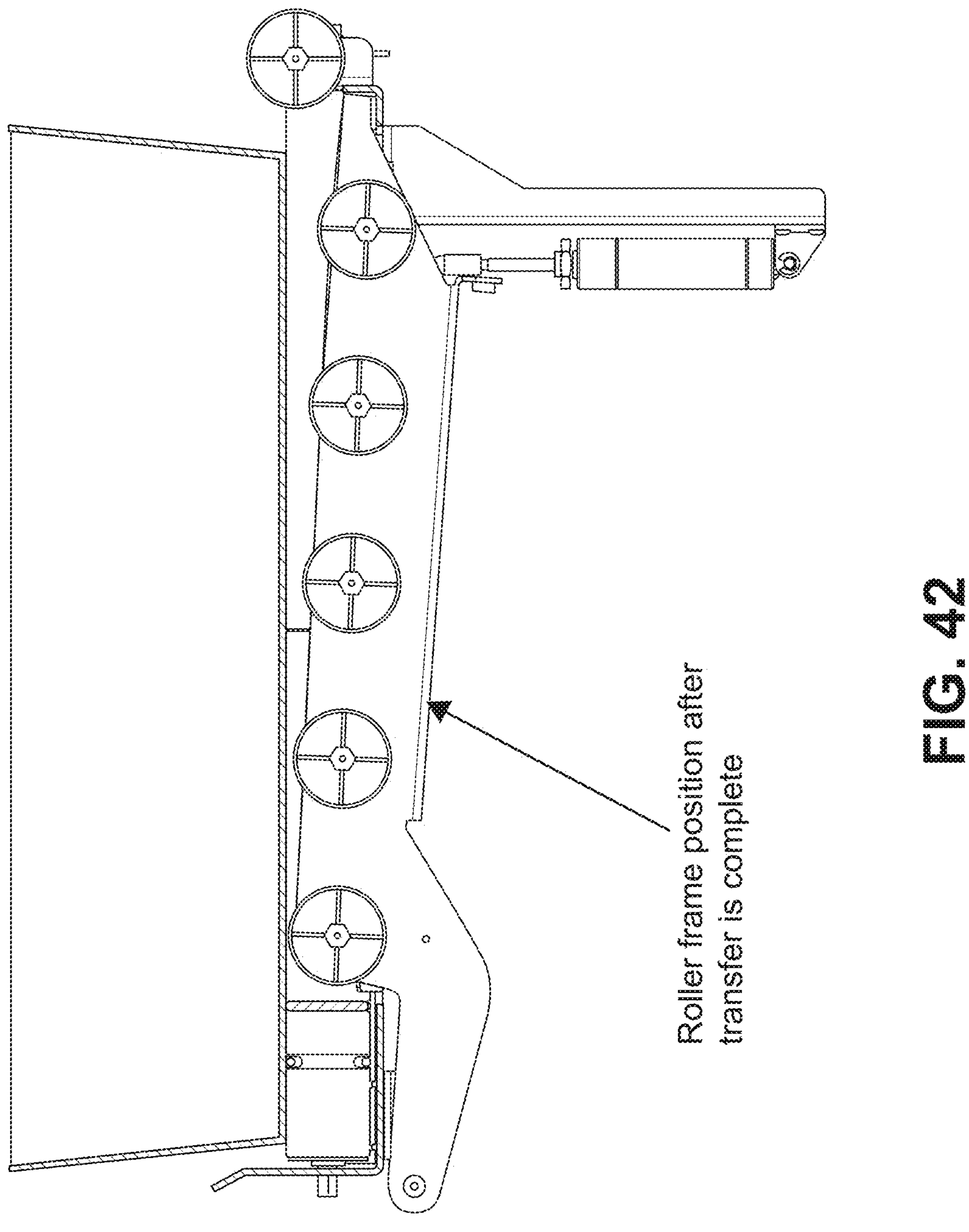

FIG. 40 is an enlarged view of the tray transfer platform of the outfeed conveyor. FIGS. 41 and 42 are side views of the tray transfer platform transitioning from a first position (FIG. 41) for transferring a tray from the tray loading station and a second position (FIG. 42) for transferring the tray towards the output conveyor. As shown, within the platform of the tray elevator is a set of pneumatically actuated idler rollers. During the transfer of the tray to the elevator, these rollers will move up, so that the mail tray can easily roll onto the tray elevator platform. After the tray transfer to the tray transfer platform is complete, the cross-roller frame will move downwards, and lower the tray onto the motorized conveyor rollers. When the tray transfer platform is at the proper position the motor will turn on, which will transport the tray to the output conveyors (i.e., in a direction approximately orthogonal to the direction upon which the tray was transported onto the transfer platform from the tray loading station).

Figure 43:
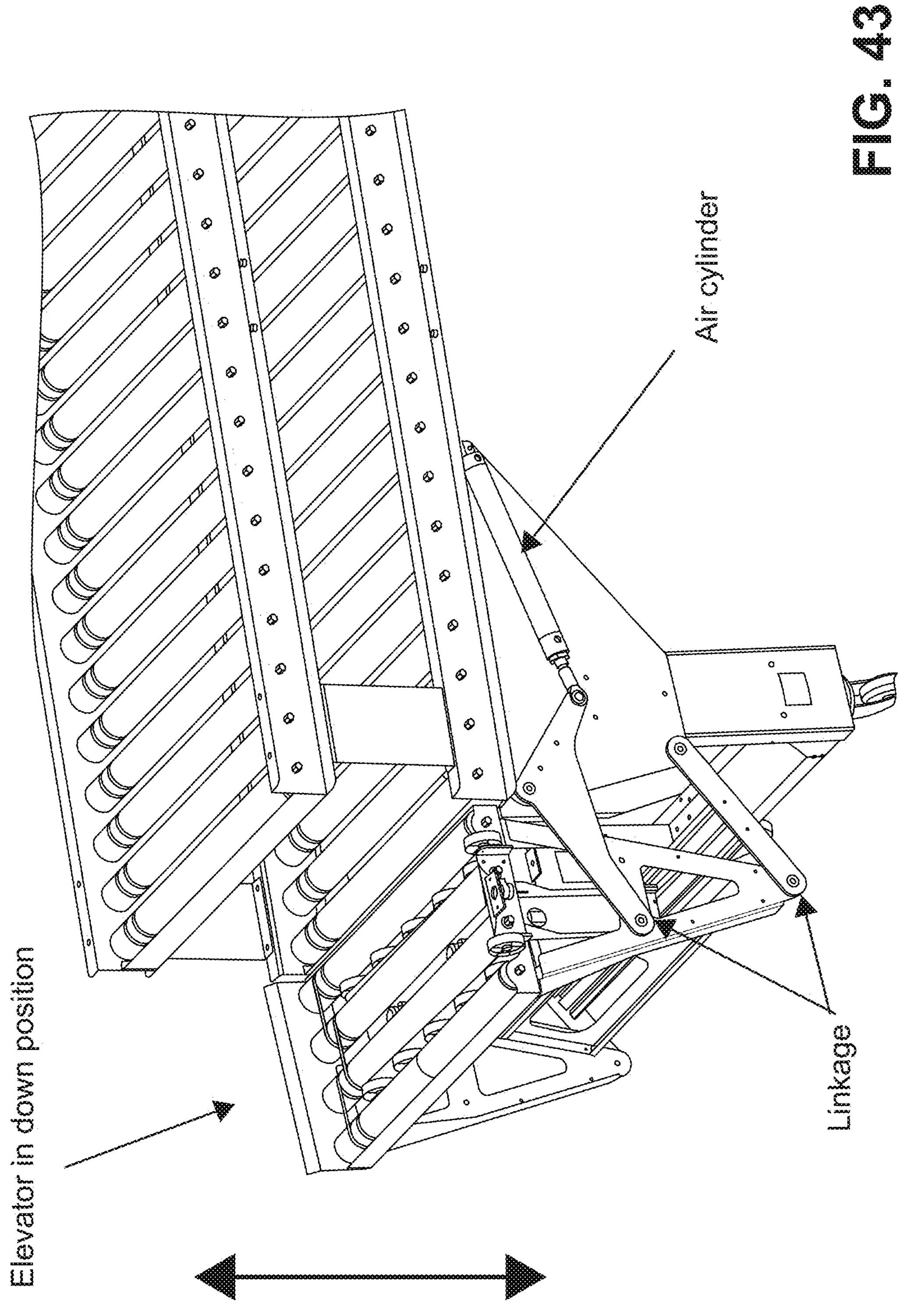
FIGS. 43 and 44 are perspective views of the tray transfer platform is a lowered or down position (FIG. 43) and an elevated or up position.
Figure 44:
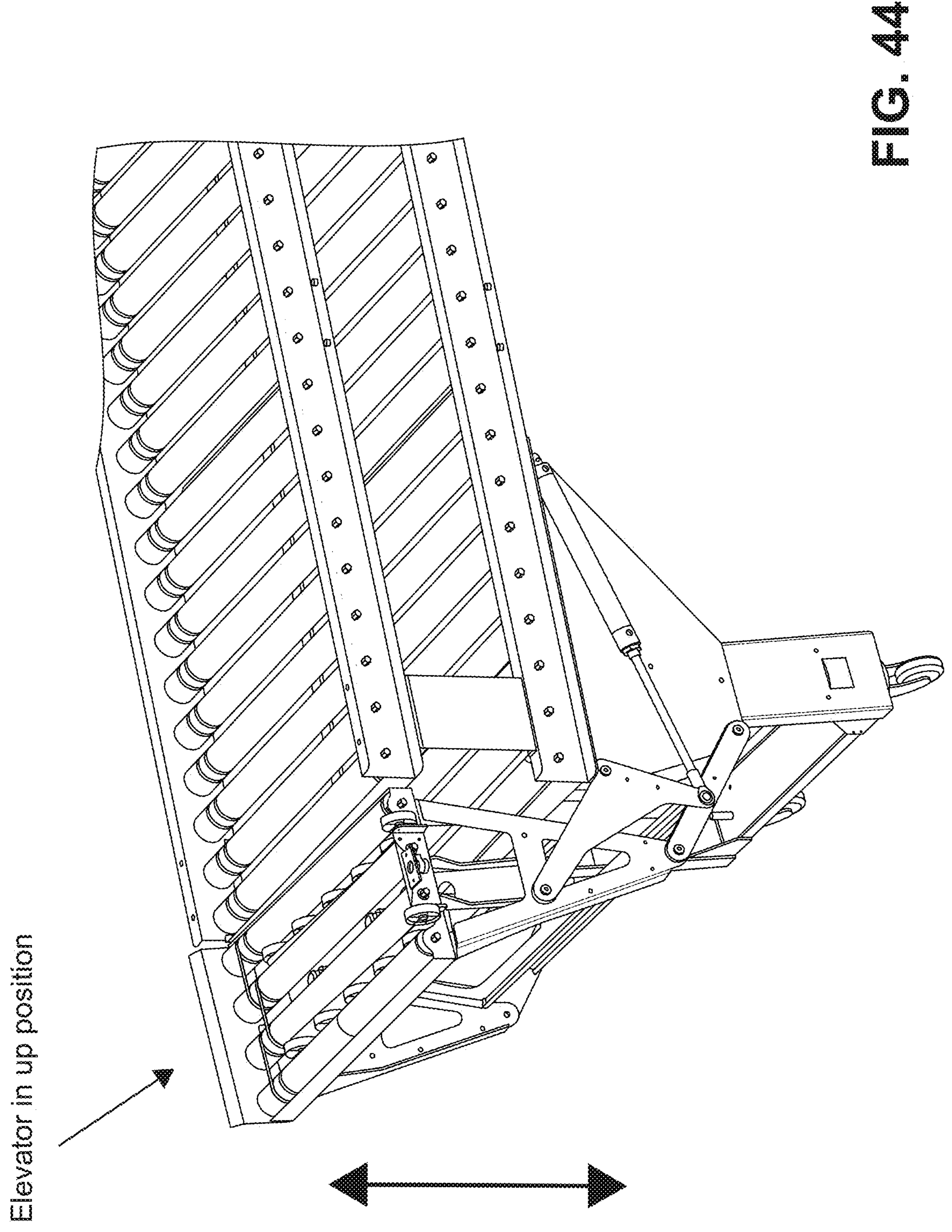

In order to move the tray to the upper conveyor level, an elevator mechanism is used. It consists of a linkage, which is pneumatically operated with an air cylinder to raise the entire elevator platform to the upper level. FIGS. 43 and 44 are perspective views of the tray transfer platform is a lowered or down position (FIG. 43) and an elevated or up position.

Figure 45:
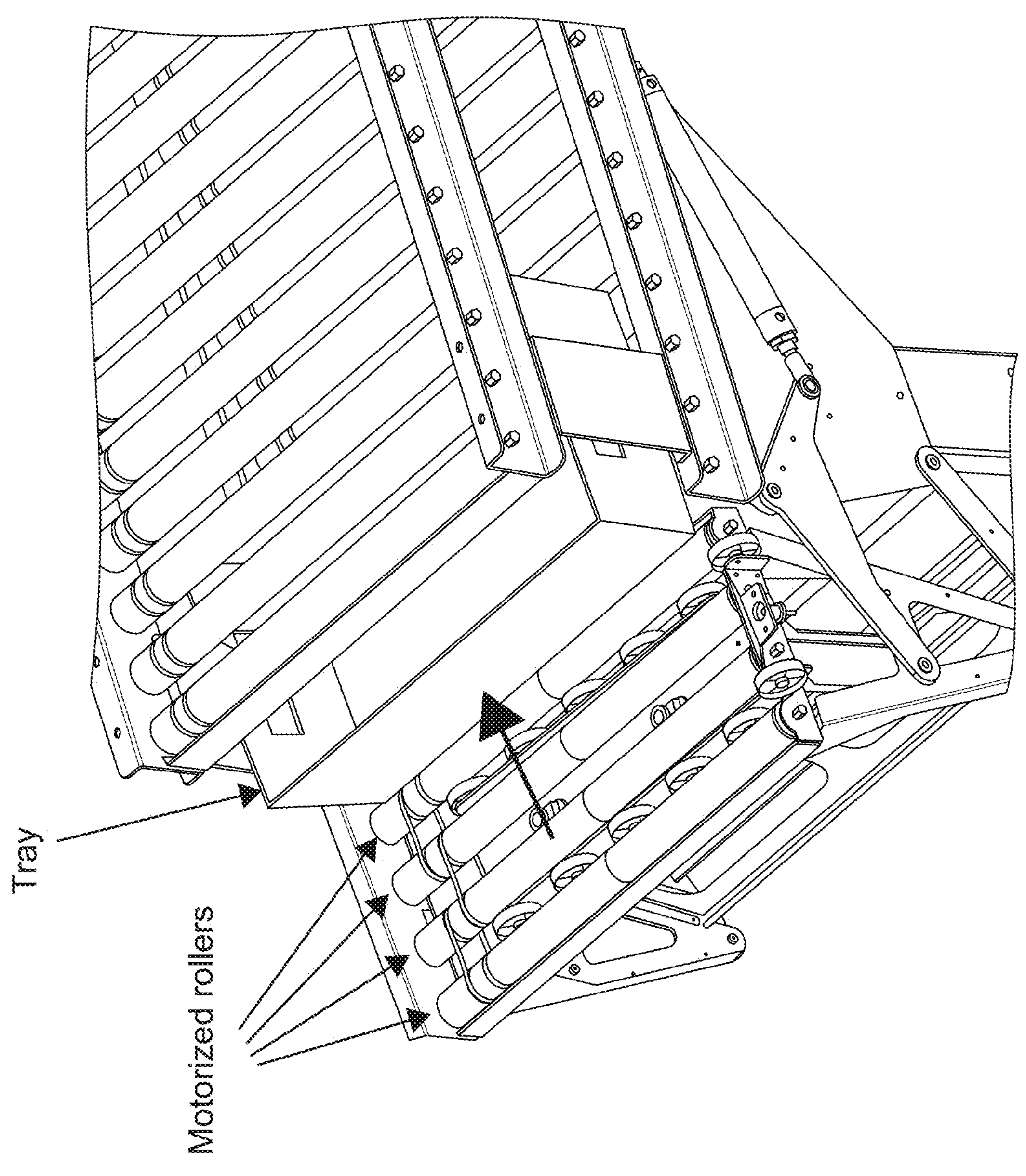
FIG. 45 is a perspective view of the tray transfer platform showing the two different styles of roller members used for transferring a tray from the tray loading station and for subsequently moving a tray towards the output conveyors.

FIG. 45 is a perspective view of the tray transfer platform showing the two different styles of roller members used for transferring a tray from the tray loading station and for subsequently moving a tray towards the output conveyors. As shown, motorized conveyor rollers are used to transport the tray to the output conveyors. It should be noted that, in alternative embodiments, the outfeed conveyor may include more than two levels and the elevator mechanism be used to transport to any of said levels, thereby further increasing tray capacity and reducing the number of times an operator must unload this area of the work cell.

Figure 46:
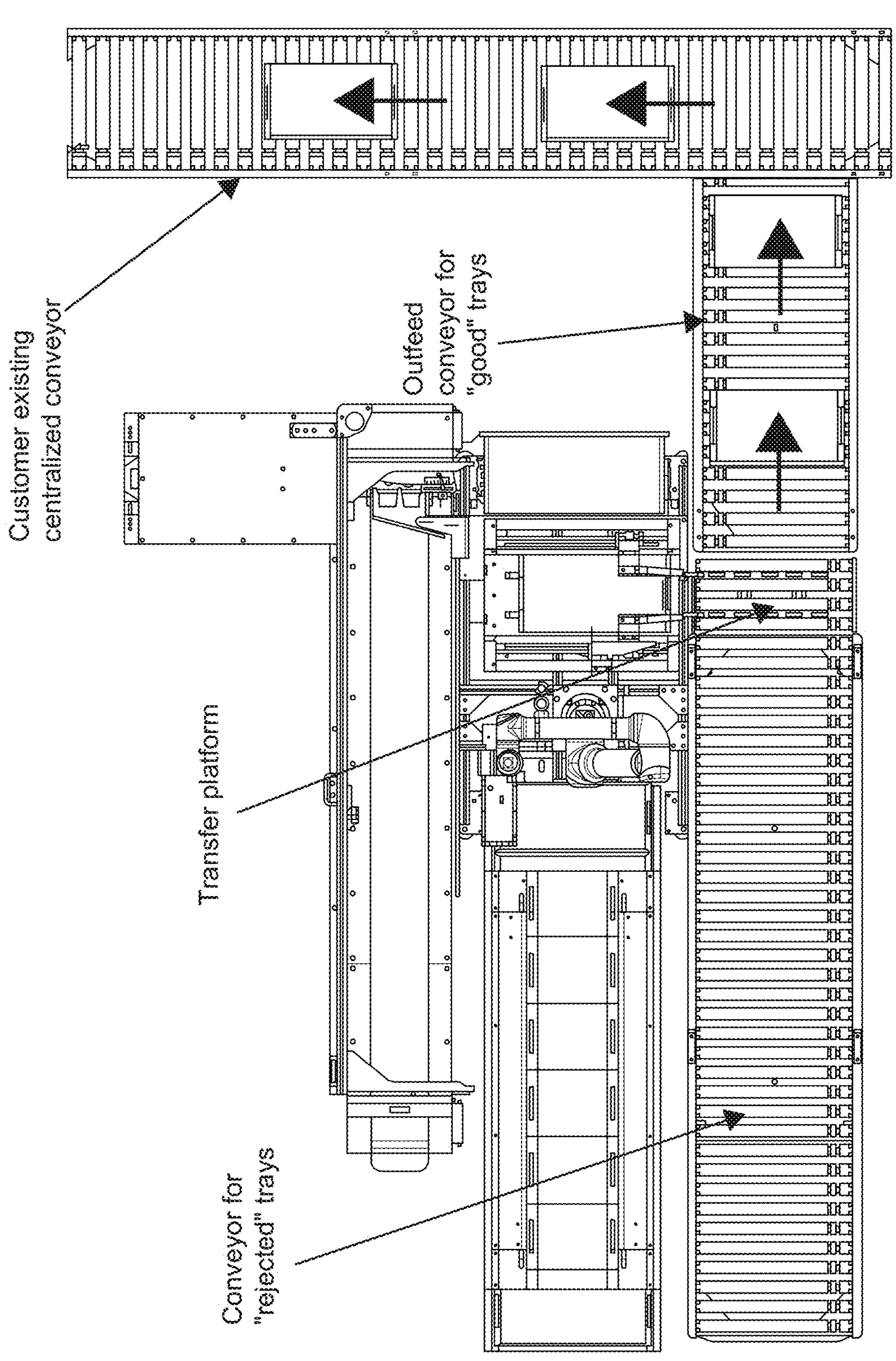
FIG. 46 is a plan view illustrating placement of the work cell layout of FIG. 34 with a centralized conveyor system and reconfigured to function with such a layout.

It should be noted that, depending on a particular customer layout, the output system of the work cell can be reconfigured. For example, some customers may have a centralized conveyor system where the finished mail trays are collected and palletized away from the work cell. FIG. 46 is a plan view illustrating placement of the work cell layout of FIG. 34 with a centralized conveyor system and reconfigured to function with such a layout. In the illustrated embodiment, the tray transfer platform is identical to the one shown in the previous layout, with the exception that the elevator mechanism is not required. Selection between the two paths is done by energizing the motor in one of two directions. Referring to FIG. 46, when the transport is energized to the left, the tray will be moved to the reject conveyor, to be reconciled by the operator. If the tray is good, the motor will be energized to the right, which will move the tray to the output conveyor and then to the customer's centralized conveyor system.

Tool Blade Geometry for Improved Penetration:

During the penetration of the tool into the stack, there is an opportunity for the blade of the tool to catch on cutouts on the face of the envelope. These cutouts, called 'windows' are used so that the address printed on the document inside of the envelope is visible. For the blade of the tool to penetrate the stack without crushing the top of the envelopes, a portion of the blade of the tool must be sharp enough so that it slices into the stack. However, if this sharpened corner passes by the window of the envelope, there is a good possibility the sharp edge will catch the window and tear it.

FIGS. 47, 48, 49, and 50 are side views of one embodiment of a blade of the tool configured to better 'knife' or slice into the stack of mailpieces without catching on cutouts on faces of the individual mailpieces. In particular, a special motion profile is used.

Figure 47:
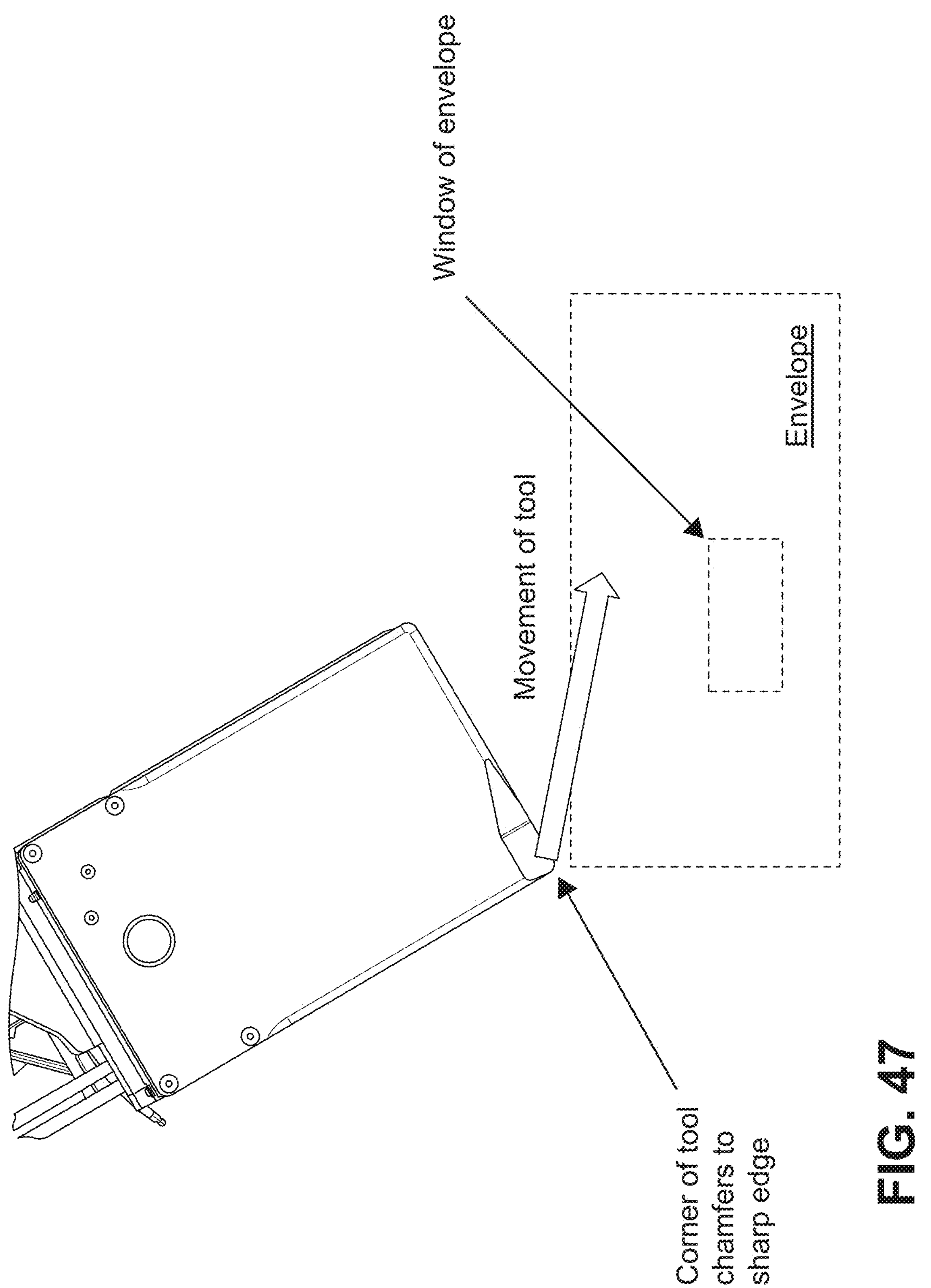
FIGS. 47, 48, 49, and 50 are side views of the blade of the tool that is configured to better 'knife' or slice into the stack of mailpieces without catching on cutouts on faces of the individual mailpieces.
Figure 48:
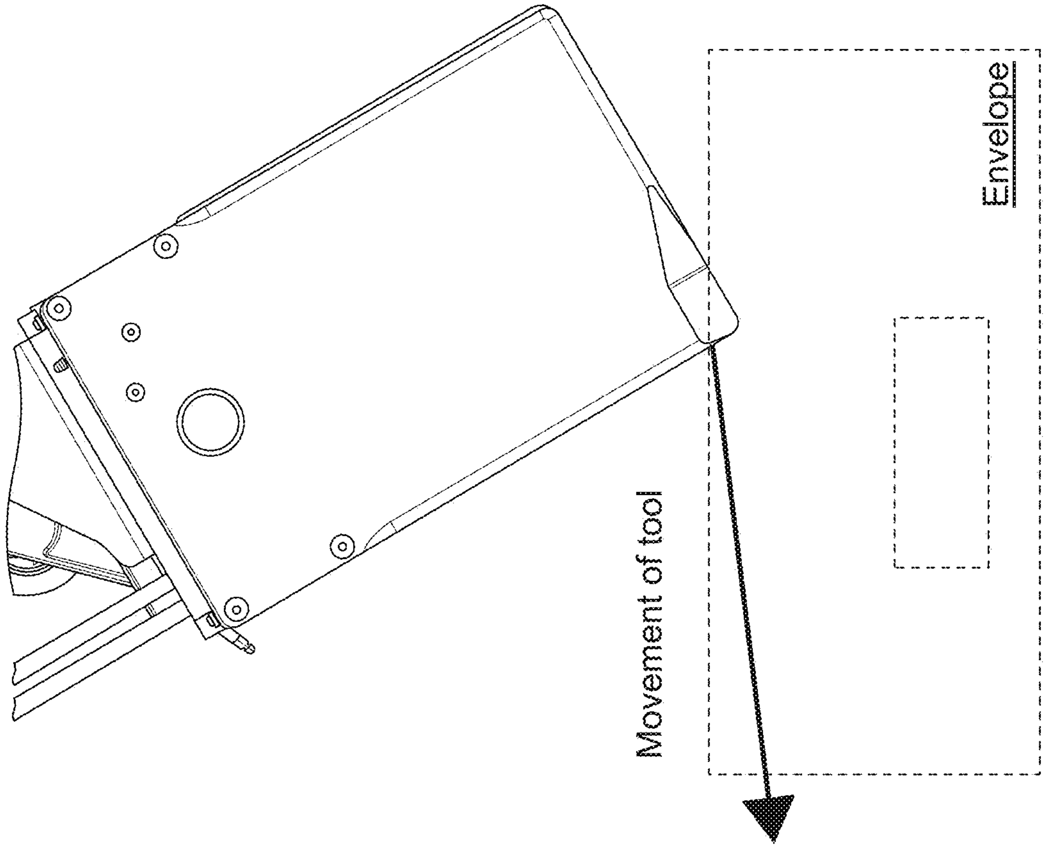

As shown in FIG. 47, the tool is first moved at a low angle over the top of the mail to get the corner into the stack. Next, the tool is moved so that the sharp corner of the tool moves out of the stack and away from the window, as shown in FIG. 48. The path of the sharp corner is designed so that it does not pass near the edges of the window.

Figure 49:
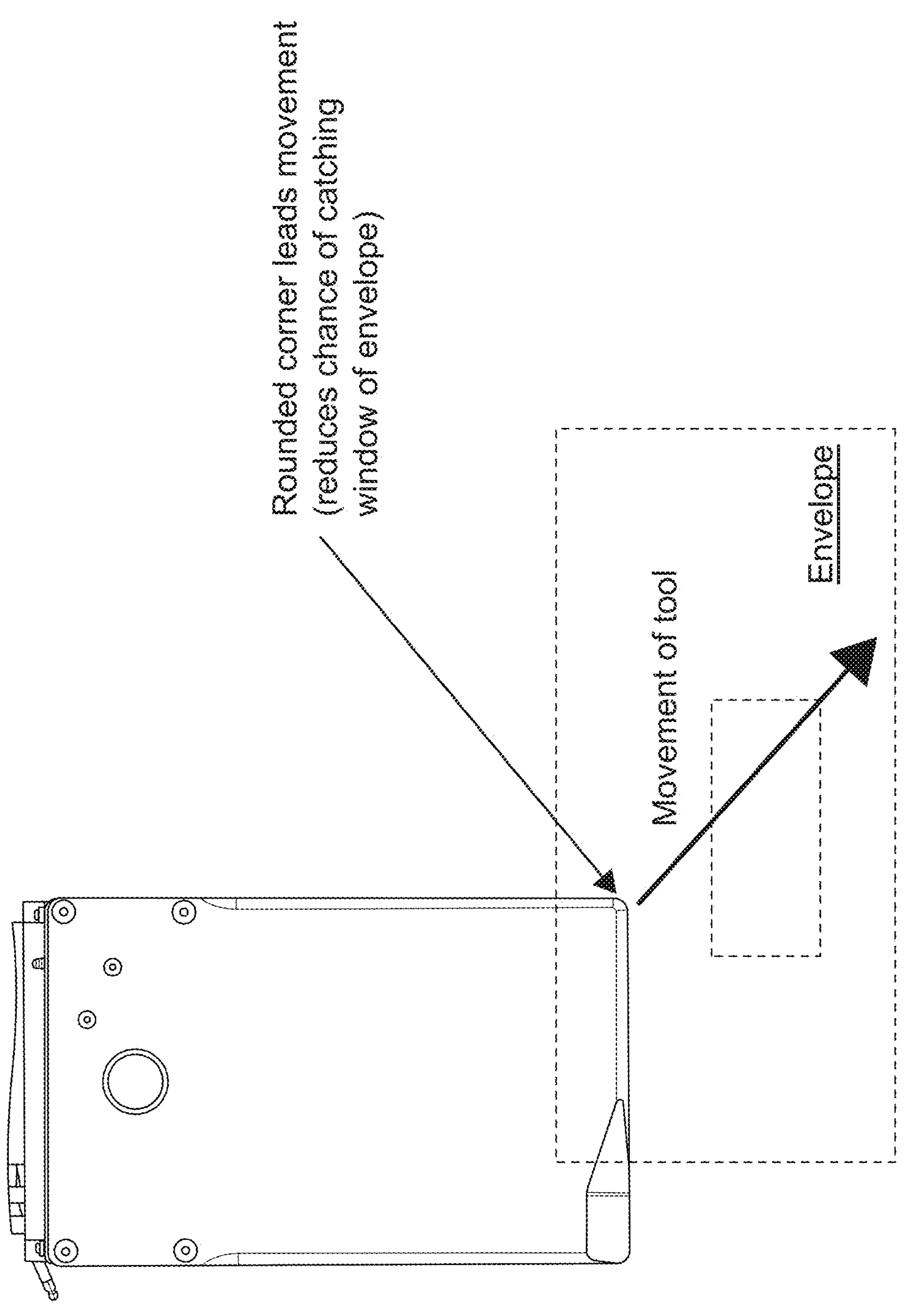
Figure 50:
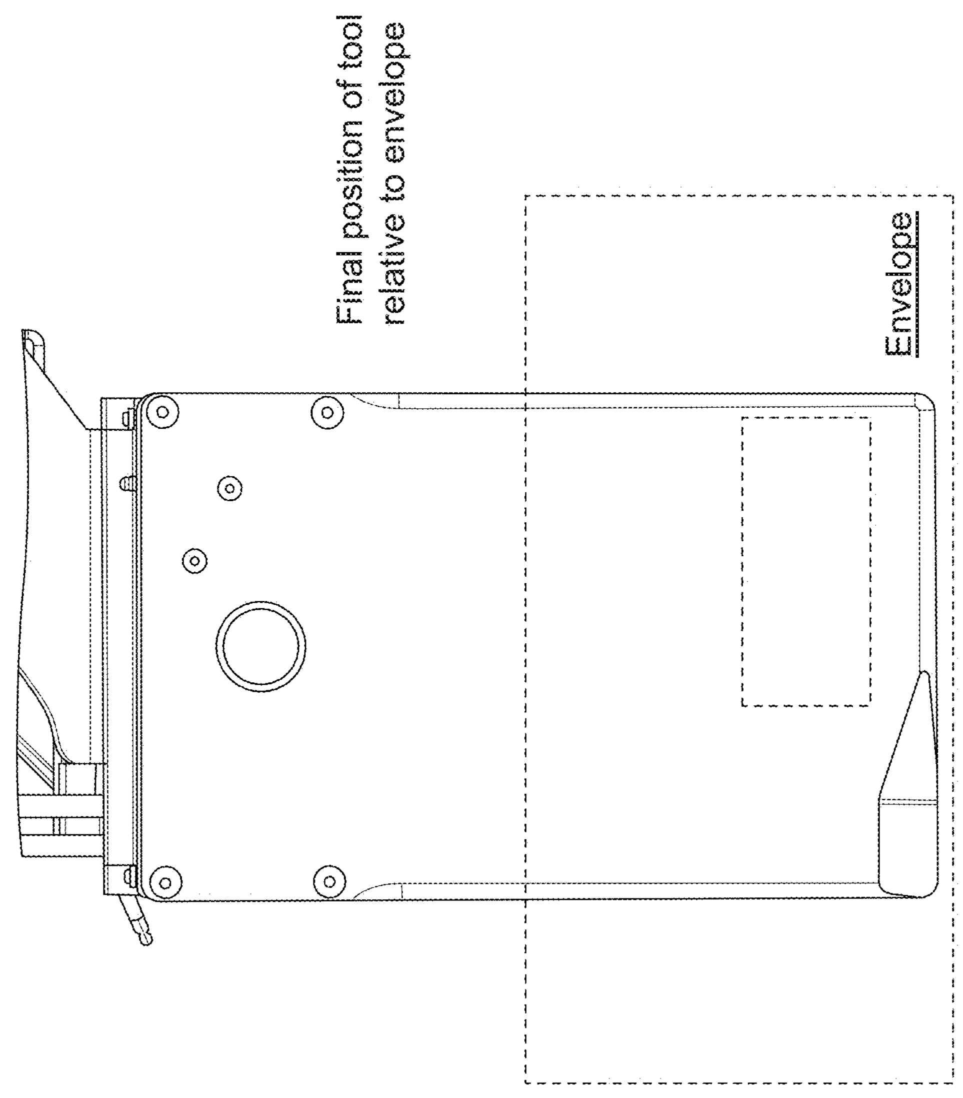

Finally, as shown in FIGS. 49 and 50, the tool is moved fully into the stack. At this point, the corner of the tool that is leading has switched from the sharpened corner to the rounded corner and the likelihood of catching the window is greatly reduced.

'Paddle Mode':

For steady state operation, the motorized paddle will support the stack of mail on the stacker belt, preventing it from falling over. The paddle itself may generally be formed from a sheet metal part, and may be comprised of a set of fingers (i.e., three fingers), thereby allowing for the blade of the end effector to pass through the fingers and essentially grip the mail when necessary.

Figure 51:
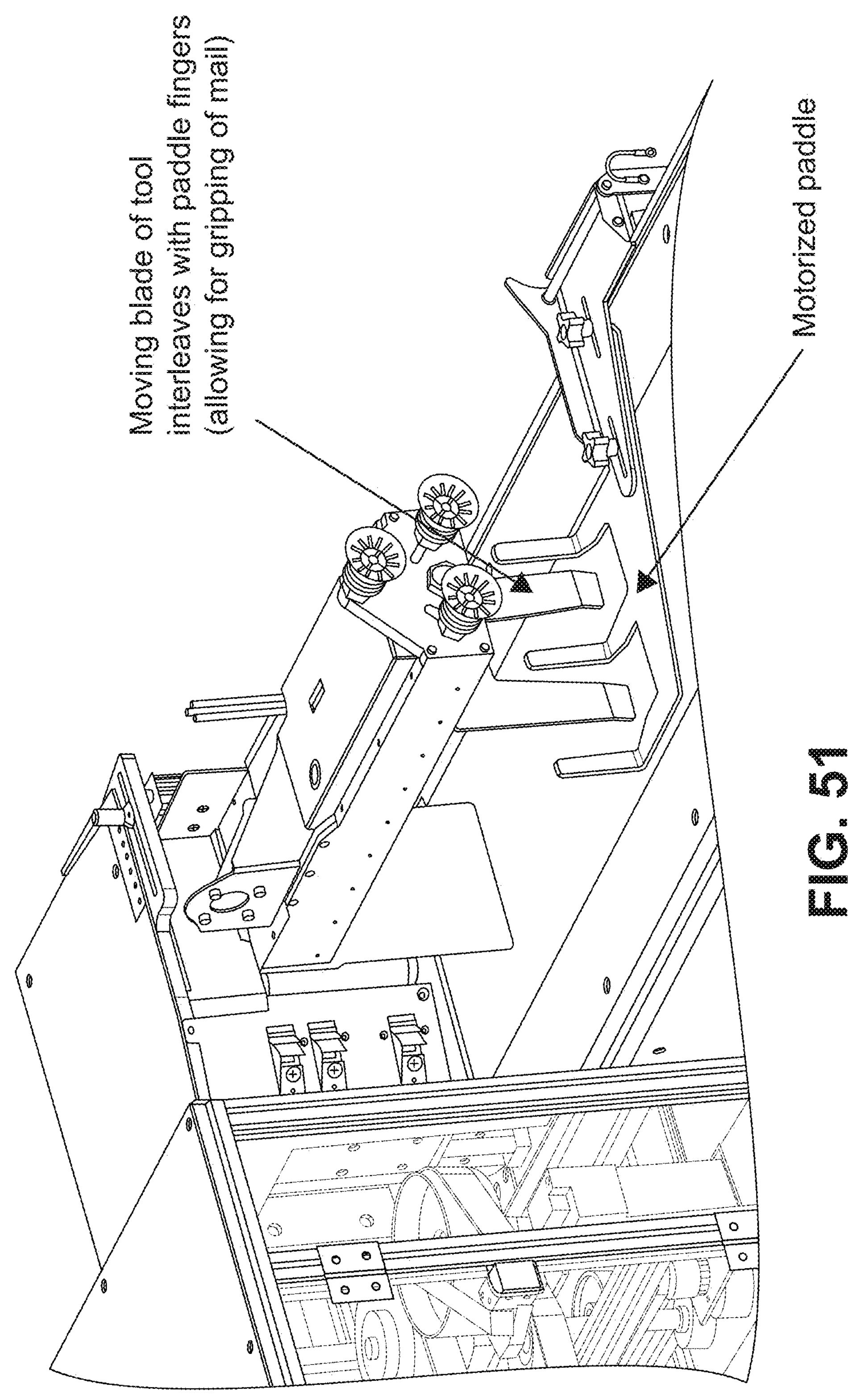
FIGS. 51 through 55C are various perspective views illustrating operation of the tool and the motorized paddle in a unique 'paddle mode' which allows for stacking of mailpieces in an efficient manner and without causing potential jams.
Figure 52:
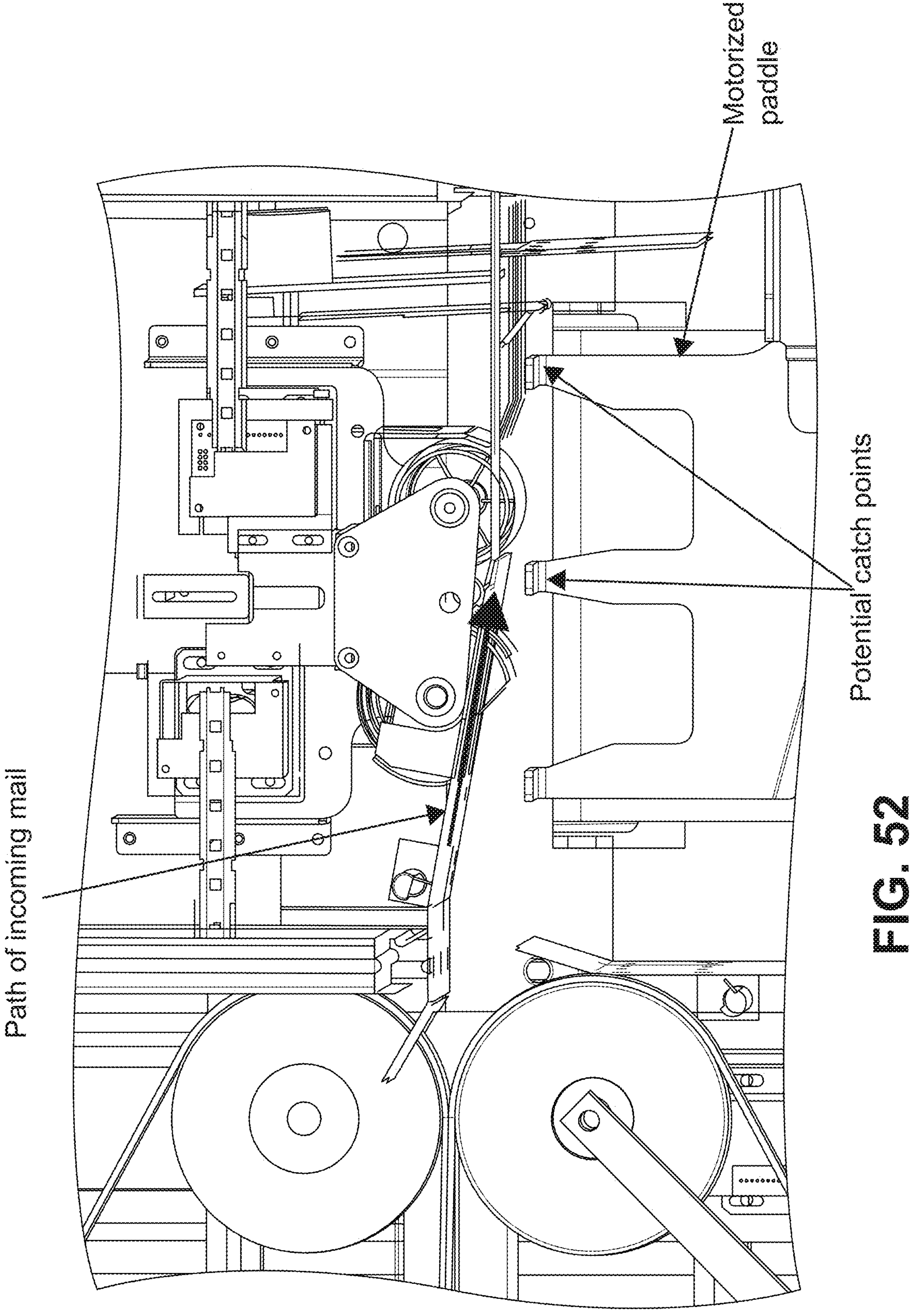
Figure 53:
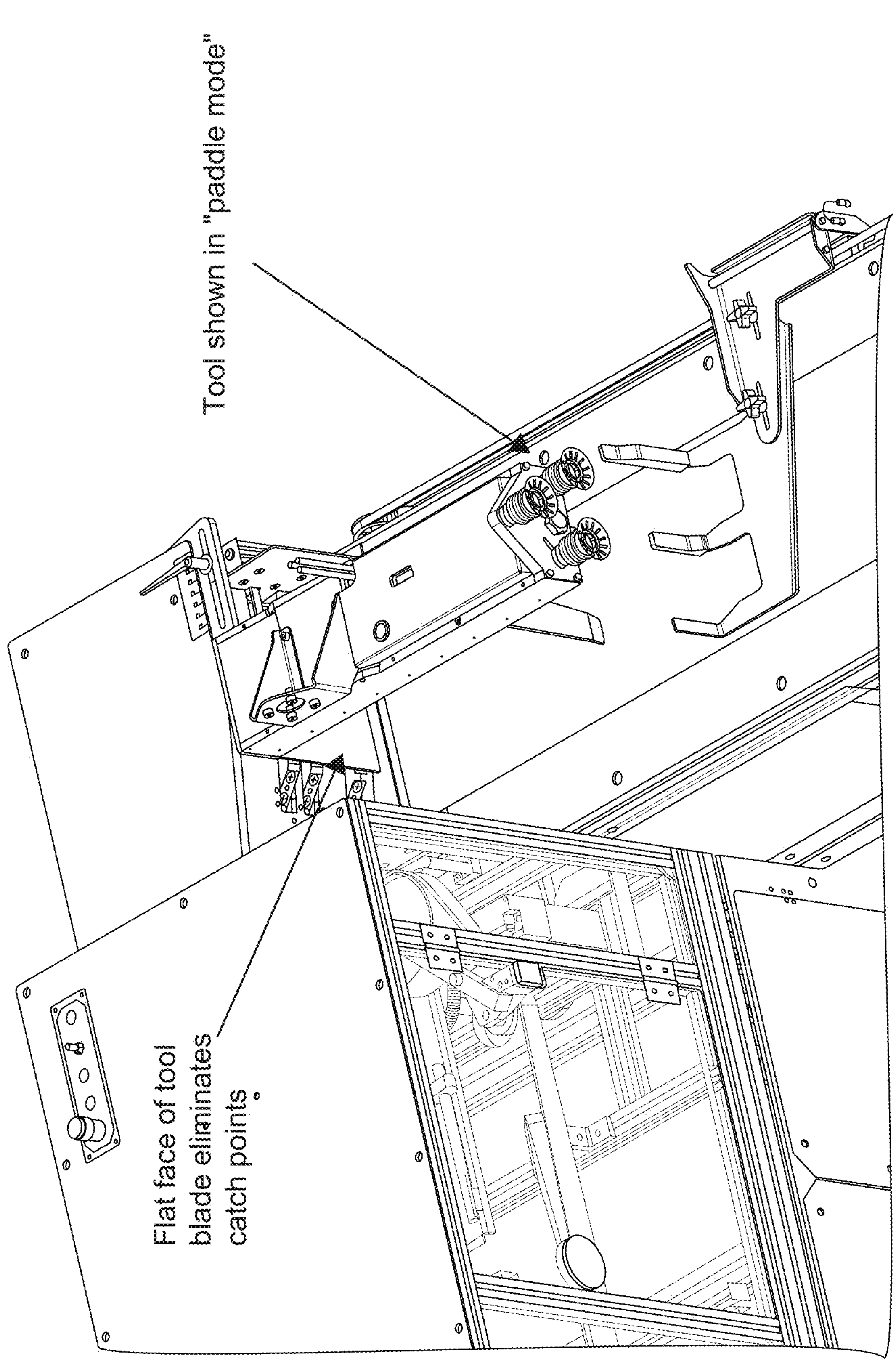
Figure 54:
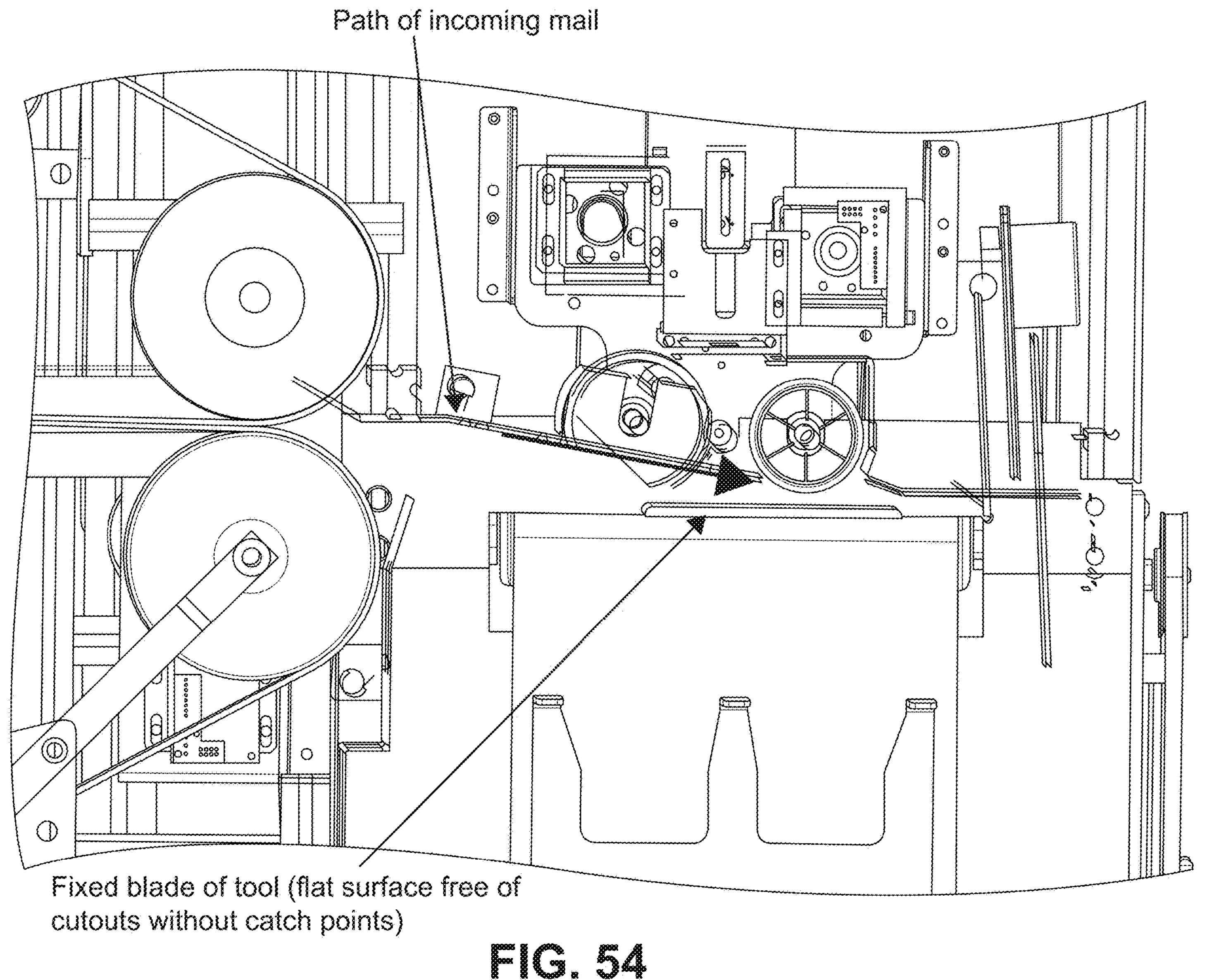

For example, FIG. 51 is a perspective view of the tool including the motorized paddle (with the COBOT arm removed for clarity). While the arrangement is beneficial in that it allows the blade to pass through the gaps between the fingers, the fingers of the paddle make it unsuitable to support the first piece of mail that enters the stacker, as the individual fingers become catch points, causing the mail to jam. For example, FIG. 52 is a top view of the stacker, showing the path of the mailpiece as it enters the stacking region and further illustrating the potential catch points along the pathway caused by the fingers of the paddle.

To address this issue, the motorized paddle is moved out of the way, and the COBOT end effector is used to support the mail for an initial amount of mail (e.g., approximately the first 100 mm of length in mail that is stacked on the stacker). For example, with reference to FIGS. 53, 54, and 55A through 55C, during this mode of operation, the position of the end effector is electronically geared to the motion of the stacker's conveyor belt, so that they both move in unison. Once the mail stack has reached the appropriate length (e.g., the 100 mm in length), the tool will move straight up the height of the motorized paddle fingers, and then the motorized paddle will take over the job of supporting the stack of mail.

Figure 55A:
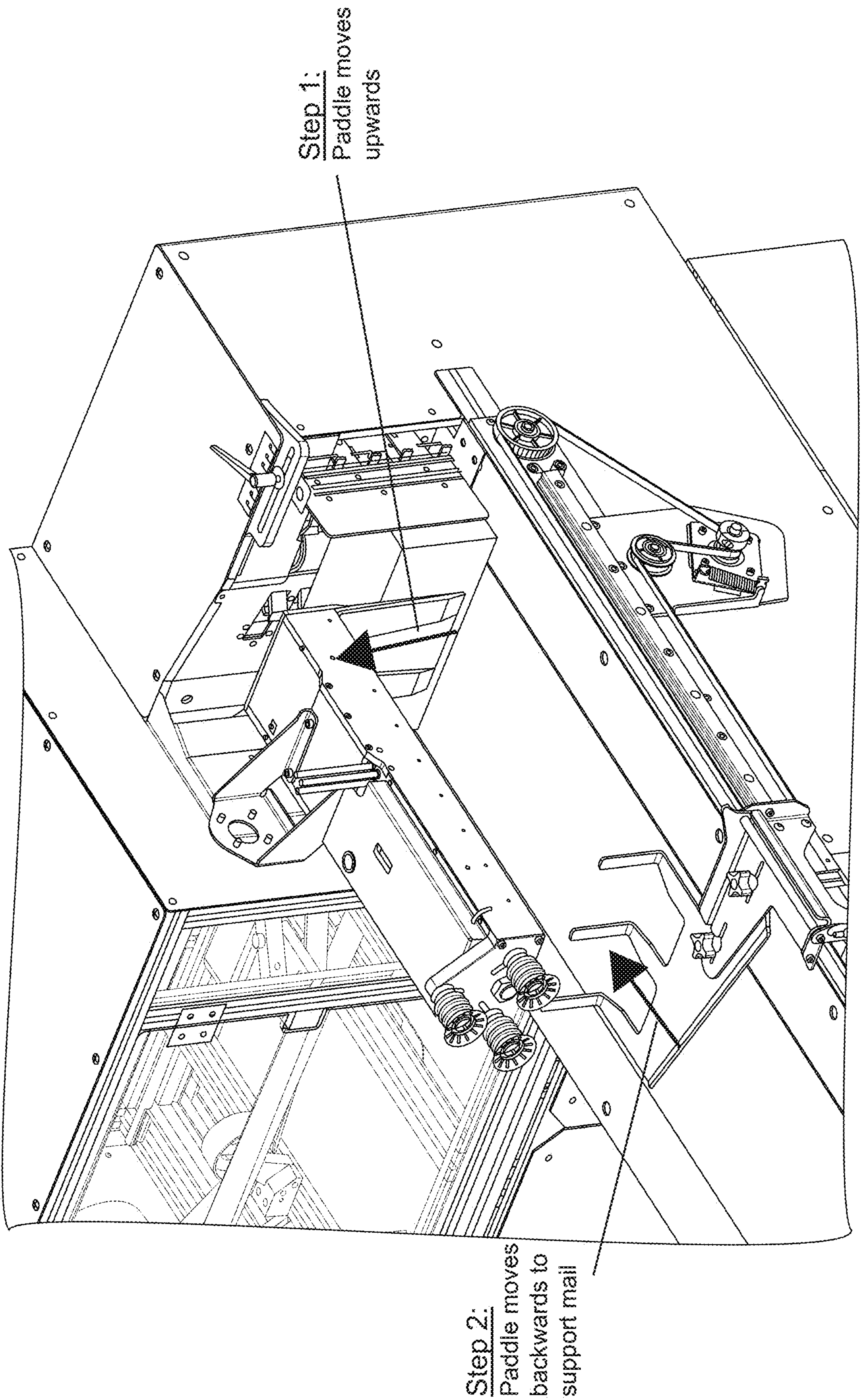
Figure 55B:
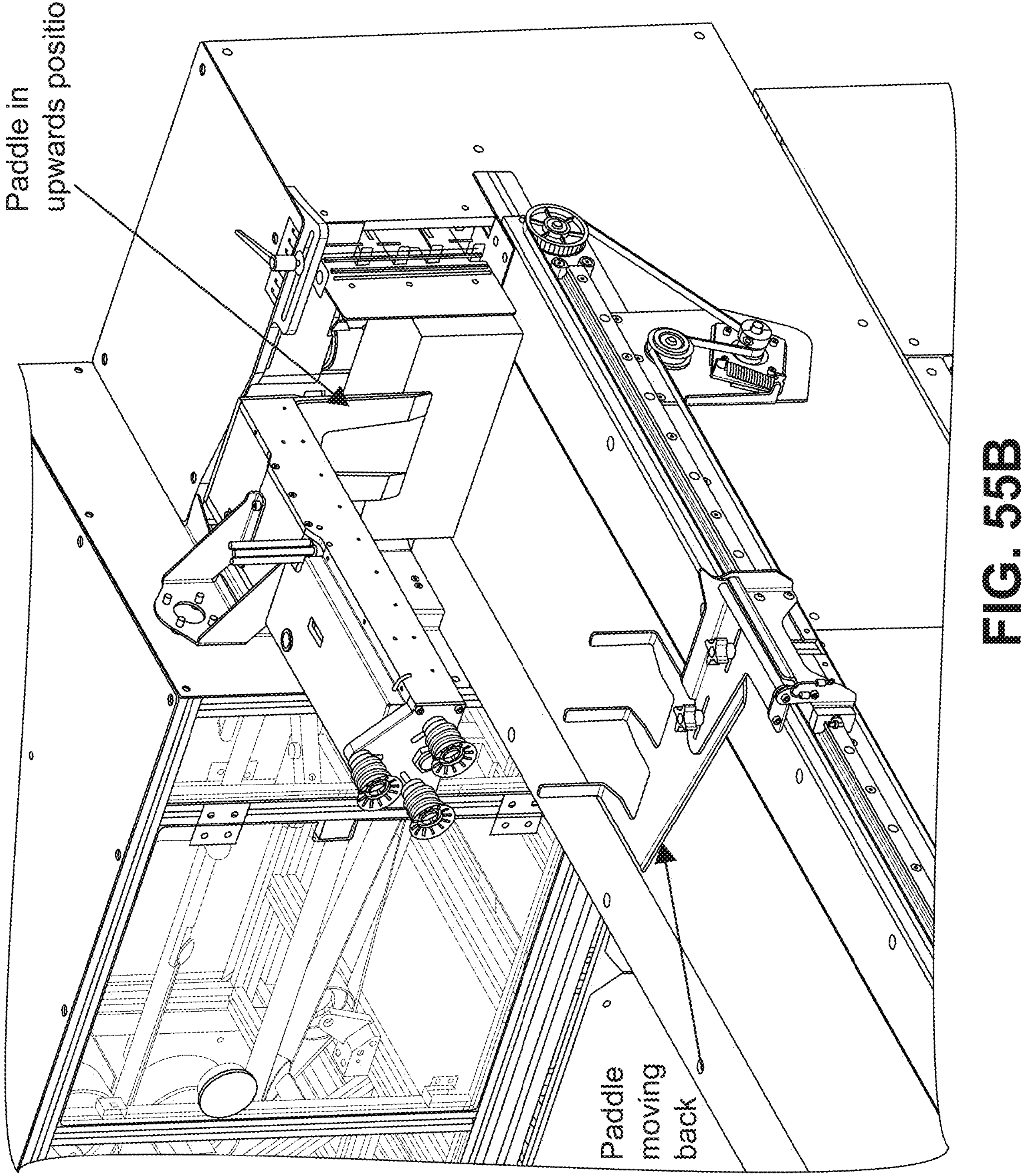
Figure 55C:
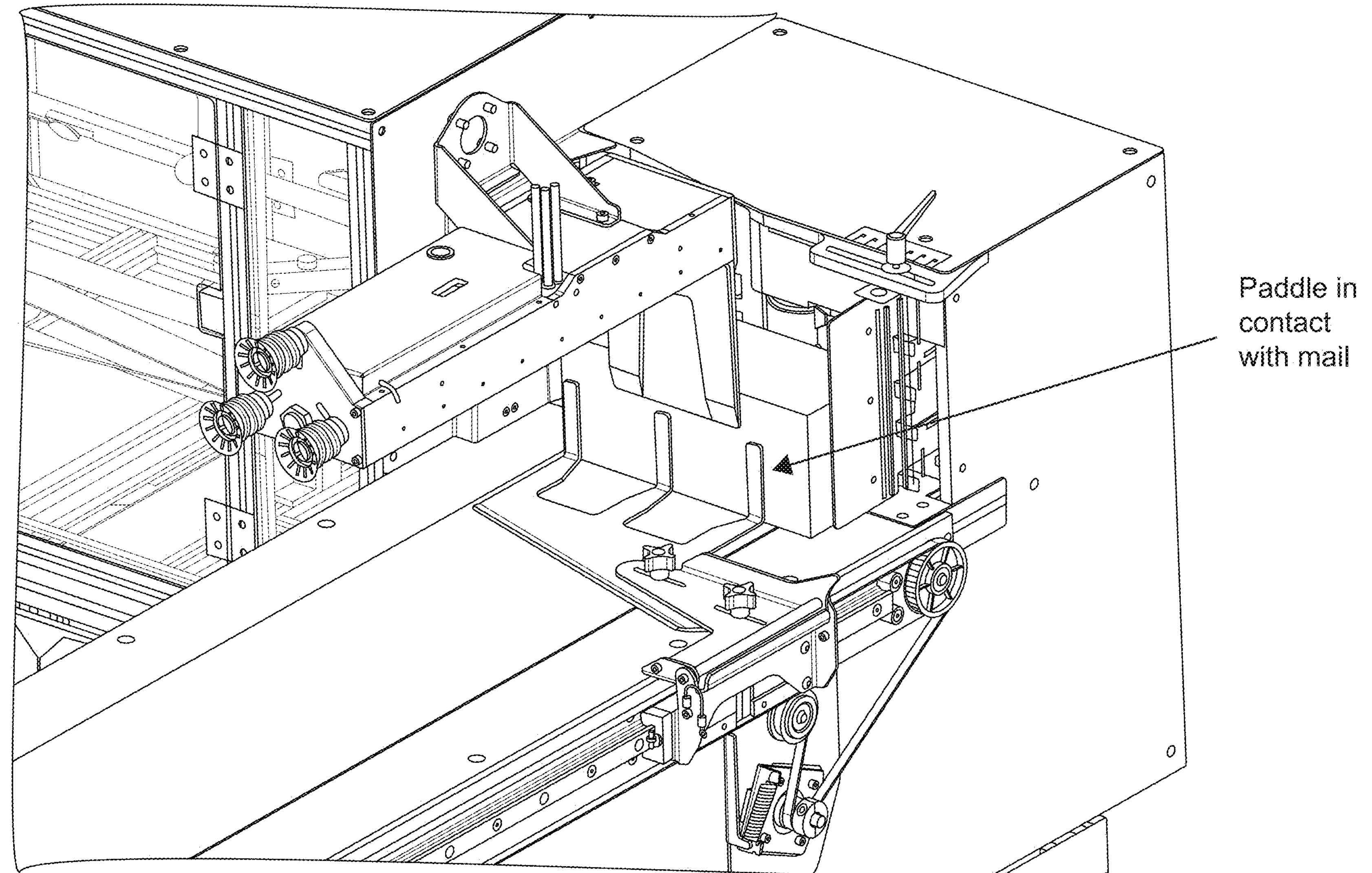

FIGS. 55A, 55B, and 55C are perspective views illustrating operation of the tool and the motorized paddle in a unique 'paddle mode' which allows for stacking of mailpieces in an efficient manner and without causing potential jams. Once the motorized paddle is in contact with the mail, the tool (end effector) can be moved away to complete other tasks.

Figure 56:
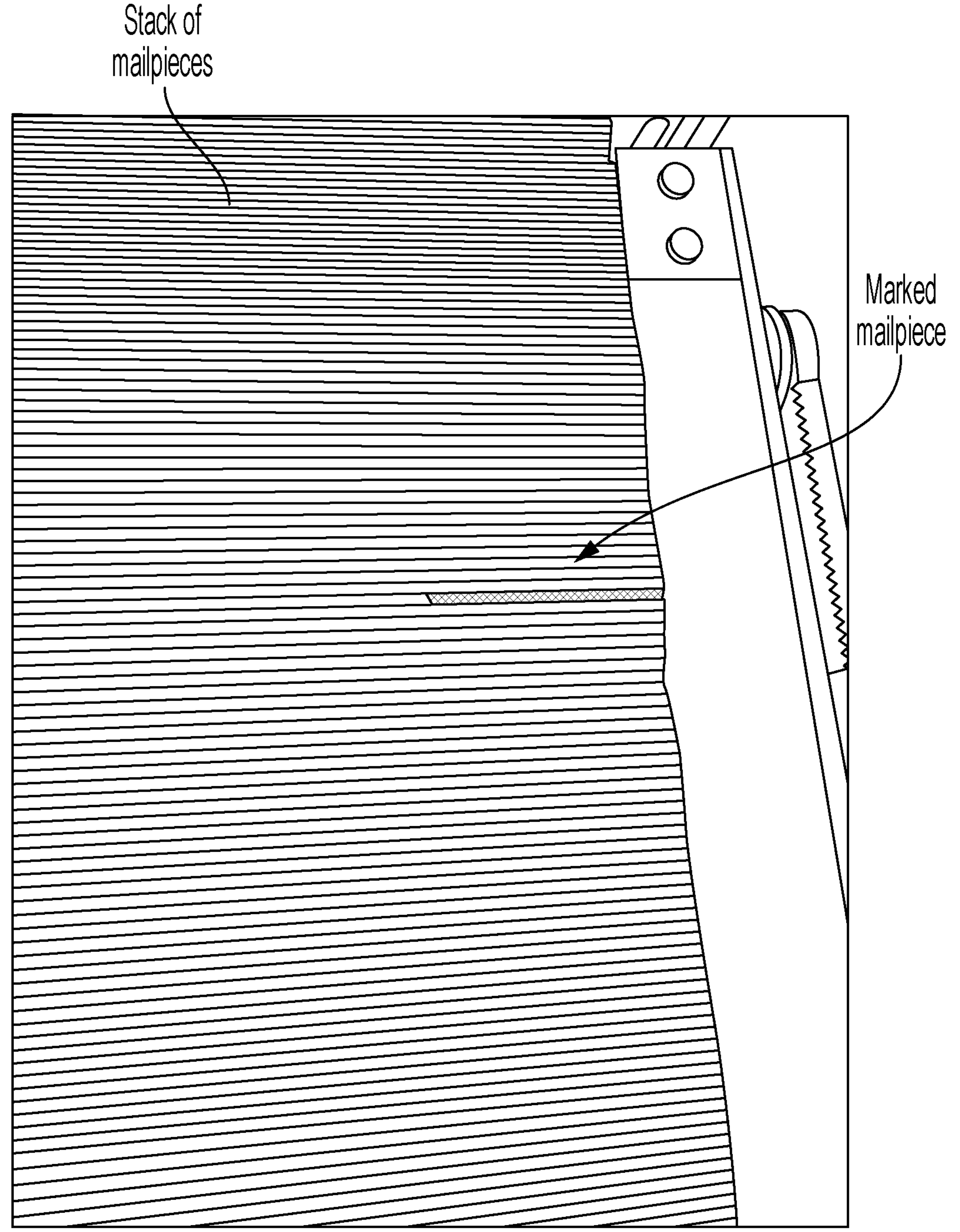
FIG. 56 is an image of a stack of mailpieces, including a mailpiece having an edge mark (in the form of a visual cue) to be used by a camera system for determine a tray break without the need for offsets in the stack.

Tray Break:

In an alternate embodiment of picking a tray break, edge marks may be used to indicate the beginning of a new tray. Using a camera detection system, a camera can provide the exact location of the edge marked mailpiece. More specifically, FIG. 56 is an image of a stack of mailpieces, including a mailpiece having an edge mark (in the form of a visual cue) to be used by a camera system for determine a tray break without the need for offsets in the stack. This data would be fed to the COBOT, which would then use the location information to slice into the stack at that exact position. This negates the need to offset and could be more fault tolerant, as it is impossible for the mark on the first piece to shift to another piece in the stack.

Figure 57A:
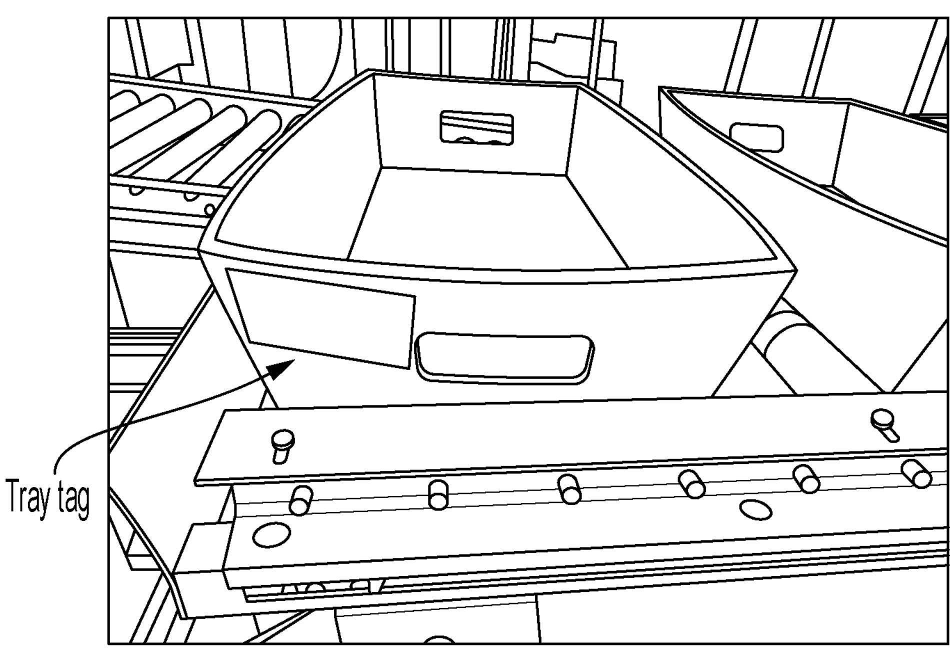
FIG. 57A and FIG. 57B are images of a tray including a bar code (FIG. 57A) and a mailpiece within a stack of mail including an edge mark (FIG. 57B), each of the bar code and edge mark being used as part of a tray integrity verification system for ensuring that a given stack of mail (as indicated by a first mailpiece with an edge mark) is loading in the correct tray (as indicated by the associated bar code).
Figure 57B:
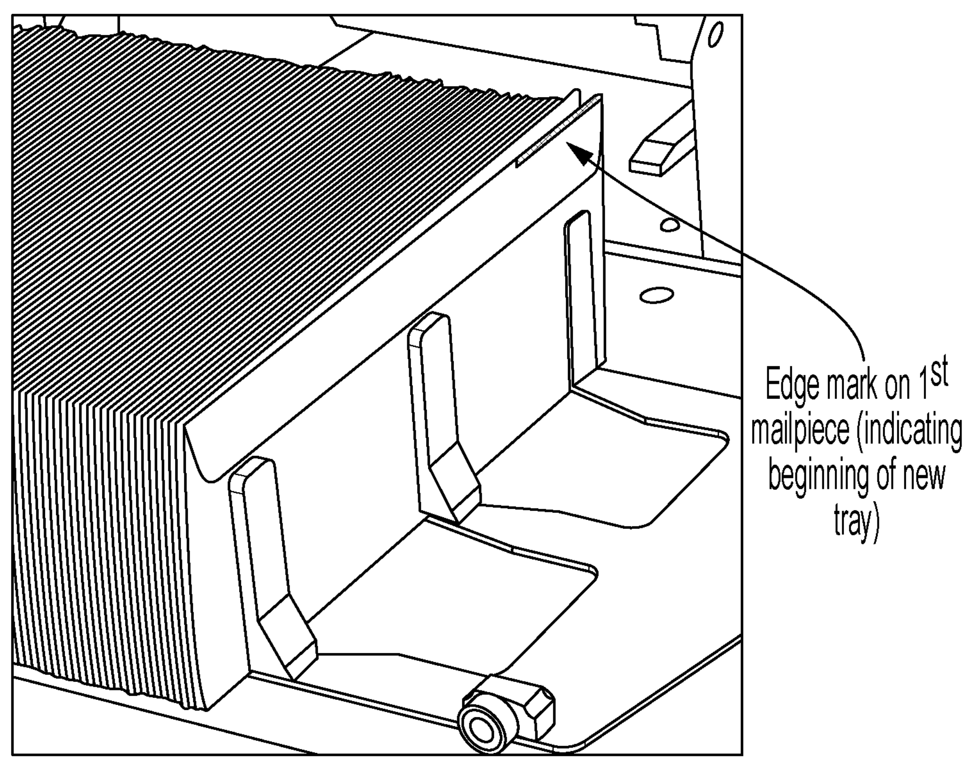

Tray Integrity Verification System:

The system of the present invention may further incorporate a tray integrity verification system, which includes, among other things, a tray tag scanner, a mail edge marker installed in the area close to the stacker entrance, and at least one edge mark detection sensor positioned near the area of stack pick up. The tray tag scanner is configured to read a bar code provided on an empty tray as the COBOT moves the tray into the tray loading station. FIG. 57A and FIG. 57B are images of a tray including a bar code (FIG. 57A) and a mailpiece within a stack of mail including an edge mark (FIG. 57B), each of the bar code and edge mark being used as part of a tray integrity verification system for ensuring that a given stack of mail (as indicated by a first mailpiece with an edge mark) is loading in the correct tray (as indicated by the associated bar code). By using scanned data, the work cell control system verifies if the first mailpiece on the belt of the stacker belongs to this tray. The function of the edge marker is to mark the first piece of a new mail tray.

Figure 57C:
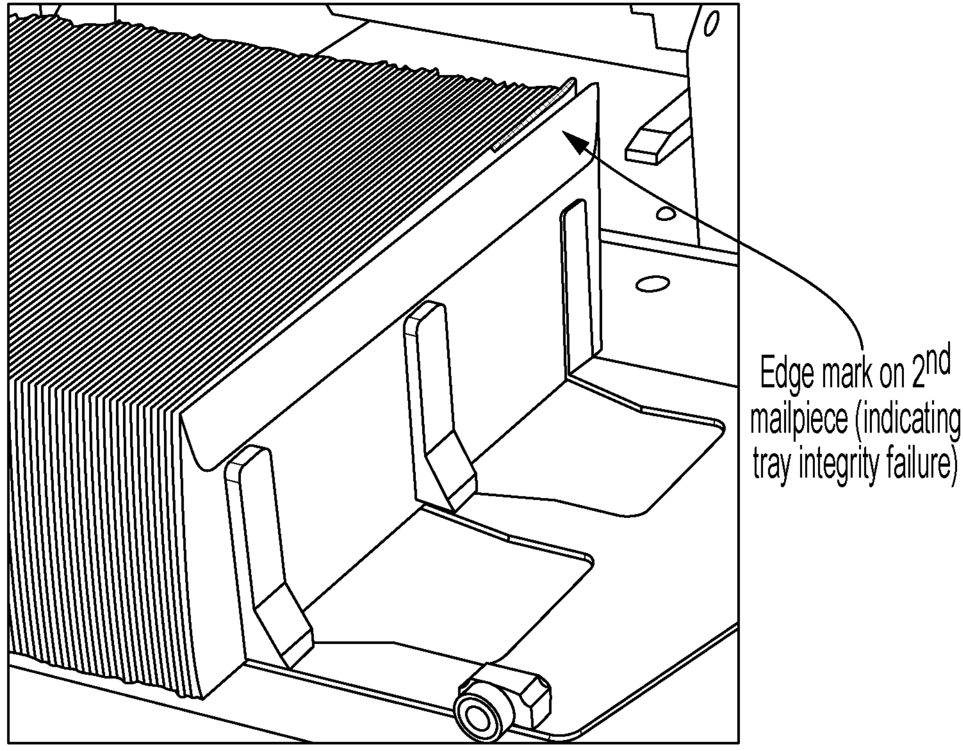
FIG. 57C is an image of a stack of mailpieces in which a second mailpiece in the stack (as opposed to the first mailpiece) has an edge mark, thereby indicating that the stack to be subsequently loaded in the given tray is a "bad" tray and should be rejected.

The function of the edge mark sensor is not only to detect the edge mark but also detect the position of the marked mailpiece in the stack. Tray integrity is considered confirmed if the edge mark sensor detects the mark on the first mailpiece and not on any other adjacent pieces prior to the first and after the last batch picking. If the mark is not present on the first piece prior to the first or after the last batch picking, the tray integrity is considered bad. For example, FIG. 57C is an image of a stack of mailpieces in which a second mailpiece in the stack (as opposed to the first mailpiece) has an edge mark, thereby indicating that the stack to be subsequently loaded in the given tray is a "bad" tray and should be rejected.

System Calibration:

For the robotic work cell to correctly operate, the locations of the on-edge stacker, tray infeed conveyor, and tray loading station relative to the robot must be precisely known to within +/−1 mm. This can be achieved in several ways. The first method is to design all the components with very tight tolerances and require that the person setting up the work cell aligns each of the modules very precisely. However, due to the size of the modules and work cell, getting all the components within this level of accuracy is cost prohibitive, as parts must be precisely machined so that a tolerance stack up does not put us outside our accuracy window. Even if the parts could be made with such accuracy, the time required for an operator to set up the work cell to be great.

To ease the manufacture and setup of the work cell, a calibration routine within the COBOT is used. From an initial mechanical setup, all that is required is that the service person assembles all the components within +/−100 mm (about +/−4 inches). For each of the modules (on edge stacker/infeed conveyors/tray loading station), the COBOT will use contact sensing on three surfaces to measure the X, Y, and Z coordinates of the modules relative to the COBOT. Additionally, for the on-edge stacker, additional contacts are used to determine the angularity of the stacker relative to the robot. This could also be done for the infeed conveyors and tray loading station but found to be not required. These coordinates are saved to the control system to be reused for all subsequent starts. This full calibration only needs to be after initial setup or if the work cell layout has mechanically shifted after any kind of service.

In addition to the above described calibration, there are two operator adjustments within the existing on-edge stacker which changes the X and the Y coordinates of the stacker. These adjustments are necessary and change whenever the size of the envelope being run into the stacker is changed. The control system will initiate a 'fast' calibration whenever the following has occurred: 1) a new operating mode has been selected within the inserter control system; and/or 2) a cover that accesses the robotic work cell has been opened, with the assumption that an operator may have manually adjusted a mechanism.

Upon either of these events, the control system will signal the COBOT to perform the fast calibration using the tool mounted laser sensor to re-find the X and Y coordinates of the stacker. This fast calibration requires less than 10 seconds of time to complete, compared to 2-3 minutes for the full calibration, minimizing the effect on the inserter productivity. By having these calibration routines in place ensures that the control system accurately knows the positions of each of the modules, improving ease of setup, and more importantly, ensures proper operation of the robotic work cell.

The systems of the invention provide an accurate method of determining the number of finished mail items that could be fit in a tray. In conventional systems, the information determining how many pieces of finished mail will fit in a mail tray comes from upstream processes, some of which are manual and prone to error. Therefore, to be sure that trays are not overfilled, the system is used to intentionally underfill each tray slightly. An important advantage of this invention is the ability to measure the combined compressed thickness of the stack of mail in each tray. This information could be useful to accurately calculate the operator to allow them to modify their filling algorithm, resulting in fuller trays and less wasted space within a pallet of trayed mail.

The systems of the invention may include modules to move the tray filled with stacks of the finished mail from the tray loading station to an external conveyor belt. The external conveyor belt could also be further automated for presorting the filled trays. Subsequently, the tray with stacks of finished mail could be moved for further sorting and may be palletized. These trays are then sent to presorting or shipping facilities. In certain embodiments, the systems of the invention may further separate the batches of the finished mail directed for different geographical areas and loading them in different trays.

In certain embodiments, the systems of the invention may further include a vision system. The vision system of the system can perform functions selected from a group consisting of: (i) verification of tray integrity, (ii) verifying tray size, (iii) verify the mail stacked on the edge stacker is stacked properly and suitable for being picked by the robot, and if the vision system detects that the mail is not stacked properly it can alert the operator, (iv) verify that the stacker is sealed properly, (v) detect if any mail is dropped during the process, and (vi) any combinations thereof.

As discussed above, the systems and methods of this invention are advantageous because it provides for an economic, cost-efficient, and a reliable method for loading the stacks of finished mail in the trays. Indeed, the systems of the invention may maximize the number of finished mail that may be loaded on each tray by compressing the mail before loading it on the tray. Another advantage of this system is that in conventional processes, the mail is underfilled in the tray to avoid the risk of overfilling the tray. In the method of the current invention, the length of the stack could be measured prior to filling in the tray. This information could be used to calibrate the instructions provided to the system to optimize the number of finished mail that could be filled in a single tray. This would lead to reduction of wasted space in the filled tray and/or pellets. Moreover, this information could be useful to feed back in the system and further optimize the amount of finished mail that could be included in a single tray.

Accordingly, the systems and methods of the invention eliminate the need for human operators to perform these functions and thus providing a reliable, faster, and economic system for loading the finished mailpieces on the trays ready for further processing.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A system for organizing finished mail, the system comprising:

a tray dispensing assembly comprising a plurality of trays;

a robotic arm designed to pick up a tray from the plurality of trays and place the tray on a tray loading station;

a gripper operably linked to the robotic arm and configured to pick up a stack of vertically oriented finished mail from a mail stacking module and place said stack of finished mail within the tray in the tray loading station; and a holding assembly in the tray loading station and configured to maintain one or more stacks of finished mail in a vertical orientation within the tray;

wherein the mail stacking module comprises a motorized paddle to maintain the finished mail in a vertical orientation.

2. The system of claim 1, wherein the holding assembly is further configured to push the tray on an external conveyer when the tray is loaded with the finished mail.

3. The system of claim 2, wherein the external conveyer comprises a roller gravity conveyor or a powered site-wide conveyor system that moves all loaded trays to a centralized area for palletization.

4. The system of claim 3, wherein the holding assembly comprises a hook and a horizontal bar.

5. The system of claim 4, wherein, once the tray is filled with one or more stacks of finished mail to a predefined volume or capacity, the hook will move the filled tray to the conveyer belt.

6. The system of claim 1, wherein the tray loading station is designed to position the tray accurately for loading finished mail by the gripper.

7. The system of claim 1, wherein the gripper comprises at least one fixed paddle and at least one sliding paddle.

8. The system of claim 7, wherein the sliding paddle is actuated by a linear actuator.

9. The system of claim 1, wherein the system further comprises a distance sensor operable to measure a length of the stack of mail picked up by the gripper.

10. The system of claim 1, wherein the robotic arm comprises one or more suction cups to aid in moving the tray from the tray dispensing assembly to the tray loading station.

11. The system of claim 1, wherein in the mail stacker module further comprises an offsetter to indicate one or more zip breaks in a stack of the finished mail.

12. The system of claim 1, wherein the motorized paddle holds a remainder of finished mail in a vertical orientation once the robotic arm picks up a first stack of finished mail from the mail stacking module.

13. The system of claim 1, wherein the system is configured to pick up about 10 inches of the finished mail in a given cycle of one or more cycles.

14. The system of claim 13, wherein the one or more cycles are repeated until the tray is filled to a predefined volume and/or capacity with finished mail.

15. The system of claim 1, wherein the mail stacking module is configured to create offsets in the finished mail stacks, wherein the finished mail stacks that are offset are placed in a new tray.

16. The system of claim 15, wherein the gripper picks up the offset stack of finished mail and places the offset stack in the tray and the tray is moved out of the tray loading station.

17. The system of claim 16, wherein the tray is moved to an external conveyer belt for palletization.

18. The system of claim 1, further comprising a vision system to automate the process of filling trays.

19. The system of claim 1, wherein the tray dispensing assembly removes one tray from the stack of trays to be picked up by the robotic arm.

20. The system of claim 19, wherein the tray picked up by the robotic arm is placed in the tray loading station.

21. The system of claim 20, wherein the tray loading station further comprises a pneumatically operated backstop to hold the tray in place during the process of loading the tray.

22. The system of claim 1, wherein the tray dispensing assembly comprises a tray infeed conveyor assembly.

23. The system of claim 22, wherein the tray infeed conveyor assembly comprises multiple conveyor levels, each level comprising a series of motorized belts configured to support and transport empty trays to an end of the respective level for subsequent picking up by the robotic arm.

24. The system of claim 23, wherein at least one of the conveyor levels comprises one or more photocells positioned proximate to an end of the conveyor level, wherein said one or more photocells are configured to sense the presence of a tray on the conveyor and thereby communicate said presence, or lack thereof, to a controller operably associated with the motorized belts and configured control operation thereof and control movement of one or more trays along the conveyor level.

25. The system of claim 1, further comprising an outfeed conveyor assembly positioned adjacent to the tray loading station and configured to receive trays therefrom.

26. The system of claim 25, wherein the outfeed conveyor assembly comprises multiple conveyor levels.

27. The system of claim 26, wherein the outfeed conveyor assembly comprises a tray transfer platform configured to transfer trays from the tray loading station and further redirect trays to at least one of the multiple conveyor levels.

28. The system of claim 27, wherein the tray transfer platform is configured to transition, via an elevator mechanism, between one of multiple vertical orientations in corresponding alignment with each of the respective multiple conveyor levels.

29. The system of claim 1, wherein the gripper comprises an optical sensor for use in detecting one or more zip breaks in a stack of the finished mail.

30. The system of claim 29, wherein the optical sensor is configured to determine a location of an offset in the stack of the finished mail based, at least in part, on detecting an edge associated with a set of offset finished mail relative to a set of non-offset finished mail.

31. The system of claim 30, further comprising a controller operably associated with the optical sensor and gripper and configured to receive data from the optical sensor and determine a position of the offset based on said data.

32. The system of claim 31, wherein the controller is configured to control movement of the gripper based on the determined position of the offset so as to cause the gripper to pick up the offset stack of finished mail.

33. The system of claim 1, further comprising a controller configured to communicate and exchange data with the robotic arm and further control movement of the gripper portion thereof.

34. The system of claim 33, wherein the controller is configured to command the gripper portion to move in a predefined series of motions so as to cause the gripper to sufficiently penetrate a stack of finished mail without catching on cutouts on faces of mailpieces of the finished mail.

35. The system of claim 34, wherein:

a first of the predefined series of motions comprises moving a sharp corner of the gripper at a low angle over a top of the stack of finished mail to cause the sharp corner of the gripper to penetrate the stack;

a second of the predefined series of motions comprises moving the gripper so as to cause the sharp corner of the gripper to move through the stack of finished mail and away from any cutouts on faces of mailpieces; and a third of the predefined series of comprises moving the gripper with a rounded corner thereof leading fully into the stack of finished mail.

36. The system of claim 1, wherein an end effector of the robotic arm is configured to provide support to mail processed through the mail stacking module and assist in maintaining the processed mail in a vertically stacked arrangement for a predefined length.

37. The system of claim 36, wherein, upon the stack of mail reaching the predefined length, a motorized paddle member is configured to provide support to the stack of mail when the end effector of the robotic arm retreats.

38. The system of claim 1, further comprising a tray integrity verification system configured to verify, in real time, whether a given tray has been filled with a correct stack of finished mail.

39. The system of claim 38, wherein the tray integrity verification system comprises:

a tray tag scanner configured to read a machine-readable label or tag associated with each tray as each tray moves into the tray loading station;

a mail edge marker for providing a visual edge mark upon a mailpiece to thereby designate said mailpiece as the first mailpiece within a stack of mail to be placed into a given tray; and an edge mark detection sensor configured to sense an edge mark on a given mailpiece.

40. The system of claim 39, wherein the system comprises a hardware processor coupled to non-transitory, computer-readable memory containing instructions executable by the processor to cause the tray integrity verification system to:

receive data from the tray tag scanner and identify a given empty tray and a known stack of finished mail to be placed in that given empty tray;

receive data from the edge mark detection sensor associated with one or more stacks of finished mail on the mail stacking module; and determine whether a given stack of finished mail present on the mail stacking module and to be placed within a corresponding empty tray is a good or bad based correlation of the the data from the tray tag scanner and data from the edge mark detection sensor.

41. The system of claim 1, further comprising a controller operably coupled to the robotic arm and configured to control operation and movement thereof relative to various modules of the system, wherein the controller comprises a hardware processor coupled to non-transitory, computer-readable memory containing instructions executable by the processor to cause the controller to perform a calibration routine.

42. The system of claim 41, wherein the calibration routine comprises performing contact sensing on three surfaces of a given module to thereby measure X, Y, and Z coordinates of a given module relative to the robotic arm and saving said measured coordinates for reuses on subsequent starts of the system.

* * * * *